(12) United States Patent
Smith et al.

(10) Patent No.: US 11,697,967 B2
(45) Date of Patent: Jul. 11, 2023

(54) PULLBACK SYSTEM FOR DRILLING TOOL

(71) Applicant: Vermeer Manufacturing Company, Pella, IA (US)

(72) Inventors: Jacob Richard Smith, Altoona, IA (US); Michael David Langenfeld, Pella, IA (US); Tyler J. Dorin, Pleasant Hill, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 17/635,509

(22) PCT Filed: Aug. 17, 2020

(86) PCT No.: PCT/US2020/046685
§ 371 (c)(1),
(2) Date: Feb. 15, 2022

(87) PCT Pub. No.: WO2021/034769
PCT Pub. Date: Feb. 25, 2021

(65) Prior Publication Data
US 2022/0268100 A1 Aug. 25, 2022

Related U.S. Application Data

(60) Provisional application No. 62/889,717, filed on Aug. 21, 2019.

(51) Int. Cl.
*E21B 7/04* (2006.01)
*E21B 7/20* (2006.01)
(Continued)

(52) U.S. Cl.
CPC .............. *E21B 7/046* (2013.01); *E21B 7/205* (2013.01); *E21B 10/42* (2013.01); *E21B 10/62* (2013.01); *F16L 1/028* (2013.01)

(58) Field of Classification Search
CPC .......... E21B 7/046; E21B 7/205; E21B 10/42; E21B 10/62; F16L 1/028
See application file for complete search history.

(56) References Cited

U.S. PATENT DOCUMENTS

| 2,191,021 A | 2/1940 | Ladd |
| 2,834,100 A | 5/1958 | Harsh |

(Continued)

FOREIGN PATENT DOCUMENTS

GB 2424433 9/2006

OTHER PUBLICATIONS

"TriHawk I with Pullback", https://www.ditchwitch.com/parts-service/digging-systems/bits, Charles Machine Works Company (Publicly available at least as early as Aug. 22, 2018).
(Continued)

*Primary Examiner* — Nicole Coy
(74) *Attorney, Agent, or Firm* — Michael Best & Friedrich LLP

(57) ABSTRACT

A rotary drill bit for use with a horizontal directional drill string. A coupler at a proximal axial end is configured to attach the rotary drill bit to a drill head at a distal end of the drill string. A cutting portion at a distal axial end is provided with a plurality of vanes with respective cutters that operate to cut a hole in earth when the rotary drill bit is rotated about a central axis. The plurality of vanes project radially outwardly from a surface of the cutting portion such that the surface forms respective troughs circumferentially interspersed with the plurality of vanes. A plurality of engagement features is positioned axially within the cutting portion and radially inward of an outer cutting diameter to facilitate attachment of a product pullback device between the plurality of vanes without removing the rotary drill bit, or any portion thereof, from the drill head.

15 Claims, 43 Drawing Sheets

(51) Int. Cl.
  *E21B 10/42* (2006.01)
  *E21B 10/62* (2006.01)
  *F16L 1/028* (2006.01)

(56) References Cited

U.S. PATENT DOCUMENTS

| | | | |
|---|---|---|---|
| 4,174,759 | A | 11/1979 | Arbuckle |
| 6,279,667 | B1 | 8/2001 | Culver |
| 6,299,382 | B1 | 10/2001 | Wentworth |
| 8,079,123 | B2 | 12/2011 | Lin |
| 8,122,979 | B1 | 2/2012 | Wright, Jr. et al. |
| 8,544,569 | B2 | 10/2013 | Wright et al. |
| 9,169,946 | B2 | 10/2015 | Crane et al. |
| 9,290,994 | B2 | 3/2016 | Webb |
| 9,611,696 | B2 | 4/2017 | Crane et al. |
| 9,719,344 | B2 | 8/2017 | Melsheimer |
| 9,771,759 | B2 | 9/2017 | Cooper |
| 10,024,105 | B2 | 7/2018 | Wright et al. |
| 10,208,541 | B2 | 2/2019 | Hoelting et al. |
| 10,246,993 | B2 | 4/2019 | Melsheimer |
| 10,301,880 | B2 | 5/2019 | Bullock et al. |
| 10,584,537 | B2 | 3/2020 | Bullock et al. |
| 10,900,294 | B2 | 1/2021 | Dorin et al. |
| 11,105,156 | B2 | 8/2021 | Dorin et al. |
| 2003/0106714 | A1 | 6/2003 | Smith et al. |
| 2012/0118640 | A1 | 5/2012 | Runquist et al. |
| 2014/0255103 | A1 | 9/2014 | Crane et al. |
| 2014/0367173 | A1 | 12/2014 | Cooper |
| 2015/0014060 | A1 | 1/2015 | Wentworth et al. |
| 2015/0075870 | A1* | 3/2015 | Cooper ................. E21B 7/046 175/73 |
| 2015/0233183 | A1 | 8/2015 | Melsheimer |
| 2016/0245023 | A1 | 8/2016 | Wright et al. |
| 2017/0044835 | A1 | 2/2017 | Hoelting et al. |
| 2017/0342777 | A1 | 11/2017 | Cooper |
| 2018/0313157 | A1 | 11/2018 | Langenfeld et al. |

OTHER PUBLICATIONS

"Cable Pullers", http://www.drillhead.net/Drillhead.net/Pull_Back_Adapter_HDD.html, Drillhead, Inc (Publicly available at least as early as Aug. 22, 2018).

S. Naganawa, "Feasibility Study on Roller-cone Bit Wear Detection from Axial Bit Vibration", Journal of Petroleum Science and Engineering vol. 82-83 (2012), pp. 140-150.

International Search Report for corresponding International Application No. PCT/US2020/046685, dated Oct. 12, 2020.

\* cited by examiner

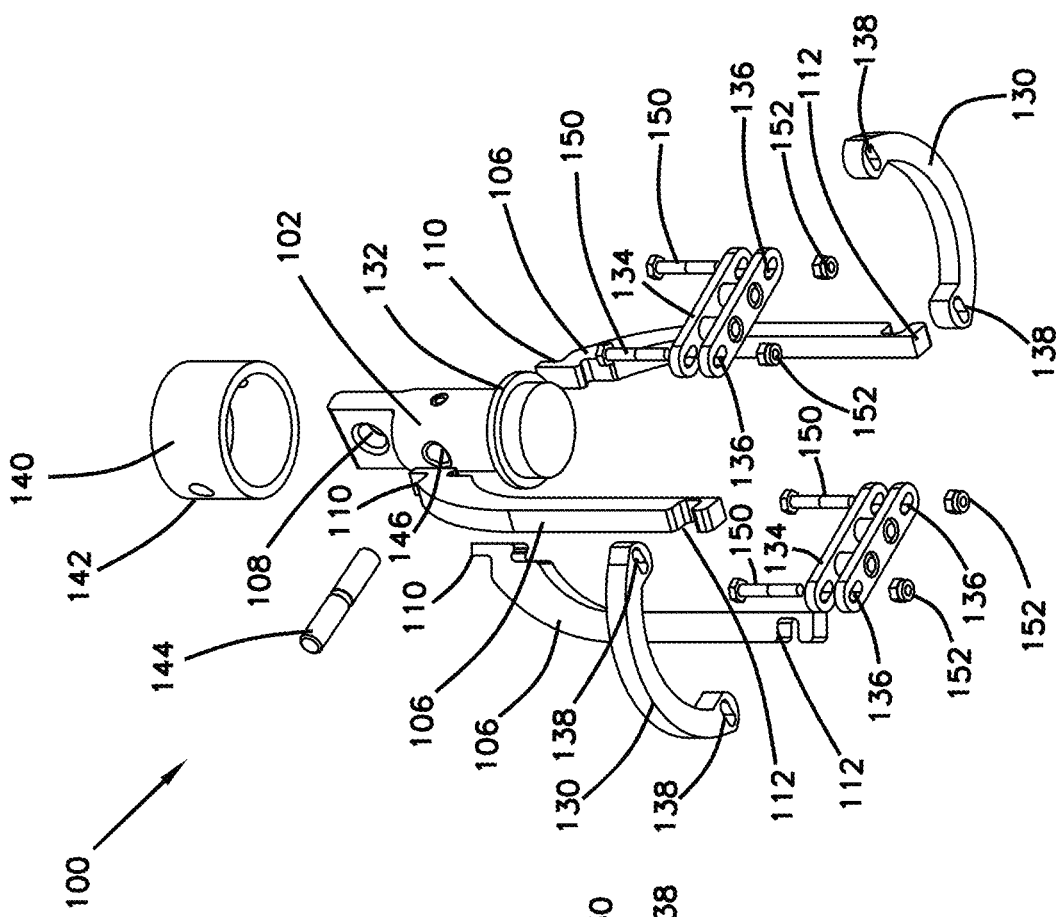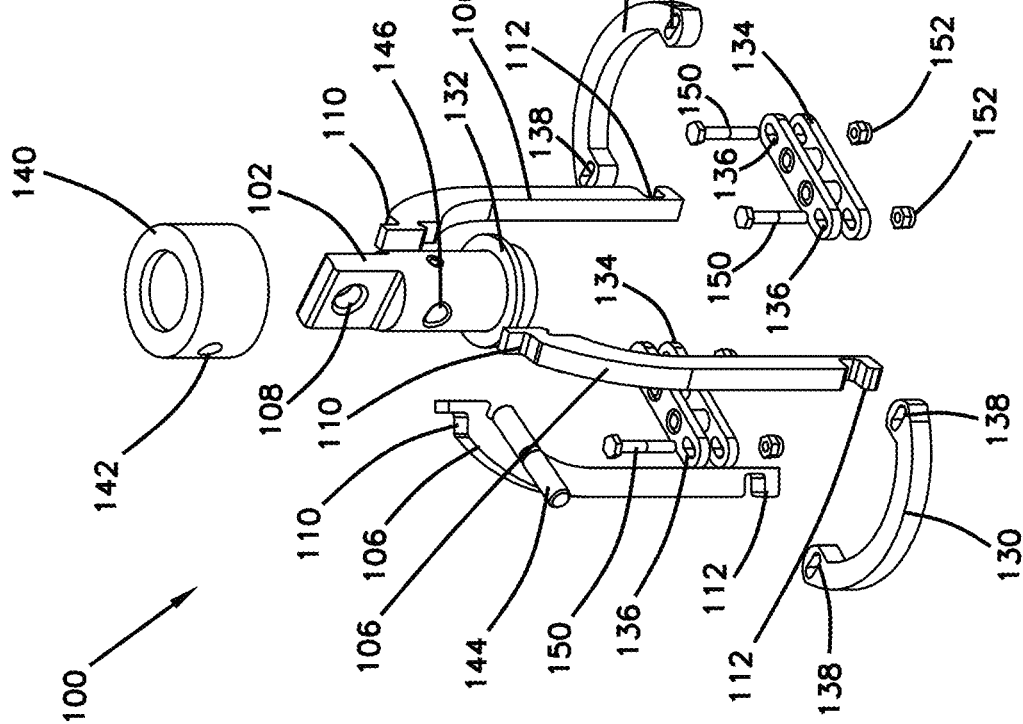

ual of an outer cutting diameter. A product is attached to an attachment portion of the pullback device at the end location. The drill string, including the rotary drill bit, the pullback device, and the product, is pulled back through the underground hole from the end location to the start location to install the product into the underground hole. The product is detached from the pullback device at the start location.

PULLBACK SYSTEM FOR DRILLING TOOL

CROSS-REFERENCE TO RELATED APPLICATIONS

This application claims priority to U.S. Provisional Patent Application No. 62/889,717, filed on Aug. 21, 2019, the entire contents of which are incorporated by reference herein.

BACKGROUND

Horizontal directional drilling operations often use a rotary drill bit to drill a generally horizontal hole in the ground. The rotary drill bit is typically mounted at a distal end of a drill string including a plurality of drill rods (e.g., drill pipes) strung together end-to-end. The drill string transfers thrust and torque from a drive mechanism (e.g., an above-ground drive mechanism) to the rotary drill bit. The drill string rotates the rotary drill bit about a longitudinal axis of the drill string and concurrently applies thrust in a distal direction to the rotary drill bit.

Once the hole is complete, a product such as cable, pipe, conduit, and the like is attached to the drill string and the drill string is pulled back through the hole to install the product in the hole. To pull the product through the hole, the rotary drill bit, or at least a portion thereof, is removed from the drill string to allow for the attachment of a pullback device that connects the product to the drill string. This process is time consuming and requires additional tooling to remove or partially remove the rotary drill bit to complete the pullback process. Therefore, improvements are needed.

SUMMARY

The present disclosure relates generally to a rotary drill bit and a pullback device for a rotary drill bit used for horizontal directional drilling operations. In one possible configuration, and by non-limiting example, a pullback device is removably secured to the rotary drill bit without removing the drill bit, or any portion thereof, from the drill string.

In one aspect, the invention provides a rotary drill bit for use with a horizontal directional drill string. A coupler at a proximal axial end is configured to attach the rotary drill bit to a drill head at a distal end of the drill string. A cutting portion at a distal axial end is provided with a plurality of vanes with respective cutters that operate to cut a hole in earth when the rotary drill bit is rotated about a central axis. The plurality of vanes project radially outwardly from a surface of the cutting portion such that the surface forms respective troughs circumferentially interspersed with the plurality of vanes. A plurality of engagement features are positioned axially within the cutting portion and radially inward of an outer cutting diameter to facilitate attachment of a product pullback device between the plurality of vanes without removing the rotary drill bit, or any portion thereof, from the drill head.

In another aspect, the invention provides a method including operating a horizontal directional drilling machine to thrust a drill string having a rotary drill bit into the earth to drill an underground hole from a start location to an end location, the rotary drill bit having a cutting portion defined by a plurality of vanes projecting radially outward from a surface to define an outer cutting diameter. At the end location, a pullback device is attached to a plurality of engagement features of the rotary drill bit at respective positions along a surface of the rotary drill bit that is axially within the cutting portion and radially inward of an outer cutting diameter. A product is attached to an attachment portion of the pullback device at the end location. The drill string, including the rotary drill bit, the pullback device, and the product, is pulled back through the underground hole from the end location to the start location to install the product into the underground hole. The product is detached from the pullback device at the start location.

One aspect relates to a pullback device for attaching to a rotary drill bit without disassembling or removing the rotary drill bit from a drill string. The pullback device comprises: a frame member; a collar configured to attach the pullback device to the rotary drill bit; and arms each having a first end slidably engaged with the frame member and a second end slidably engaged with the collar.

Another aspect relates to a pullback system for installing product in a hole. The system comprises: a rotary drill bit having a plurality of vanes with cutters and a base, the base being located between the plurality of vanes and a coupler, the coupler being configured to attach the rotary drill bit to a drill head; and a pullback device that attaches to the rotary drill bit without disassembling or removing the rotary drill bit from the drill head, the pullback device including: a frame member; a collar that attaches the pullback device to the rotary drill bit; a plurality of arms each having a first end slidably engaged with the frame member and a second end slidably engaged with the collar; and at least one attachment location configured to attach the product to the pullback device.

Another aspect relates to a method of installing product in a hole, the method comprising: using a rotary drill bit having a plurality of vanes with cutters to drill a hole from a start location to an end location; attaching a pullback device to a base of the rotary drill bit at the end location; attaching a product to the pullback device at the end location; pulling back the rotary drill bit from the end location to the start location, and detaching the product from the pullback device at the start location.

Another aspect relates to a pullback device for attaching to a rotary drill bit without disassembling or removing the rotary drill bit from a drill string. The pullback device comprises: a product attachment portion configured to align with a central axis of the rotary drill bit and to attach product to the pullback device; and an anchoring portion for securing the product attachment portion to the rotary drill bit. The anchoring portion engages a base of the rotary drill bit to attach the pullback device to the rotary drill bit.

Another aspect relates to a method of pulling back product in a hole drilled by a rotary drill bit coupled to a drill string. The rotary drill bit has a base defining a central axis about which the rotary drill bit rotates during drilling and a plurality of vanes extending from the base. Each vane has a plurality of cutters. The method comprises: attaching an anchoring portion of a pullback device to the base; attaching product to a product attachment portion of the pullback device; and pulling back the product through the hole by transferring a pullback load through the anchoring portion to the base.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 14 is an exploded view of the pullback device.

FIG. 15 is another exploded view of the pullback device.

DETAILED DESCRIPTION

Figure 1:
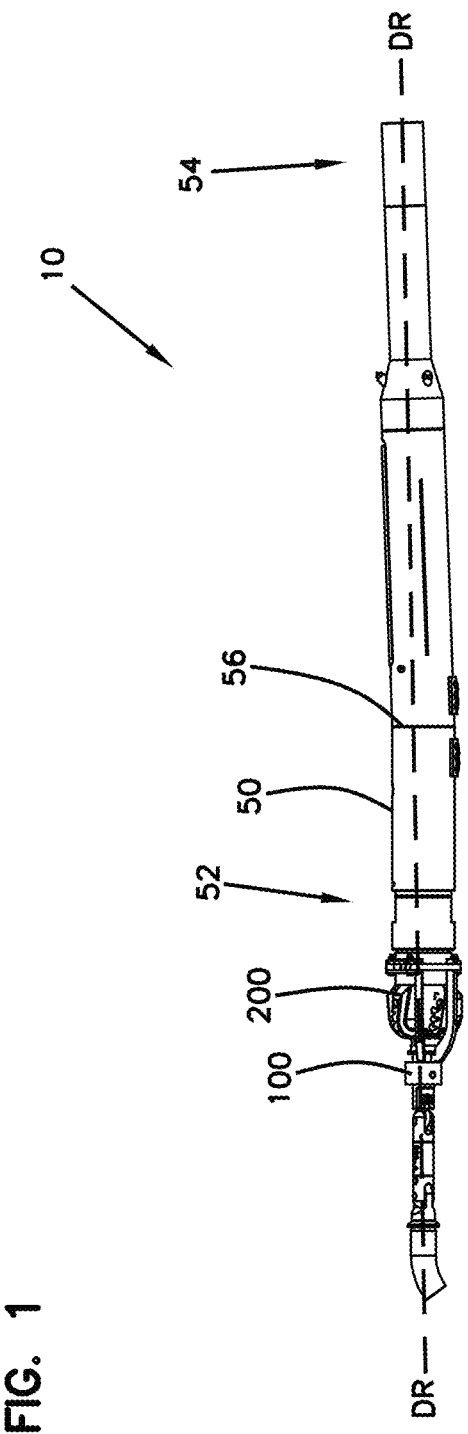
FIG. 1 is a side view of a pullback system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure pertains to a pullback device for installing product in a hole. The pullback device is attachable to a rotary drill bit without disassembling or removing the rotary drill bit from a drill string. The pullback device does not require specialized tools for attachment with the rotary drill bit, and thereby allows the pullback device to be easily attached to the rotary drill bit. The pullback system may include similar concepts described in U.S. patent application Ser. No. 16/526,032 filed Jul. 30, 2019, assigned to VERMEER MANUFACTURING COMPANY, the entirety of which is hereby incorporated by reference.

FIG. 1 is a side view of a pullback system 10. The pullback system 10 includes a pullback device 100 attached to rotary drill bit 200. The rotary drill bit 200 is used for horizontal directional drilling operations, and is described in more detail with reference to FIGS. 3-6. The rotary drill bit 200 is attached to a distal end of a drill head 50.

The drill head 50 includes a downhole end 52 and an up-hole end 54. As shown in FIG. 1, the rotary drill bit 200 is attached at the downhole end 52. The drill head 50 is connectable at the up-hole end 54 to outer drill rods and inner drill rods of a drill string.

The drill head 50 includes a drill rod axis DR that has a bend at boundary 56. In certain examples, the bend of the drill rod axis DR is about 2 degrees.

The drill head 50 is constructed to withstand large pullback forces during a pullback operation. In certain examples, the pullback device 100 is designed to fail or yield before damaging the drill head 50 during a pullback operation.

Figure 2:
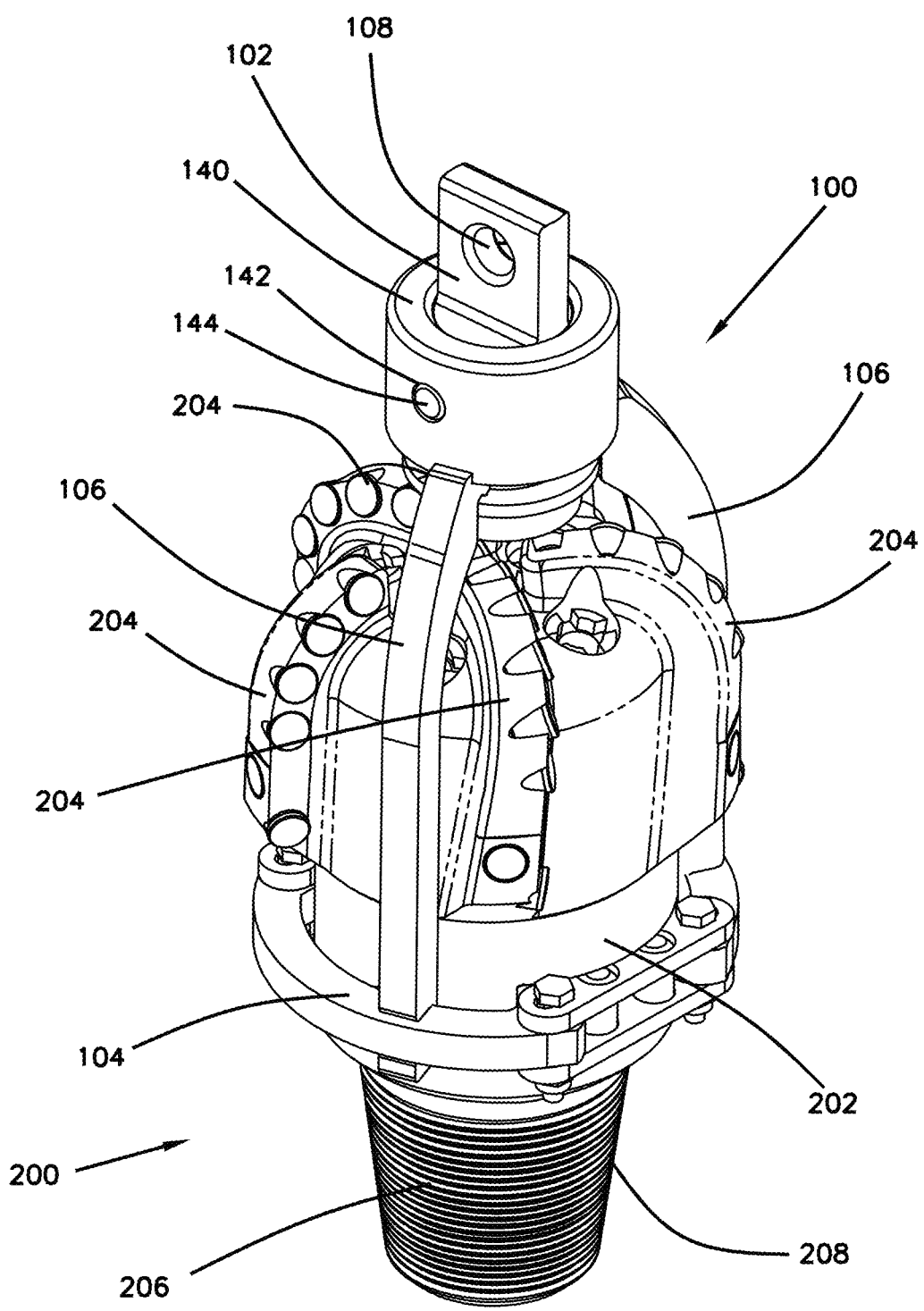
FIG. 2 is an isometric view of a pullback device in accordance with a first example of the present disclosure attached to the rotary drill bit.
Figure 3:
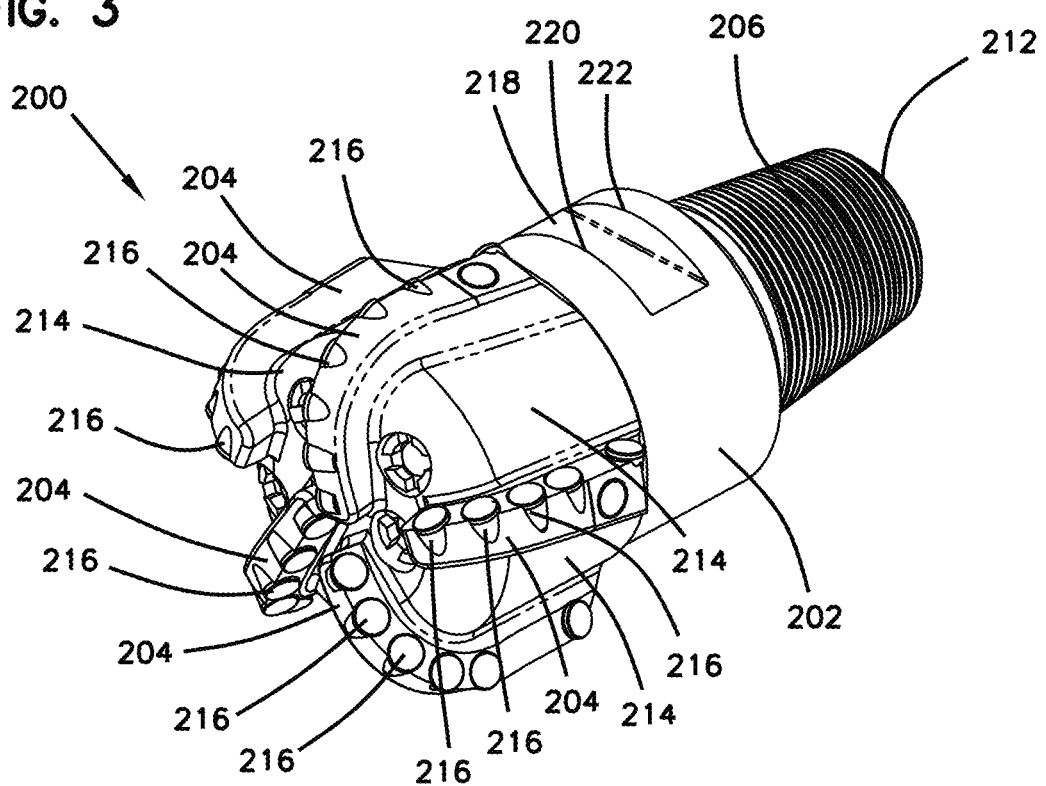
FIG. 3 is an isometric view of the rotary drill bit.
Figure 4:
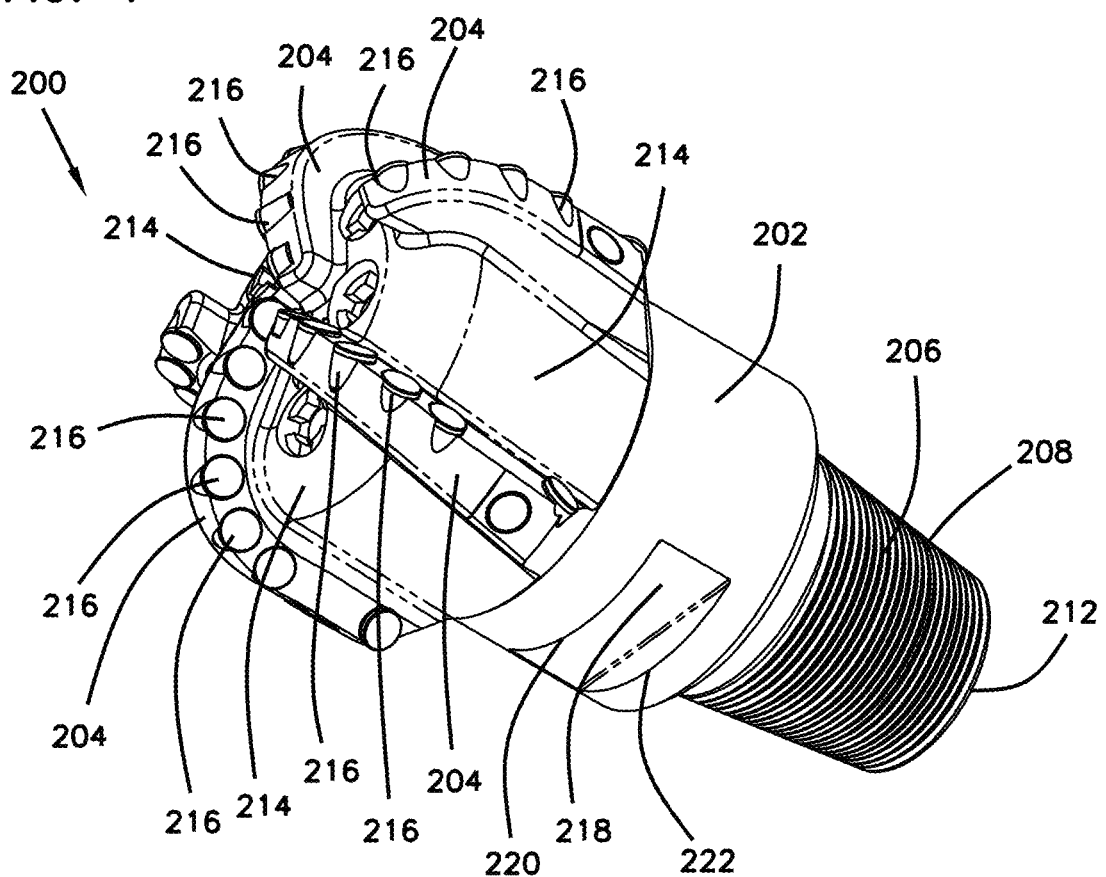
FIG. 4 is another isometric view of the rotary drill bit.
Figure 5:
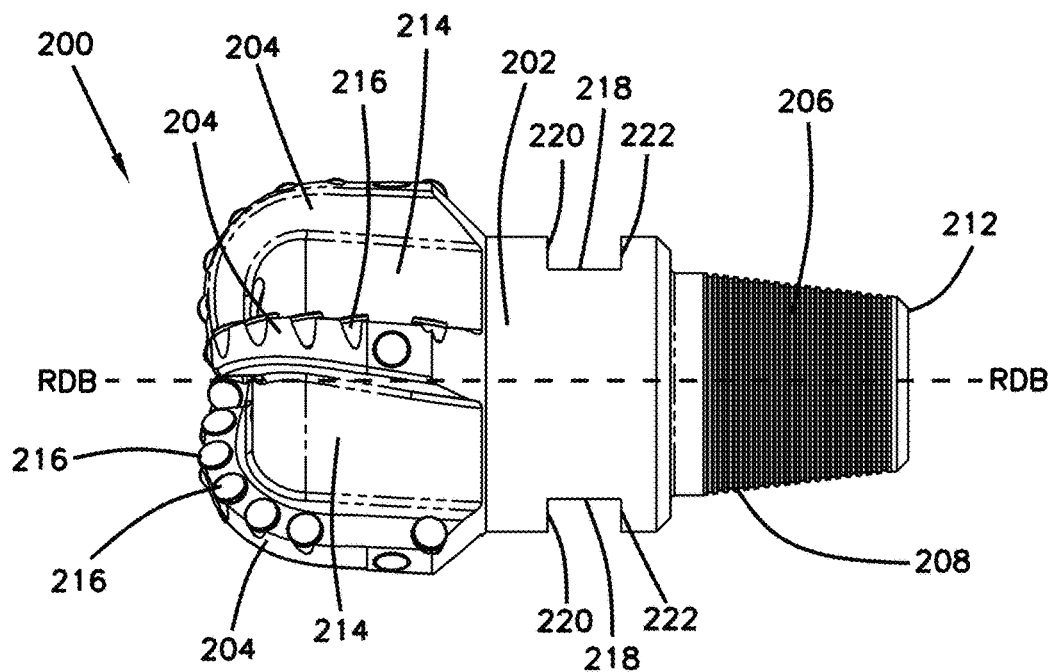
FIG. 5 is a side view of the rotary drill bit.
Figure 6:
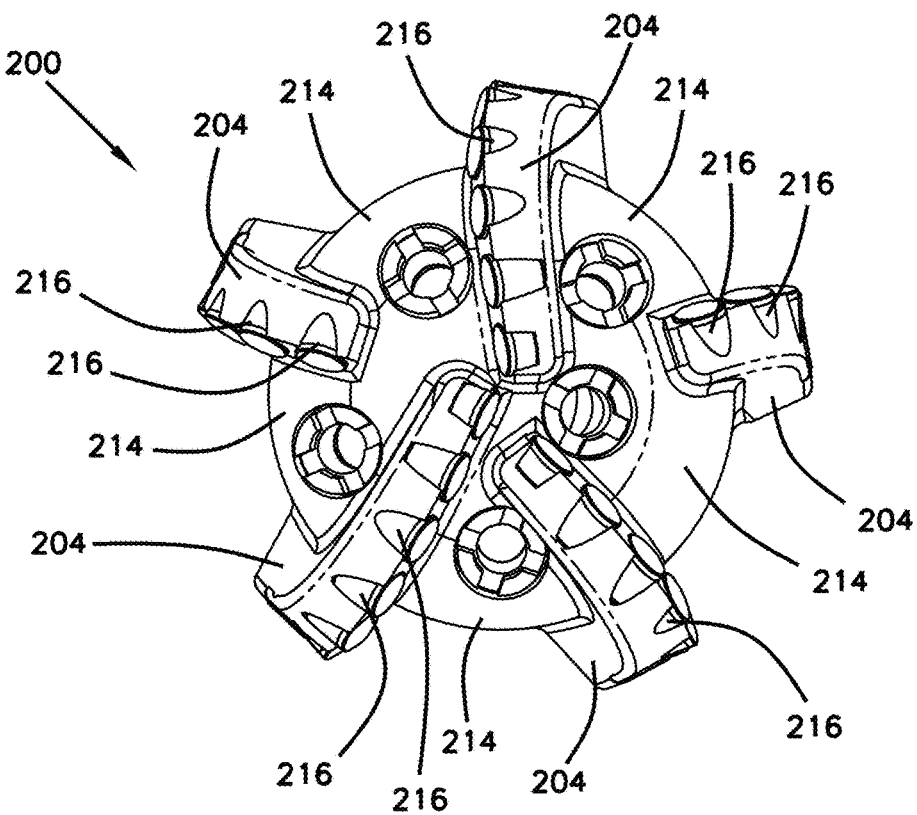
FIG. 6 is a front view of the rotary drill bit.
Figure 7:
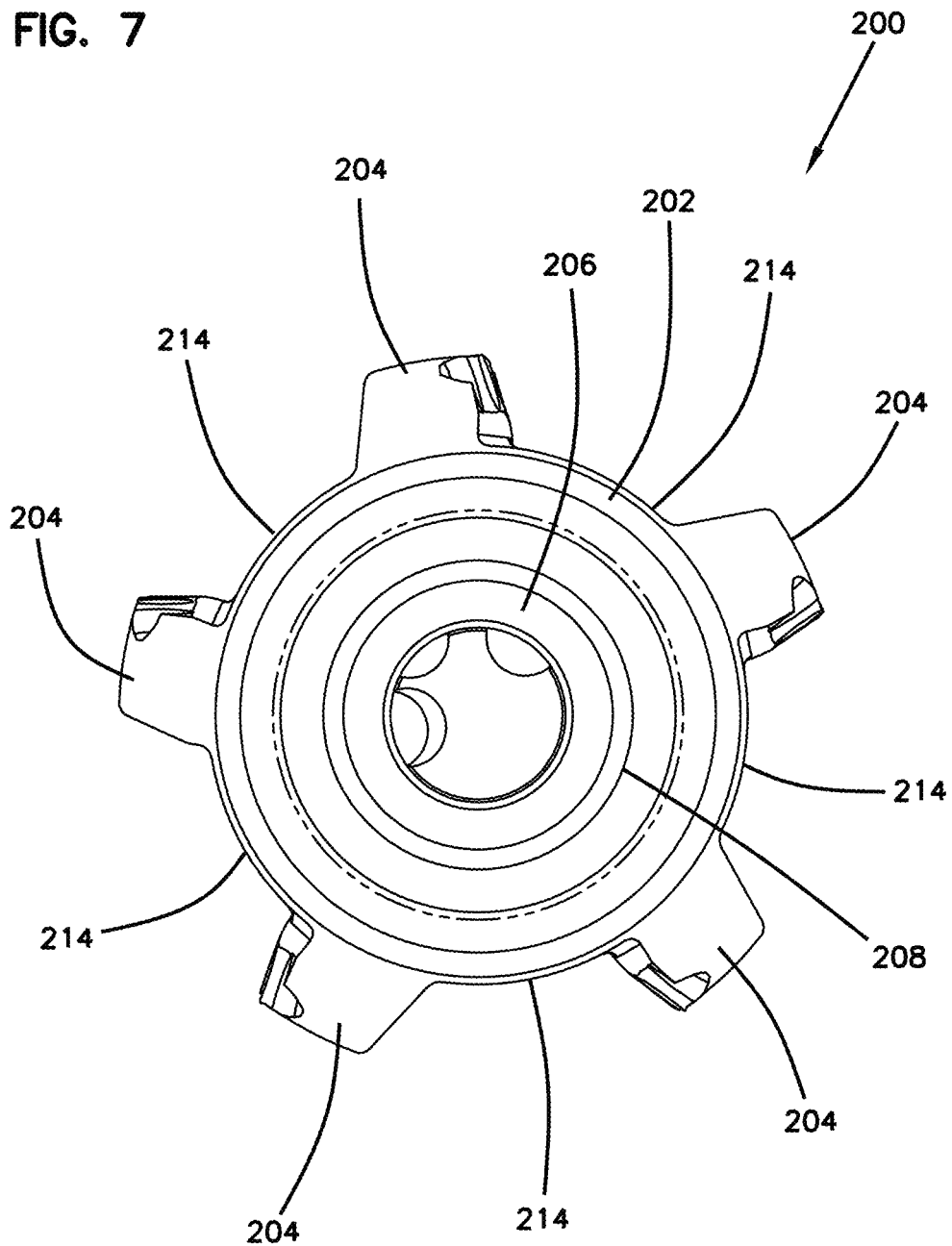
FIG. 7 is a rear view of the rotary drill bit.

FIG. 2 is an isometric view of the pullback device 100 attached to the rotary drill bit 200. The pullback device 100 is designed to attach to the rotary drill bit 200 without disassembling or removing the rotary drill bit 200 from the drill string. The pullback device 100 is also designed to attach to a base 202 of the rotary drill bit 200, and to transfer a pullback force to the base 202 during a pullback operation.

FIGS. 3-7 are isometric, side, front, and rear views of the rotary drill bit 200. The rotary drill bit 200 includes a base 202, a plurality of vanes 204, and a coupler 206. As shown, the base 202 is located between the plurality of vanes 204 and the coupler 206.

The rotary drill bit 200 can be used on various drill rod drilling systems. In one example embodiment, the rotary drill bit 200 is used on a dual drill rod drilling system. Dual drill rod drilling systems are used for directional drilling, and are generally configured to drive into the ground a series of drill rods joined end-to-end to form a drill string. The rotary drill bit 200 is attached at a downhole end of the drill string. A dual drill rod drilling system is described in more detail in U.S. Patent Application Publication No. 2018/0313157, assigned to VERMEER MANUFACTURING COMPANY, the disclosure of which is hereby incorporated by reference in its entirety.

The coupler 206 is used to attach the rotary drill bit 200 to the drill head 50 (see FIG. 1) of the drill string. The coupler 206 includes threads 208 that mate with corresponding threads on the drill head 50 to attach the rotary drill bit 200 to the drill head 50. As described above, the drill head 50 transfers torque and thrust from a drive mechanism to rotate the rotary drill bit 200 about a central axis RDB and to thrust the rotary drill bit 200 in a forward direction causing the plurality of vanes 204 to remove debris (e.g., rock, dirt, mud etc.) during a drilling operation.

The plurality of vanes 204 define a cutting portion of the rotary drill bit 200 and project radially outwardly from a surface that forms respective troughs 214 circumferentially interspersed with the plurality of vanes 204. The plurality of vanes 204 can project radially outward (as shown in the end view of FIG. 6), regardless of whether or not they also incorporate a tilt angle(s) or complex curvature. Each vane 204 includes a plurality of cutters 216. In certain examples, the cutters 216 on the plurality of vanes 204 are polycrystalline diamond (PDC) compact cutters. In the depicted example, the rotary drill bit 200 has five vanes 204 separated by five troughs 214. It is contemplated that the rotary drill bit 200 may have a variety of configurations including a variety of quantities, shapes, and placements of the vanes 204, troughs 214, and cutters 216.

In certain examples, the base 202 includes at least one anchor 218 that is engaged by an anchoring portion of the pullback device 100 to secure the pullback device 100 to the base 202 of the rotary drill bit 200. In such examples, the at least one anchor 218 can be used to install the rotary drill bit 200 to the drill head 50 such as by providing one or more surfaces for a wrench or similar tool to latch onto to thread and torque the rotary drill bit 200 onto the drill head 50. The at least one anchor 218 on the rotary drill bit 200 is robust and able to withstand loads during pullback operations. In alternative examples, the base 202 does not include an anchor 218, and the anchoring portion of the pullback device 100 is secured to the base 202 without having to engage an anchor 218.

In the depicted example, the base includes two anchors 218 on opposite sides of the central axis RDB of the rotary drill bit 200. The examples depicted in the figures, the anchors 218 are cut out portions of the base 202 and include surfaces 220, 222 that are flat and orthogonal to the central axis RDB of the rotary drill bit 200 (see FIG. 5). The pullback device 100 is configured to engage at least one surface 220, 222 of each anchor 218 to transfer a pullback force to the base 202 during a pullback operation.

The anchors 218 may have a variety of configurations, shapes, and placements on the base 202. For example, the base 202 may include a single anchor 218, may include more than two anchors 218, or may not include an anchor 218. In one example, the base 202 may include a single anchor 218 such as a groove that wraps around the base 202.

Figure 8:
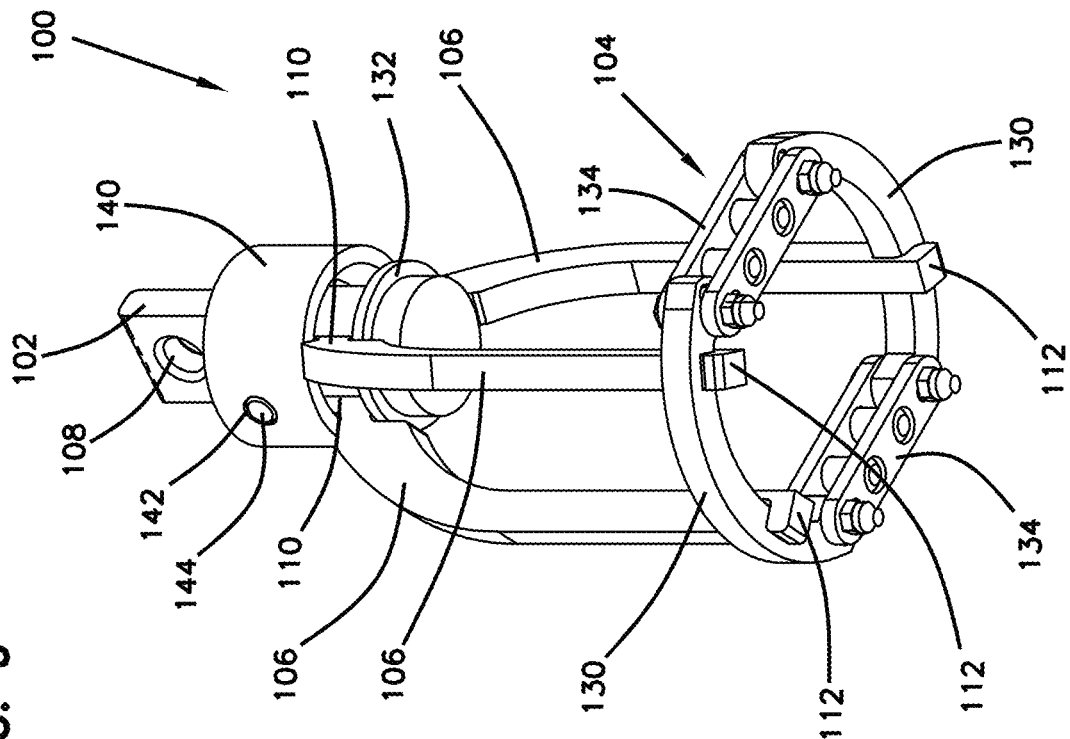
FIG. 8 is an isometric view of the pullback device.
Figure 9:
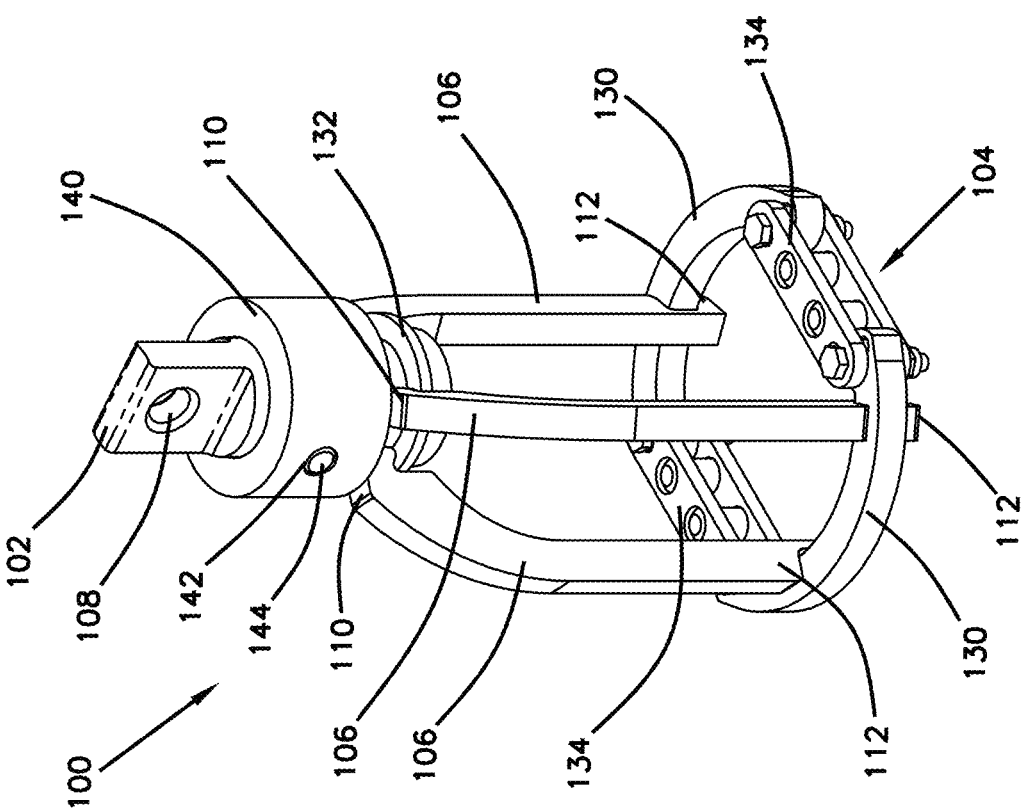
FIG. 9 is another isometric view of the pullback device.
Figure 11:
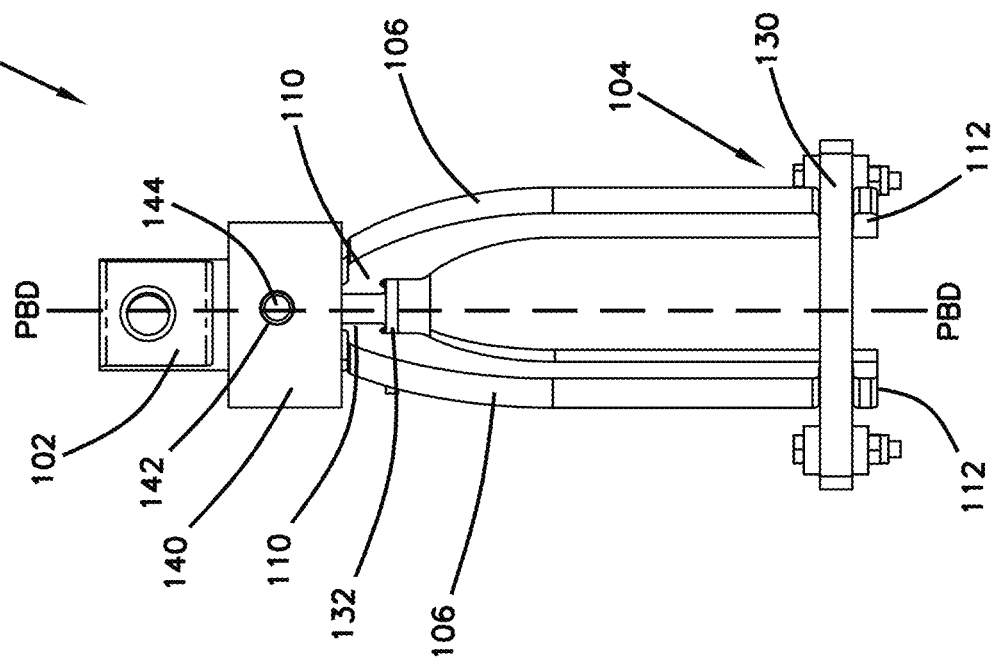
FIG. 11 is another side view of the pullback device.
Figure 10:
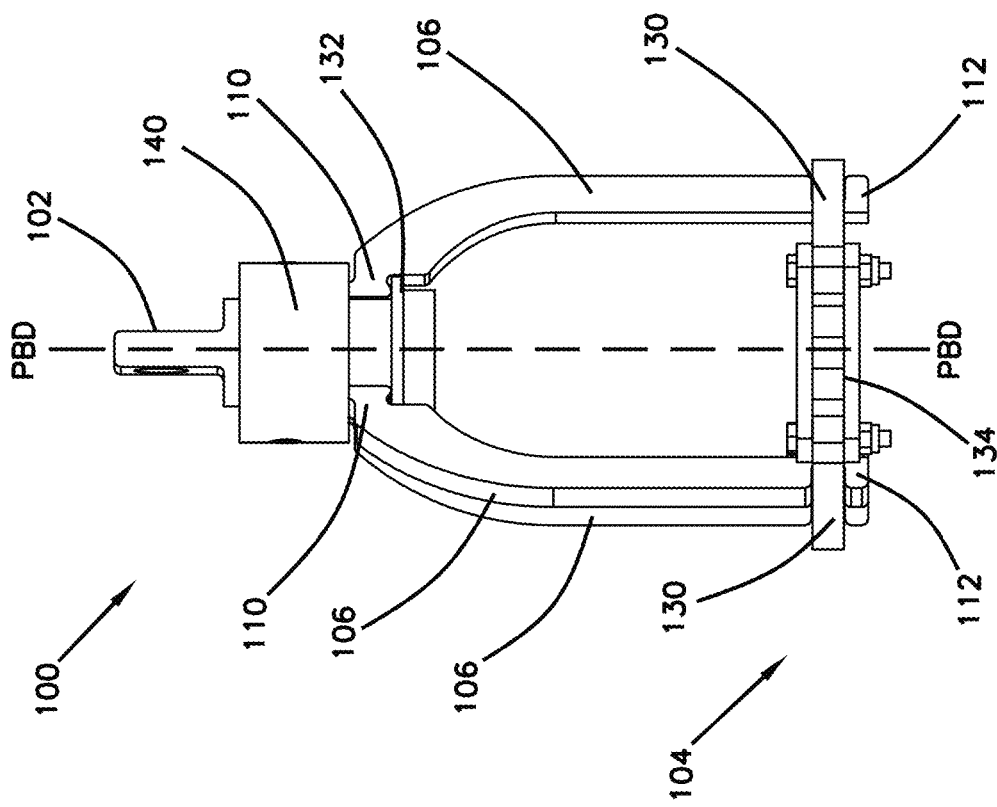
FIG. 10 is a side view of the pullback device.

FIGS. 8 and 9 are isometric views of the pullback device 100. FIGS. 10 and 11 are side views of the pullback device 100. As shown in these figures, the pullback device 100 includes a frame member 102, a collar 104, and a plurality of arms 106.

The frame member 102 has at least one attachment location 108. The attachment locations 108 can be used to attach product to the pullback device 100. In certain examples, the frame member 102 and the at least one attachment location 108 are part of a product attachment portion of the pullback device 100 that aligns with the central axis RDB of the rotary drill bit 200 and is used to attach product to the pullback device 100.

In the examples depicted in the figures, the attachment location 108 is an aperture to which product can be directly or indirectly attached. It is contemplated that the frame member 102 may have a variety of configurations including more than one attachment location 108. Additionally, it is contemplated that the attachment location 108 may have a variety of shapes and placements on the frame member 102.

In certain examples, the collar 104 and the plurality of arms 106 are part of an anchoring portion of the pullback device 100 that secures the product attachment portion to the rotary drill bit 200 by engaging the base 202 of the rotary drill bit 200. In certain examples, the collar 104 engages the at least one anchor 218 on the base 202 to secure the pullback device 100 to the rotary drill bit 200. In such examples, the collar 104 transfers a pullback force to the base 202 through the at least one anchor 218 during a pullback operation. For example, as shown in the example depicted in FIG. 2, the collar 104 is configured to fit between the orthogonal surfaces 220, 222 such that during a pullback operation, the collar 104 engages at least one of the orthogonal surfaces 220, 222 and transfers a pullback force to the base 202 through the orthogonal surfaces 220, 222.

In alternative examples where the base 202 does not include the at least one anchor 218, the anchoring portion of the pullback device 100 can tightly clamp onto the exterior face of the base 202. In some examples, the anchoring portion of the pullback device 100 can grab onto the back of the vanes 204. In such examples, the anchoring portion can be configured as a grapple having pivoting arms that can grab onto the vanes 204 such as in the pullback device described in U.S. patent application Ser. No. 16/526,032 filed Jul. 30, 2019, assigned to VERMEER MANUFACTURING COMPANY, the disclosure of which is hereby incorporated by reference in its entirety.

Figure 12:
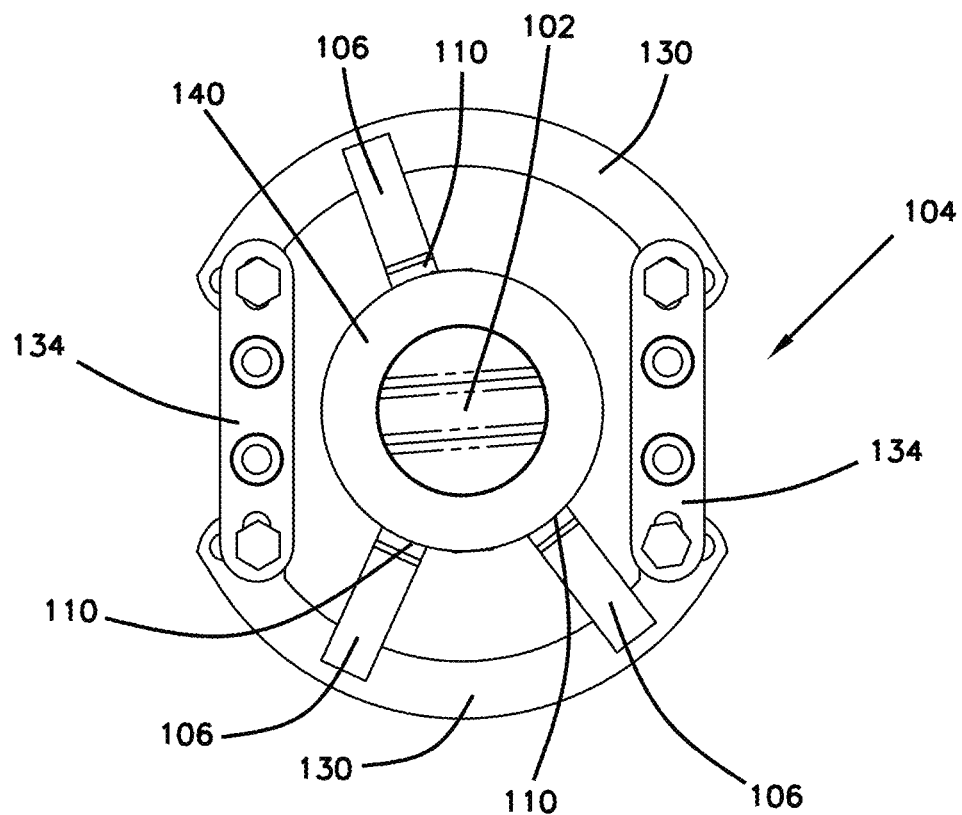
FIG. 12 is a top view of the pullback device.
Figure 13:
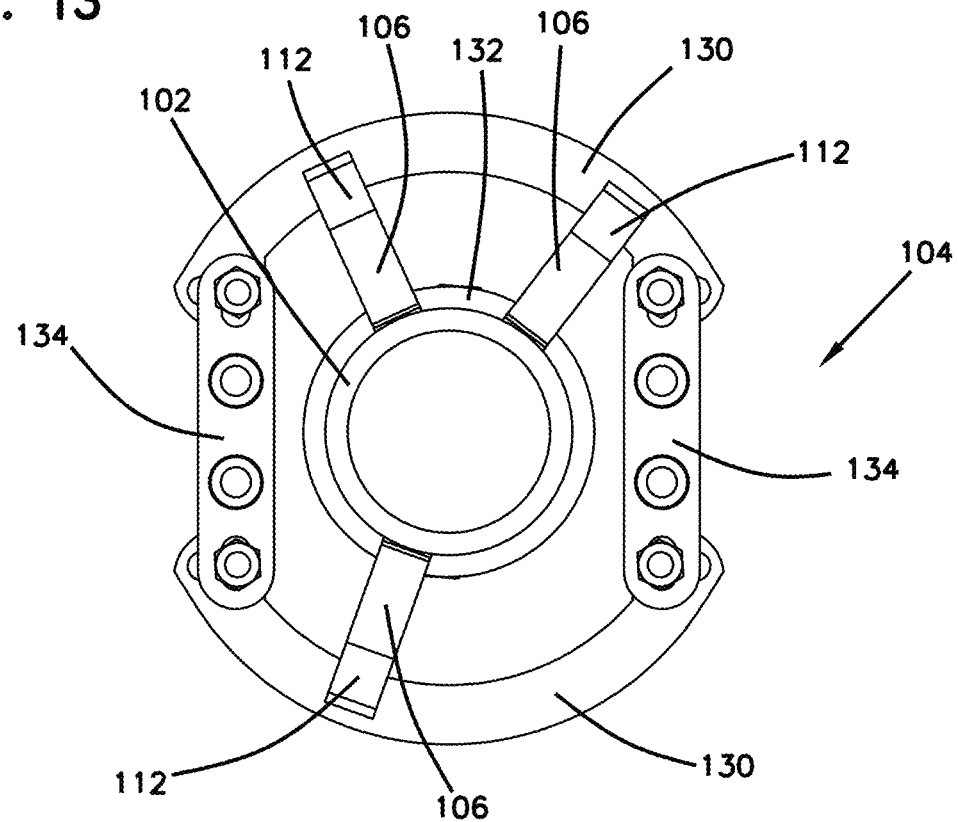
FIG. 13 is a bottom view of the pullback device.

FIGS. 12 and 13 are top and bottom views, respectively, of the pullback device 100. FIGS. 14 and 15 are exploded views of the pullback device 100. Referring now to FIGS. 8-15, each arm 106 has a first end 110 slidably engaged with the frame member 102 and a second end 112 slidably engaged with the collar 104. The arms 106 are slidable about the frame member 102 and the collar 104 such that the arms 106 can rotate about a central axis PBD of the pullback device 100 (see FIGS. 10 and 11). When the pullback device 100 is attached to the rotary drill bit 200 such as shown in FIG. 2, the central axis PBD of the pullback device 100 and the central axis RDB of the rotary drill bit 200 are coincident with one another, and accordingly, the arms 106 are also able to rotate about the central axis RDB of the rotary drill bit 200. As provided herein, the plurality of arms 106 includes at least two arms 106, three arms 106, or more than three arms 106.

Figure 16:
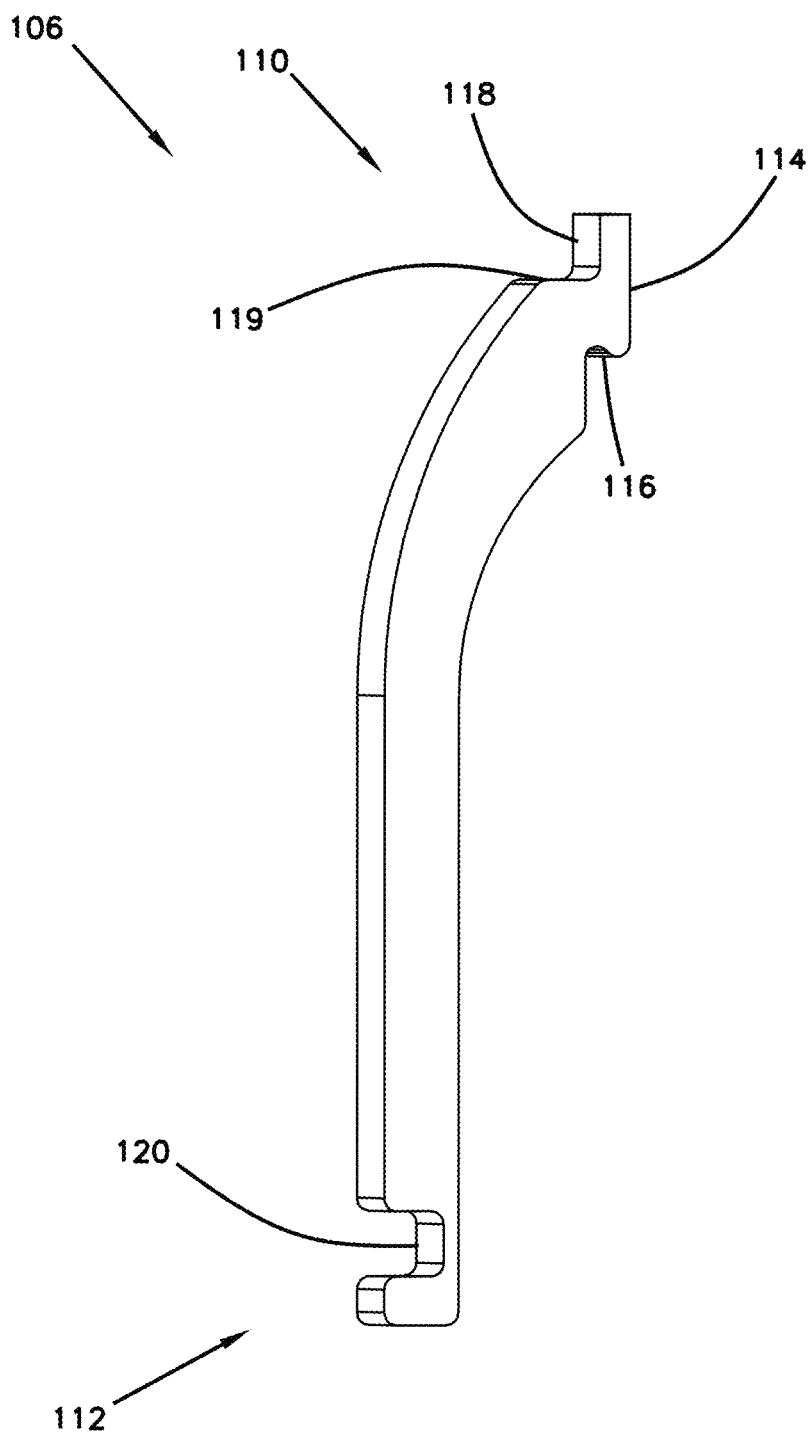
FIG. 16 is an isometric view of an arm of the pullback device.

FIG. 16 is an isometric view of an arm 106 of the pullback device 100. As shown in FIG. 16, the first end 110 includes a first surface 114, a second surface 116, a third surface 118, and a fourth surface 119. Referring now to FIGS. 8, 9, and 12-16, the first surface 114 is configured to slidably engage an exterior surface of the frame member 102, the second surface 116 is configured to slidably engage a flange 132 that extends from the frame member 102, the third surface 118 is configured to slidably engage an interior surface of a locking device 140, and the fourth surface 119 is configured to engage a side surface of the locking device 140 orthogonal to the interior surface of the locking device 140. The frame member 102, flange 132, and locking device 140 prevent axial and radial movement of the first end 110 with respect to the central axis PBD of the pullback device 100 while allowing the first end 110 to rotate about the central axis PBD.

As further shown in FIG. 16, the second end 112 of the arm 106 includes a groove 120. In certain examples, the groove 120 has a width that corresponds to a width of a glide portion 130 of the collar 104. For example, the groove 120 may have a width that is equal to or greater than the width of the glide portion 130 of the collar 104. Referring now to FIGS. 8, 9, and 12-16, the collar 104 prevents both axial and radial movement of the second ends 112 of the arms 106 with respect to the central axis PBD of the pullback device 100 while allowing the second ends 112 of the arms 106 to at least partially rotate about the central axis PBD of the pullback device 100 on the glide portion 130.

Referring now to FIGS. 8-15, the pullback device 100 includes the locking device 140 that engages the frame member 102 and the first ends 110 of the arms 106. The locking device 140 in combination with the flange 132 prevents axial and radial movement of the first ends 110 of the arms 106 with respect to the central axis PBD of the pullback device 100 while allowing the first ends 110 of the arms 106 to rotate about the central axis PBD of the pullback device 100. In the depicted example, the first ends 110 of the arms 106 are sandwiched between the flange 132 and the locking device 140.

In the examples depicted in FIGS. 8-15, the locking device 140 is a hollow cylinder that fits over the frame member 102 and the first ends 110 of the arms 106. The locking device 140 includes an aperture 142 and the frame member includes a corresponding aperture 146. A pin 144 is insertable into the aperture 142 of the locking device 140 and the corresponding aperture 146 of the frame member 102 for restraining the locking device 140 relative to the frame member 102. Thus, the locking device 140 when restrained by the pin 144, prevents both axial and radial movement of the first ends 110 of the arms 106 with respect to the central axis PBD of the pullback device 100 while allowing the first ends 110 of the arms 106 to rotate about the central axis PBD.

In an alternative example, the locking device 140 is a solid washer. In such examples, the pin 144 is insertable into the aperture 146 of the frame member 102 for restraining the locking device relative to the frame member 102.

Figure 17:
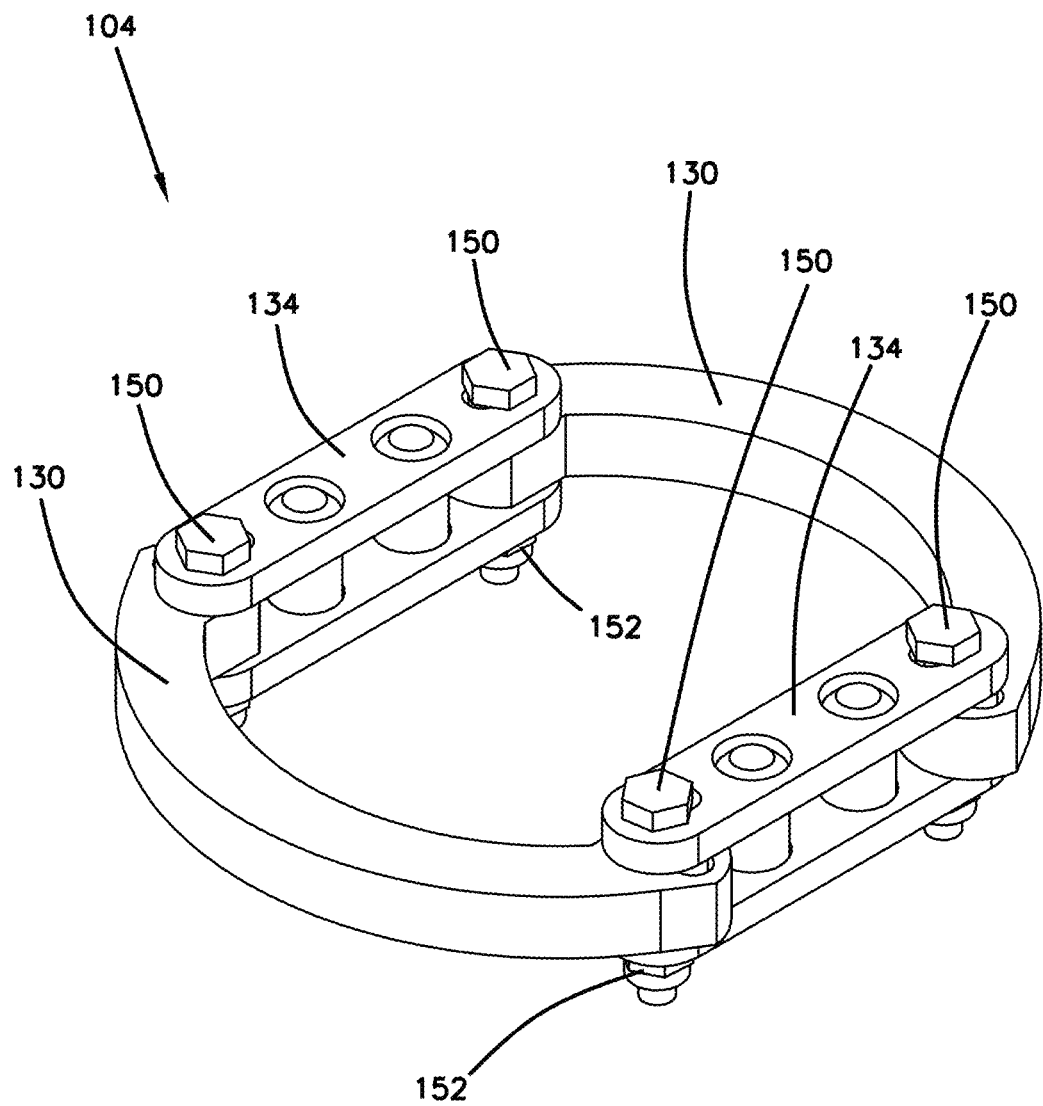
FIG. 17 is an isometric view of a collar of the pullback device.

FIG. 17 is an isometric view of the collar 104 of the pullback device 100. As shown in FIGS. 14, 15, and 17, the glide portions 130 of the collar 104 are attached together by connectors 134. The connectors 134 include bores 136 on opposite ends, and the glide portions 130 include corresponding bores 138. Fixtures such as bolts 150 are inserted through the bores 136 on the connectors 134 and the corresponding bores 138 on the glide portions 130, and nuts 152 are threaded onto the bolts 150 to fix the glide portions 130 and the connectors 134 together. In this manner, the collar 104 can be secured around the base 202 of the rotary drill bit 200 (see FIG. 2).

The anchors 218 on the base 202 may have a variety of configurations, shapes, and placements on the base 202. Therefore, the glide portions 130 and connectors 134 may also have a variety of configurations and shapes in addition to those shown in the figures to match the configurations, shapes, and placements of the anchors 218 on the base 202. Also, the collar 104 may have more than two glide portions 130, or may have a single glide portion 130. Also, a variety of fixtures, alternative to the bolts 150 and nuts 152, may be used to fix the glide portions 130 and the connectors 134 together.

Figure 18:
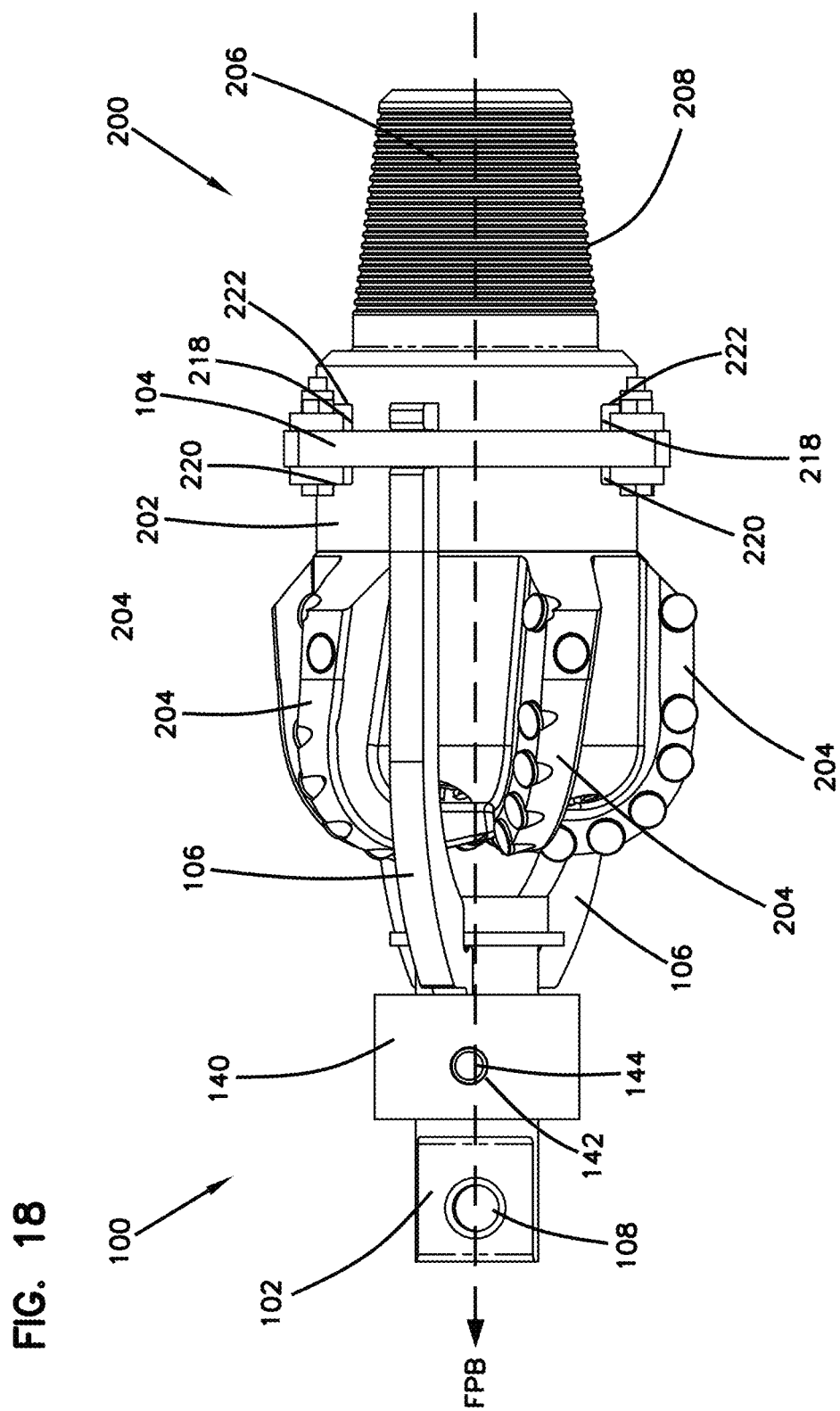
FIG. 18 is a side view of the pullback device attached to the rotary drill bit.

FIG. 18 is a side view of the pullback device 100 attached to the rotary drill bit 200. During a pullback operation, pullback forces FPB from product attached to the at least one attachment location 108 are transmitted to the rotary drill bit 200 through the collar 104. The collar 104 clamps around the base 202 of the rotary drill bit 200. The collar 104 can tightly or loosely fit around the base 202 of the rotary drill bit 200 to engage portions on the base 202 of the rotary drill bit 200 that are orthogonal to the central axis RDB of the rotary drill bit 200 such as the surfaces 220, 222 in the anchors 218. Advantageously, by engaging the anchors 218, the stability of the pullback device 100 during pullback is improved because the collar 104 prevents rotation of the pullback device 100. Additionally, by engaging the base 202, the collar 104 transfers the pullback forces FPB from the product to the base 202 which improves also stability during pullback because the base 202 is a robust portion of the rotary drill bit 200.

Figure 19:
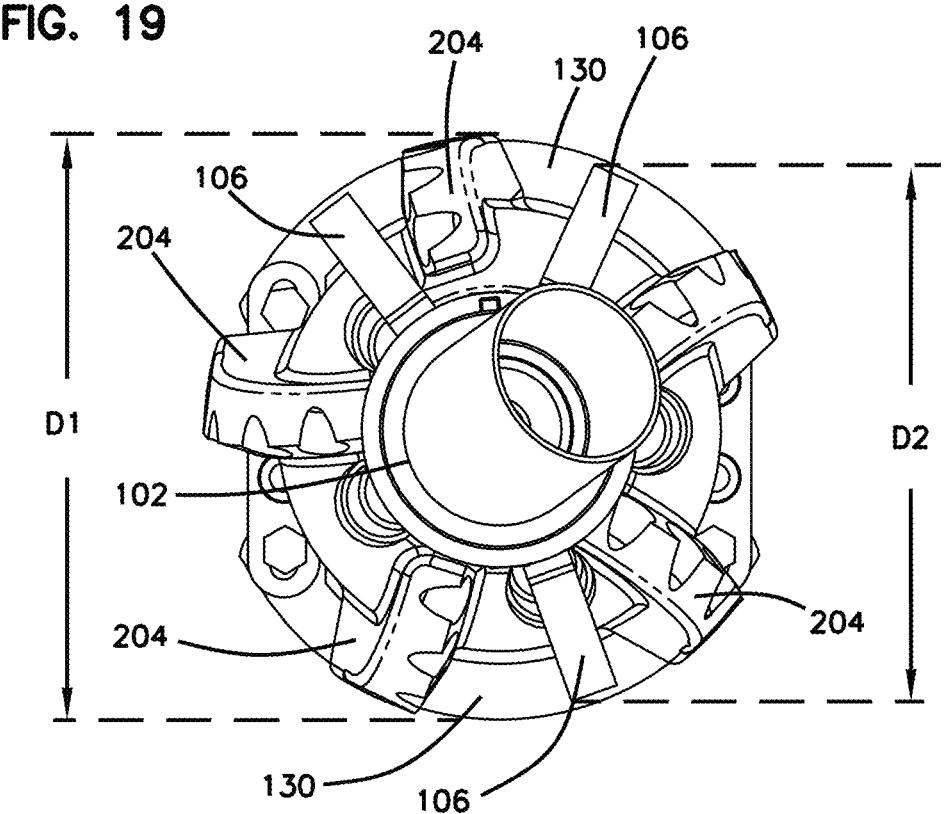
FIG. 19 is a front view of the pullback device attached to the rotary drill bit.
Figure 20:
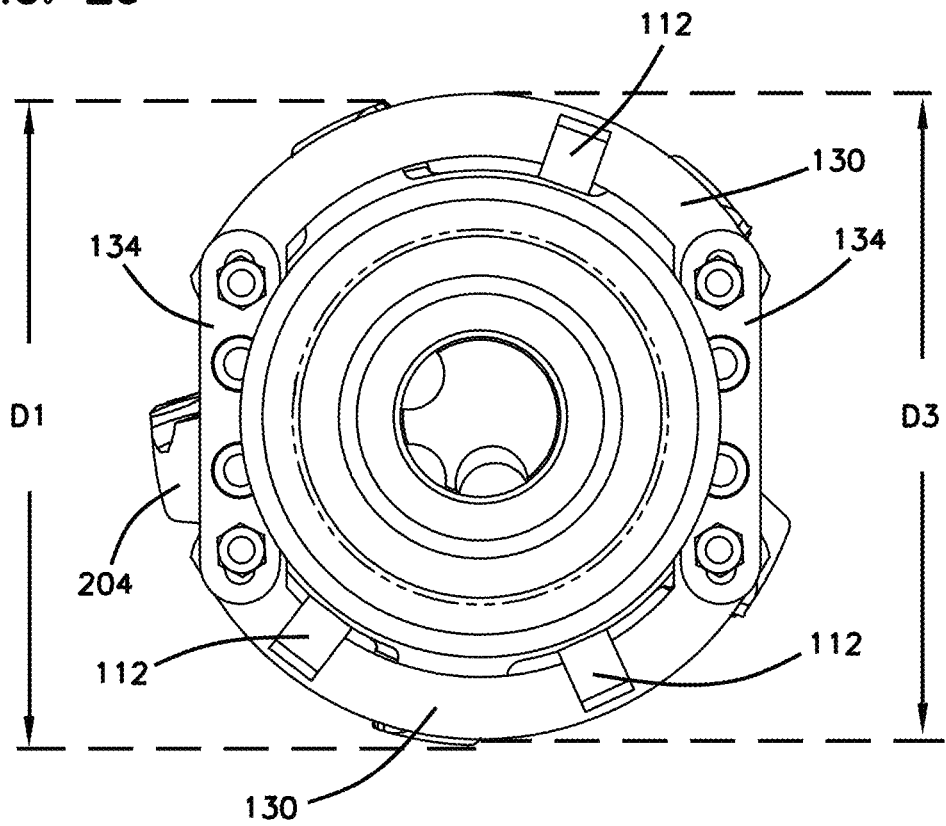
FIG. 20 is a rear view of the pullback device attached to the rotary drill bit.

FIGS. 19 and 20 are front and rear views, respectively, of the pullback device 100 attached to the rotary drill bit 200. As shown in FIGS. 19 and 20, the plurality of arms 106 fit between the plurality of vanes 204 on the rotary drill bit 200. As described above, when the pullback device 100 is attached to the rotary drill bit 200, the central axis PBD of the pullback device 100 is coincident with the central axis RDB of the rotary drill bit 200. The locking device 140 and collar 104 enable the plurality of arms 106 to slide and rotate about the central axis RDB of the rotary drill bit 200 between the vanes 204. This is advantageous because rotary drill bits are available in various configurations, and the vanes of a rotary drill bit may have a variety of configurations including a variety of quantities, shapes, and sizes. Thus, the ability to slide and rotate the arms 106 enhances the adaptability of the pullback device 100 for a variety of rotary drill bits.

As further shown in FIG. 19, the plurality of arms 106 define a diameter D2 that is less than or equal to a diameter D1 of the rotary drill bit 200. As shown in FIG. 20, the collar 104 defines a diameter D3 that is less than or equal to the diameter D1 of the rotary drill bit 200. The diameter D2 of the plurality of arms 106 and the diameter D3 of the collar 104 ensure that no part of the pullback device 100 exceeds the diameter D1 of rotary drill bit 200. Advantageously, this ensures that the pullback device 100 does not rub against the walls of a hole during a pullback operation, which may cause wear, friction, and possible failure of the pullback device 100. Therefore, as shown in FIGS. 19 and 20, the arms 106 fit between adjacent vanes 204 in the rotary drill bit 200 and do not exceed the distance the vanes 204 protrude from the rotary drill bit 200. Similarly, the collar 104 does not protrude beyond the diameter D1 of the rotary drill bit 200.

Figure 21:
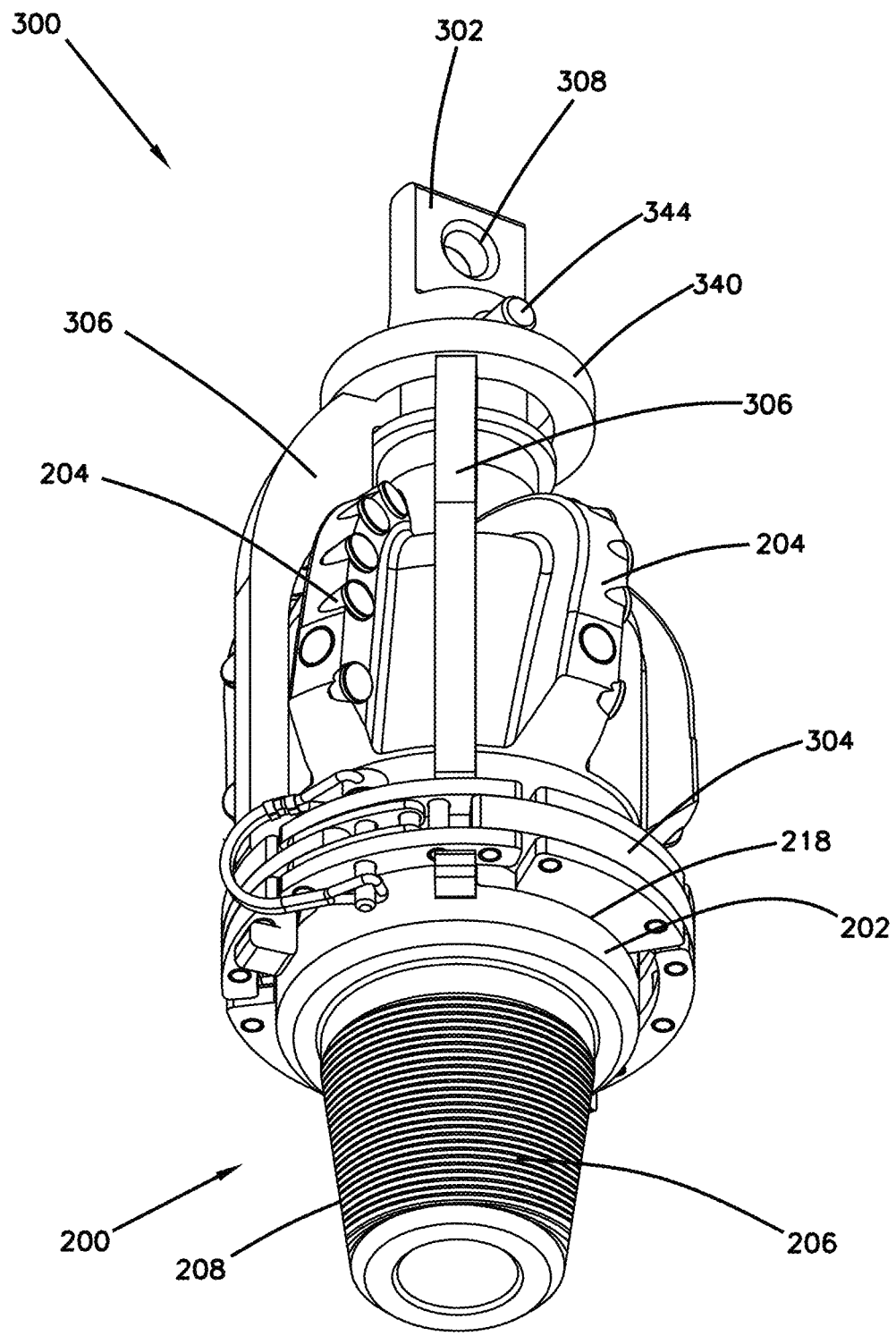
FIG. 21 is an isometric view a pullback device in accordance with another example of the present disclosure attached to the rotary drill bit.

FIG. 21 is an isometric view a pullback device 300 in accordance with another example of the present disclosure. As shown in FIG. 21, the collar 304 of the pullback device 300 is attached to the base 202 of the rotary drill bit 200. Also, the arms 306 of the pullback device 300 are positioned between the vanes 204 of the rotary drill bit 200.

Figure 22:
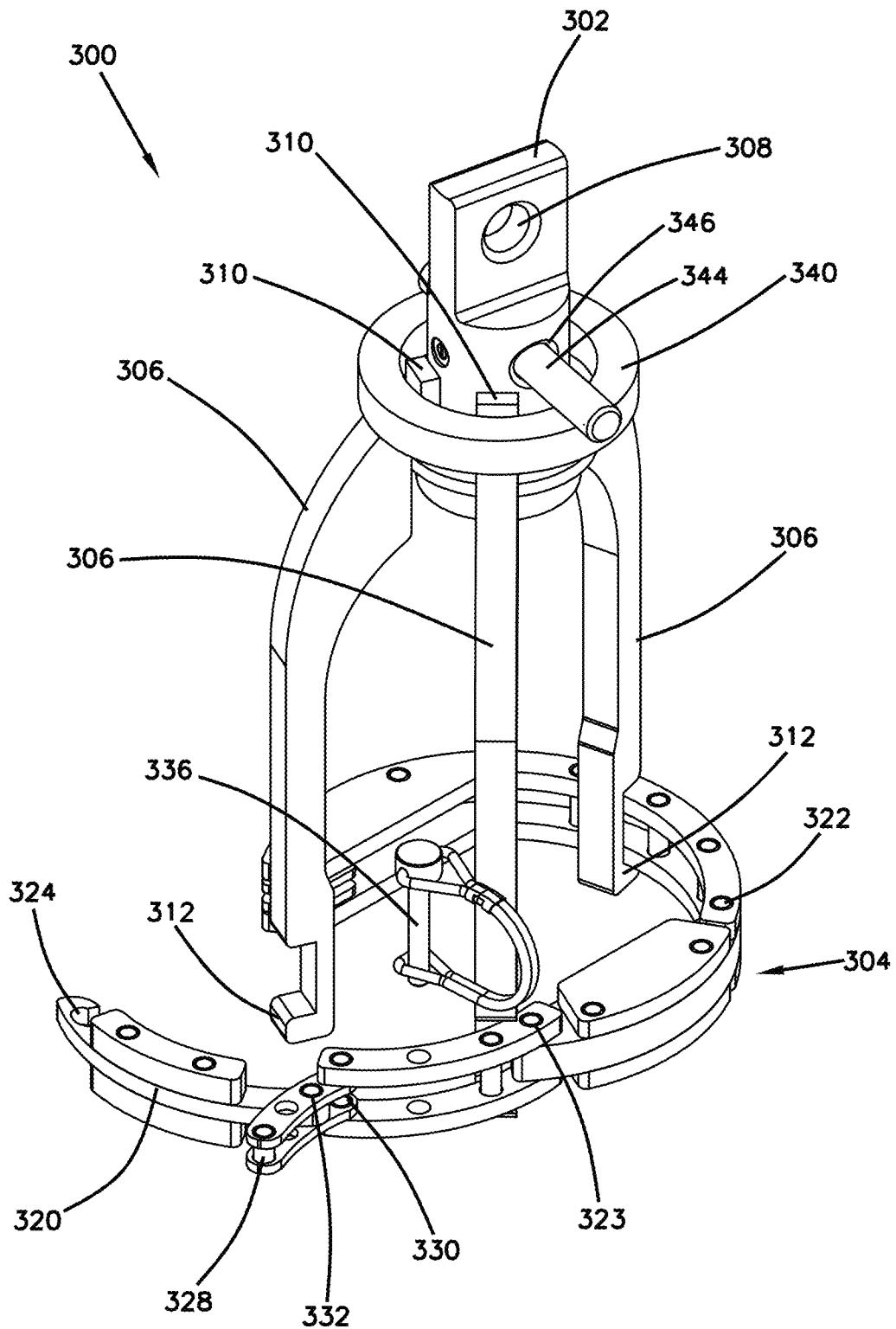
FIG. 22 is an isometric view of the pullback device of FIG. 21.

FIG. 22 is an isometric view of the pullback device 300. As shown in FIG. 22, the pullback device 300 includes a frame member 302, a collar 304, and arms 306.

The frame member 302 has at least one attachment location 308. The attachment locations 308 can be used to attach product to the pullback device 300.

The collar 304 attaches the pullback device 300 to the base 202 of the rotary drill bit 200. In certain examples where the rotary drill bit 200 includes one or more anchors 218, the collar 304 can engage at least one anchor 218 on the base 202. In other examples where the rotary drill bit 200 does not include an anchor 218, the collar 304 can clamp around the exterior face of the base 202 to attach the pullback device 300 to the base 202.

Each arm 306 has a first end 310 slidably engaged between a locking device 340 and the frame member 302, and a second end 312 slidably engaged with the collar 304. The arms 306 are slidable about the frame member 302 and the collar 304 such that the arms 306 can rotate about a central axis PBD of the pullback device 300. The locking device 340 is a solid washer, and a pin 344 is insertable into an aperture 346 of the frame member 302 for restraining the locking device 340 relative to the frame member 302.

Figure 23:
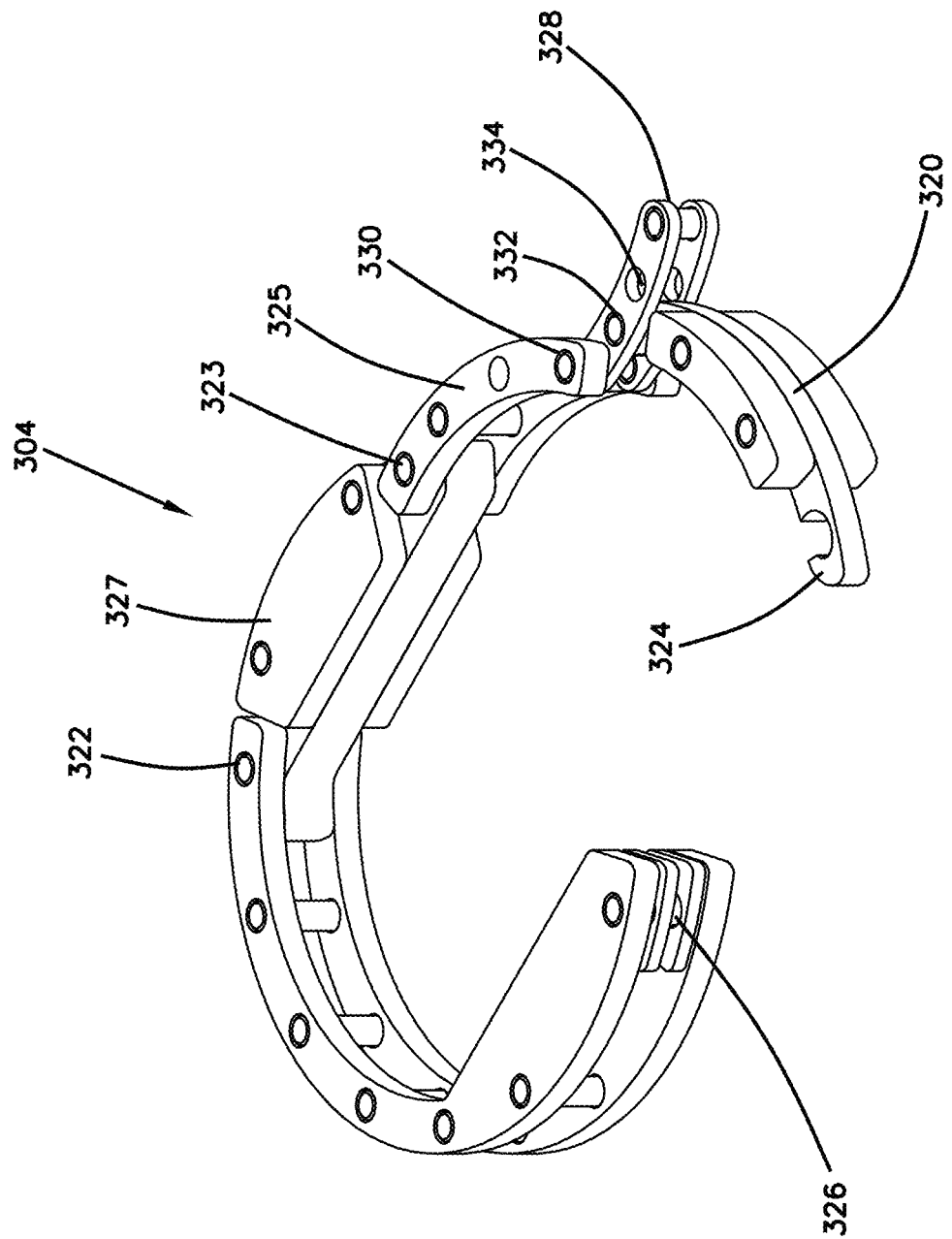
FIG. 23 is an isometric view of a collar of the pullback device of FIG. 21, the collar shown in an open position.

FIG. 23 is an isometric view of the collar 304 in an open position. The collar 304 includes a pivoting arm 320 that can be used to hook and fasten the collar 304 around the base 202 of the rotary drill bit 200. The pivoting arm 320 is attached at one end to the collar 304 by a hinge 322. An additional hinge 323 allows a first portion 325 of the pivoting arm 320 to pivot with respect to a second portion 327 of the pivoting arm 320 to provide further flexibility in allowing the collar 304 to wrap around the base 202. The pivoting arm 320 includes a latch 324 on an end of the first portion 325 that hooks onto a locket 326 to secure the collar 304 in a closed position around the base 202 (see FIG. 21).

The pivoting arm 320 further includes a swivel arm 328 that pivots in a first direction about a hinge 330 to pull the latch 324 onto the locket 326 due to the pivoting arm 320 being connected to the swivel arm 328 at the hinge 332. In this manner, the swivel arm 328 can be used to secure the collar 304 in the closed position around the base 202. The swivel arm 328 pivots in a second direction about the hinge 330 to push the latch 324 off the locket 326 and allow the collar 304 to be opened.

In some examples, the swivel arm 328 includes a bore 334 that receives a locking device such as the pin 336 to lock the swivel arm 328 in place relative to the collar 304, and thereby prevent the swivel arm 328 from pivoting about the hinge 330. The pin 336 is an example of one type of locking device that can be used to secure the swivel arm 328 in place, and a variety of locking devices such as simple bolts and nuts can be used to secure the swivel arm 328. In some examples, the collar 304 does not include the pin 336.

In the example depicted in FIGS. 21-23, the collar 304 has a substantially circular shape to wrap around the base 202 of the rotary drill bit 200 and engage at least one surface on the base 202 such as the one or more anchors 218. However, the collar 304 may have a variety of configurations, shapes, and sizes to match the configurations, shapes, sizes, and placements of the base 202 of the rotary drill bit 200.

Figure 24:
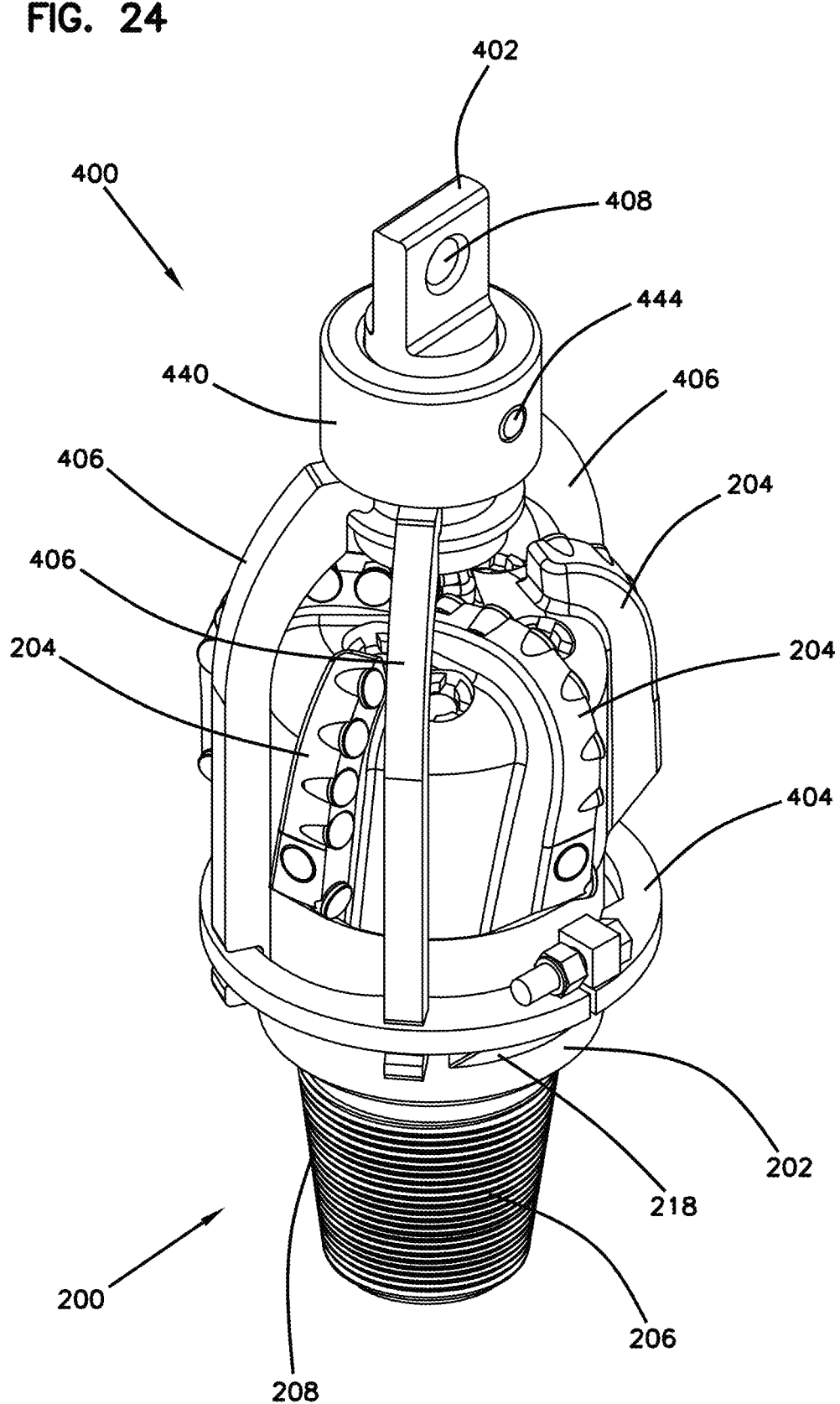
FIG. 24 is an isometric view a pullback device in accordance with another example of the present disclosure attached to the rotary drill bit.

FIG. 24 is an isometric view a pullback device 400 in accordance with another example of the present disclosure. As shown in FIG. 24, the collar 404 of the pullback device 400 is attached to the base 202 of the rotary drill bit 200. Also, the arms 406 of the pullback device 400 are positioned between the vanes 204 of the rotary drill bit 200.

Figure 25:
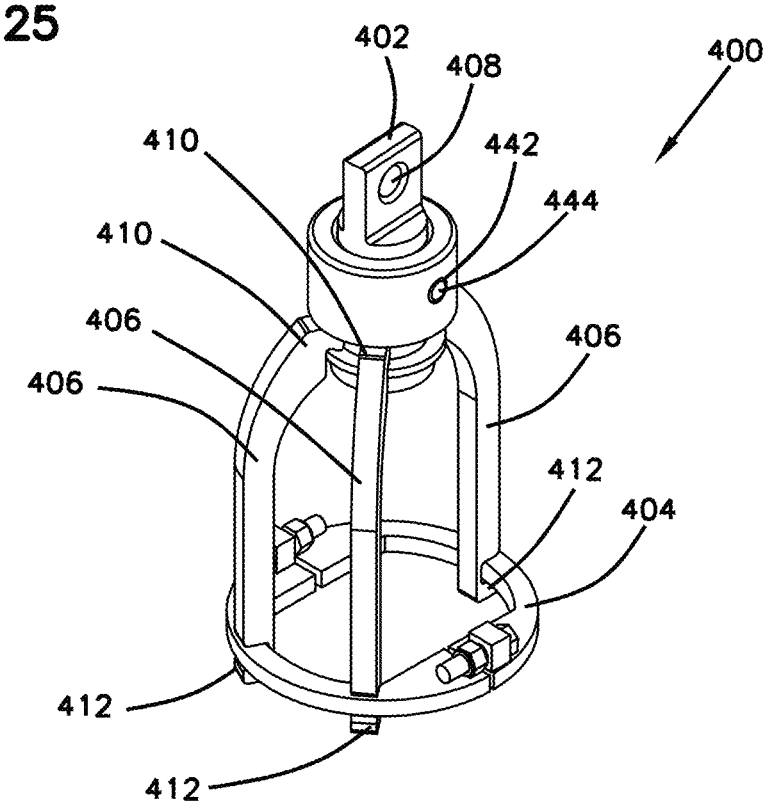
FIG. 25 is an isometric view of the pullback device of FIG. 24.

FIG. 25 is an isometric view of the pullback device 400. As shown in FIG. 25, the pullback device 400 includes a frame member 402, a collar 404, and arms 406.

The frame member 402 has at least one attachment location 408. The attachment locations 408 can be used to attach product to the pullback device 400.

The collar 404 attaches the pullback device 400 to the base 202 of the rotary drill bit 200. In certain examples where the rotary drill bit 200 includes one or more anchors 218, the collar 404 can engage at least one anchor 218 on the base 202. In other examples where the rotary drill bit 200 does not include an anchor 218, the collar 404 can clamp around the exterior face of the base 202 to attach the pullback device 400 to the base 202.

Each arm 406 has a first end 410 slidably engaged between a locking device 440 and the frame member 402, and a second end 412 slidably engaged with the collar 404. The arms 406 are slidable about the frame member 402 and the collar 404 such that the arms 406 can rotate about a central axis PBD of the pullback device 400. The locking device 440 is secured to the frame member 402 by a pin 444 inserted in aperture 442.

Figure 26:
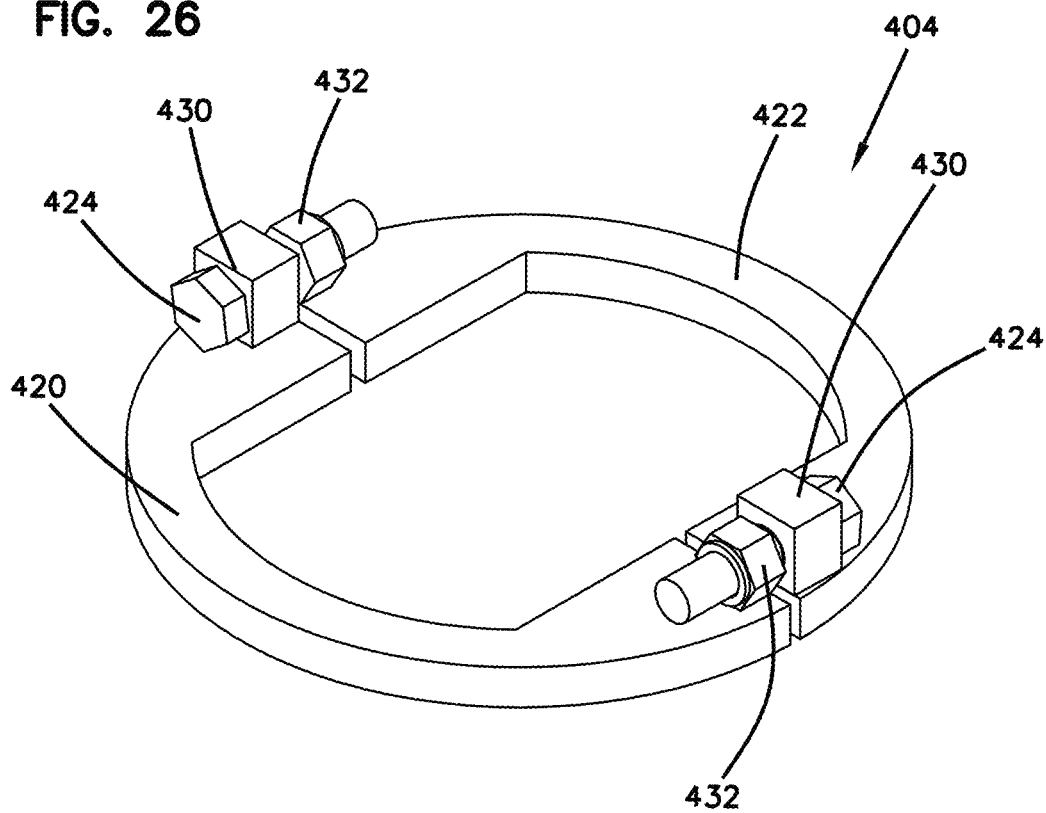
FIG. 26 is an isometric view of a collar of the pullback device of FIG. 24.

FIG. 26 is an isometric view of the collar 404. As shown in FIG. 26, the collar 404 includes two halves 420, 422 that are secured together at corresponding attachment locations 430, 432 by fixtures such as bolts 424. Each of the halves 420, 422 has a rounded, semi-circular shape having a substantially C shape configuration that fits around the base 202 of the rotary drill bit 200. It is contemplated that the collar 404 (including the halves 420, 422) may have a variety of configurations, shapes, and sizes to match the configurations, shapes, sizes, and placements of the anchors 218 on the base 202 of the rotary drill bit 200. Additionally, a variety of fixtures and means, alternative to the bolts 424 may be used to fix the halves 420, 422 together.

Figure 27:
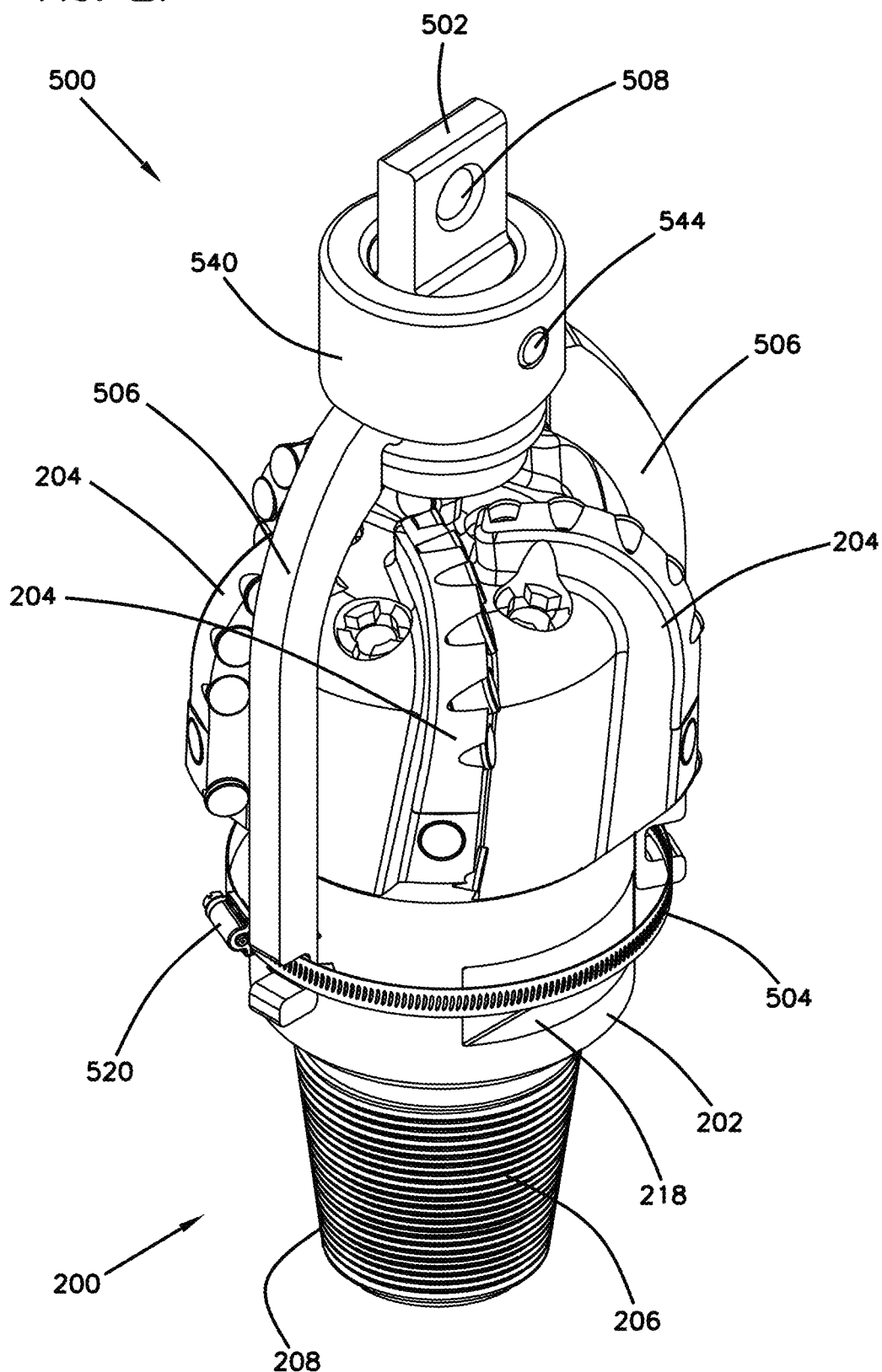
FIG. 27 is an isometric view a pullback device in accordance with another example of the present disclosure attached to the rotary drill bit.

FIG. 27 is an isometric view a pullback device 500 in accordance with another example of the present disclosure. As shown in FIG. 27, the collar 504 of the pullback device 500 is attached to the base 202 of the rotary drill bit 200. Also, the arms 506 of the pullback device 500 are positioned between the vanes 204 of the rotary drill bit 200.

Figure 28:
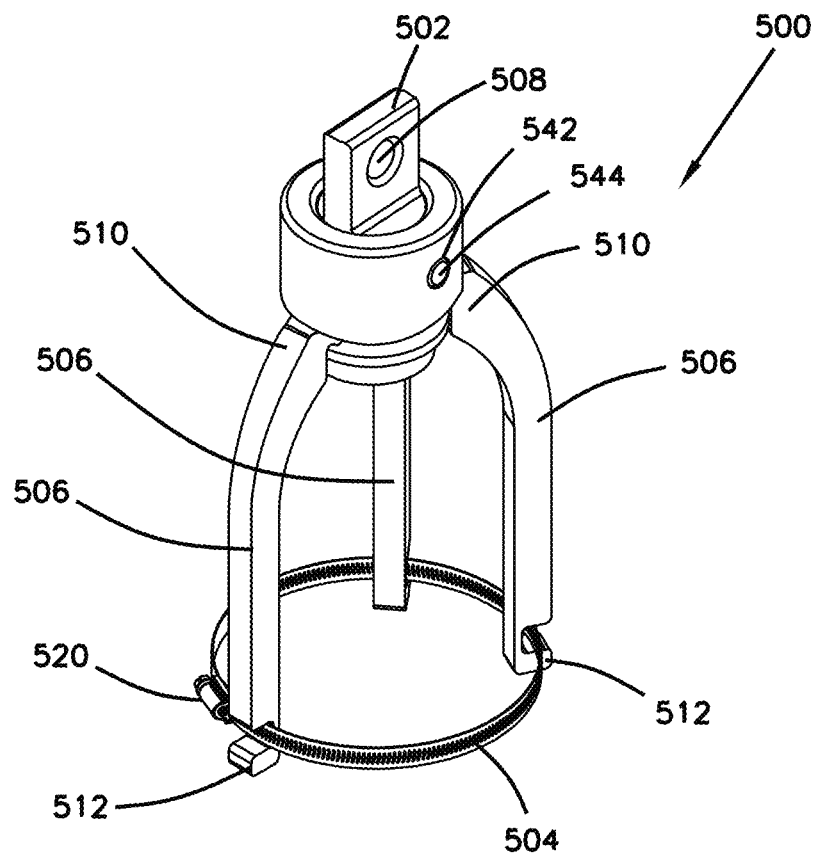
FIG. 28 is an isometric view of the pullback device of FIG. 27.

FIG. 28 is an isometric view of the pullback device 500. As shown in FIG. 28, the pullback device 500 includes a frame member 502, a collar 504, and arms 506.

The frame member 502 has at least one attachment location 508. The attachment locations 508 can be used to attach product to the pullback device 500.

Each arm 506 has a first end 510 slidably engaged between a locking device 540 and the frame member 502, and a second end 512 engaged with the collar 404. The locking device 540 is secured to the frame member 502 by a pin 544 inserted in aperture 542. The collar 504 wraps around the second ends 512 of the arms 506.

Figure 29:
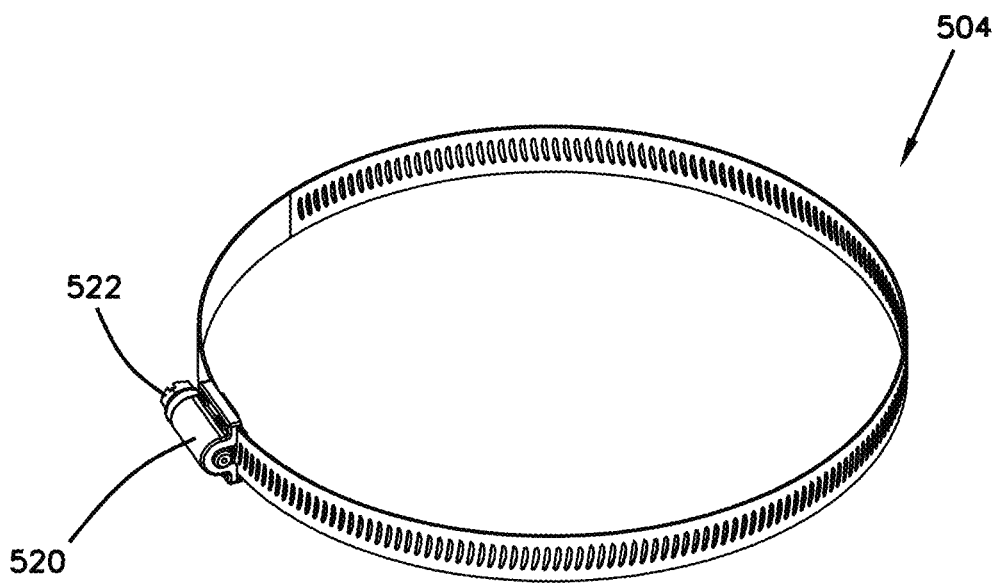
FIG. 29 is an isometric view of a collar of the pullback device of FIG. 27.

FIG. 29 is an isometric view of the collar 504. In this example, the collar 504 is similar to a hose clamp and can be secured around the base 202 of the rotary drill bit 200 to secure the pullback device 500 to the base 202. The collar 504 can be tightened by a locking mechanism 520 to restrain the circumference of the collar 504 around the base 202 and secure the pullback device 500 to the base 202. The locking mechanism 520 can include a screw 522 that can be twisted to restrain the circumference of the collar 504. In certain examples, the locking mechanism 520 works similar to a zip tie.

Figure 30:
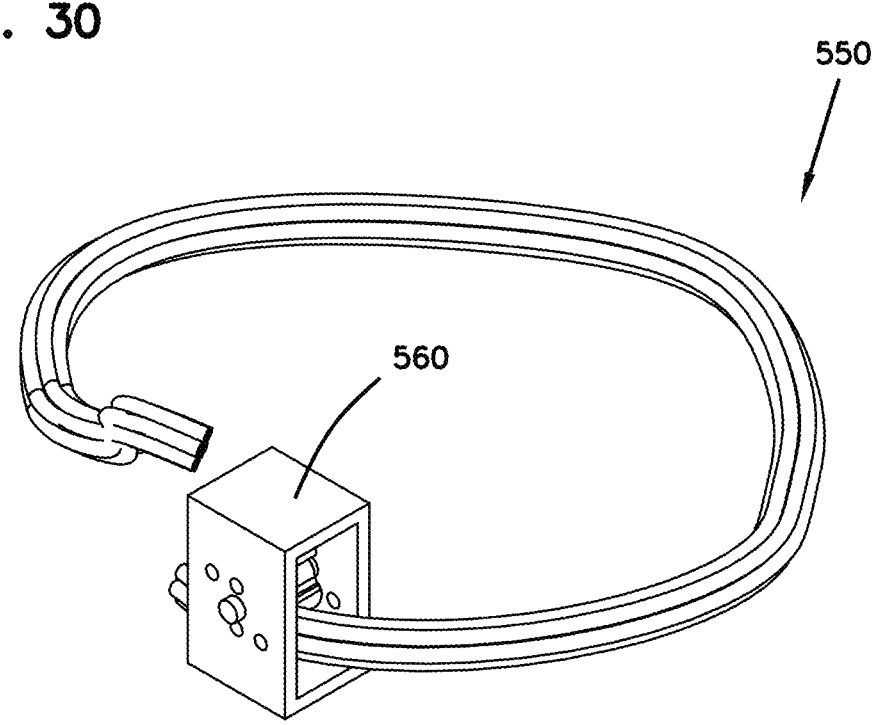
FIG. 30 is an isometric view of another collar of the pullback device of FIG. 27, the collar shown in an open position.
Figure 31:
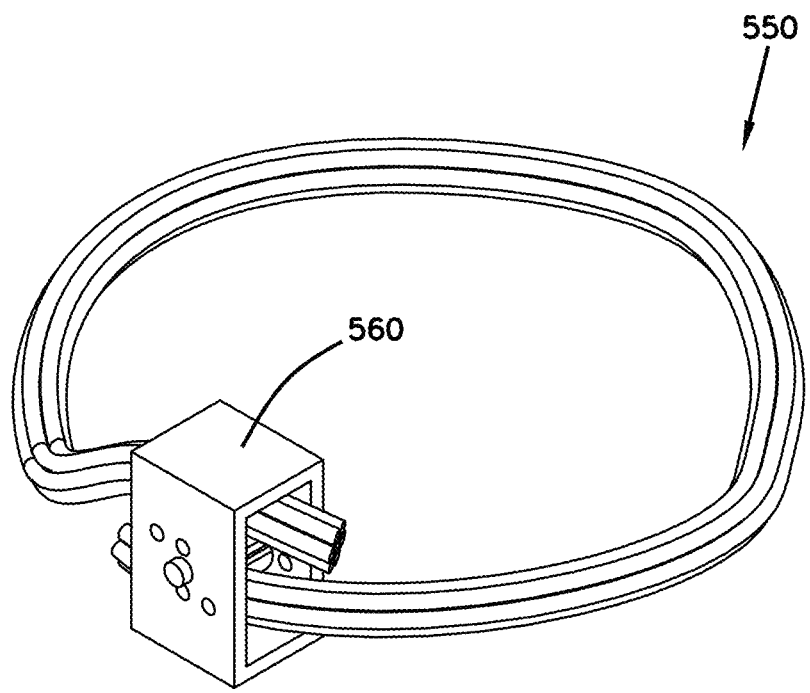
FIG. 31 is an isometric view of the collar of FIG. 30 in a closed position.

FIGS. 30 and 31 are isometric views of an alternative collar 550 that can be used with the pullback device 500. In this example, the collar 550 is a cable that can be opened (see FIG. 30) to wrap around the second ends 512 of the arms 506 and the base 202. The collar 550 can be tightened around the second ends 512 and the base 202 by a locking mechanism 560 that can be used to restrain the circumference of the collar 550 around the base 202 to secure the pullback device 500 to the base 202. In certain examples, the locking mechanism 560 works similar to a zip tie.

Figure 33:
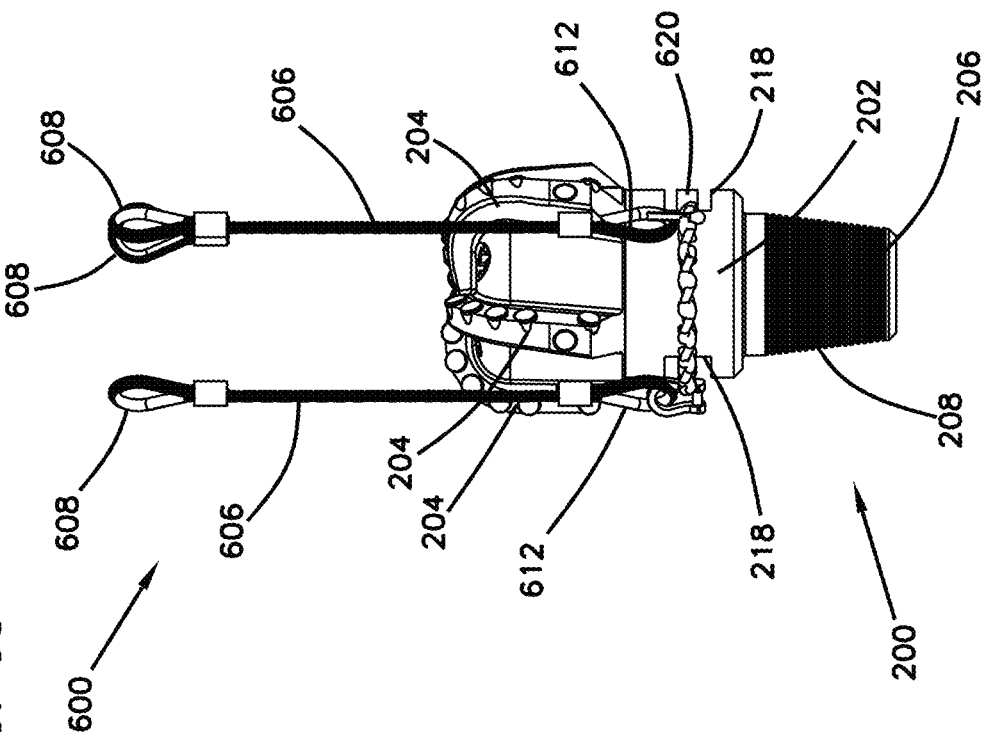
FIG. 33 is a side view the pullback device and the rotary drill bit of FIG. 32.
Figure 32:
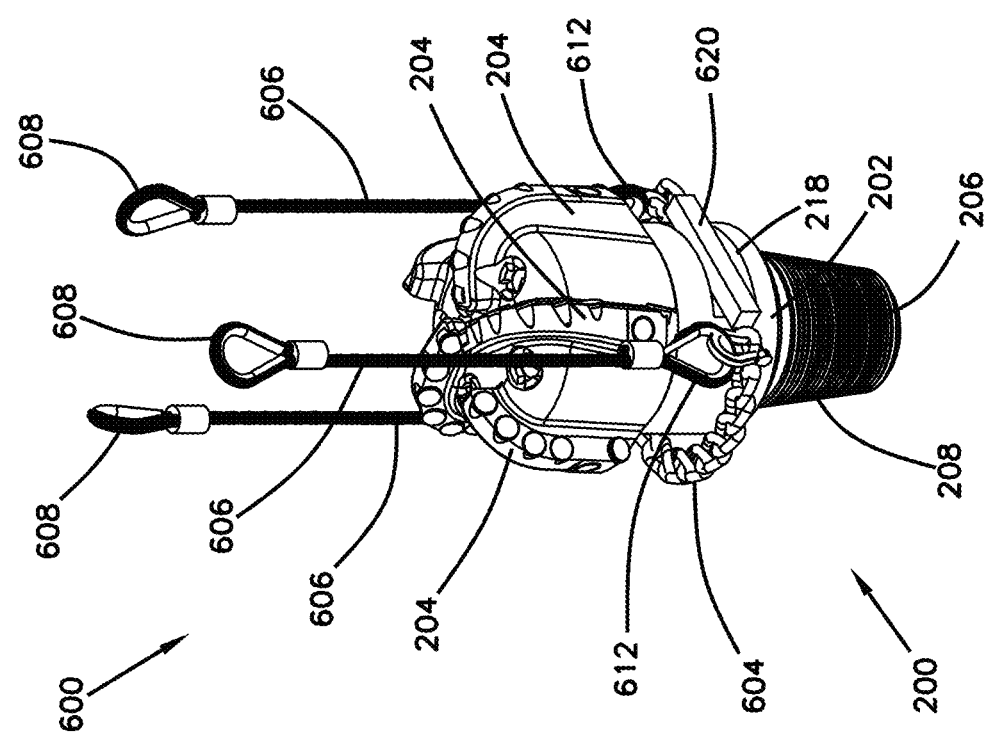
FIG. 32 is an isometric view a pullback device in accordance with another example of the present disclosure attached to the rotary drill bit.

FIG. 32 is an isometric view a pullback device 600 in accordance with another example of the present disclosure. FIG. 33 is a side view the pullback device 600 attached to the base 202. As shown in FIGS. 32 and 33, the collar 604 of the pullback device 600 is attached to the base 202 of the rotary drill bit 200. Also, the arms 606 of the pullback device 600 are positioned between the vanes 204 of the rotary drill bit 200.

Figure 34:
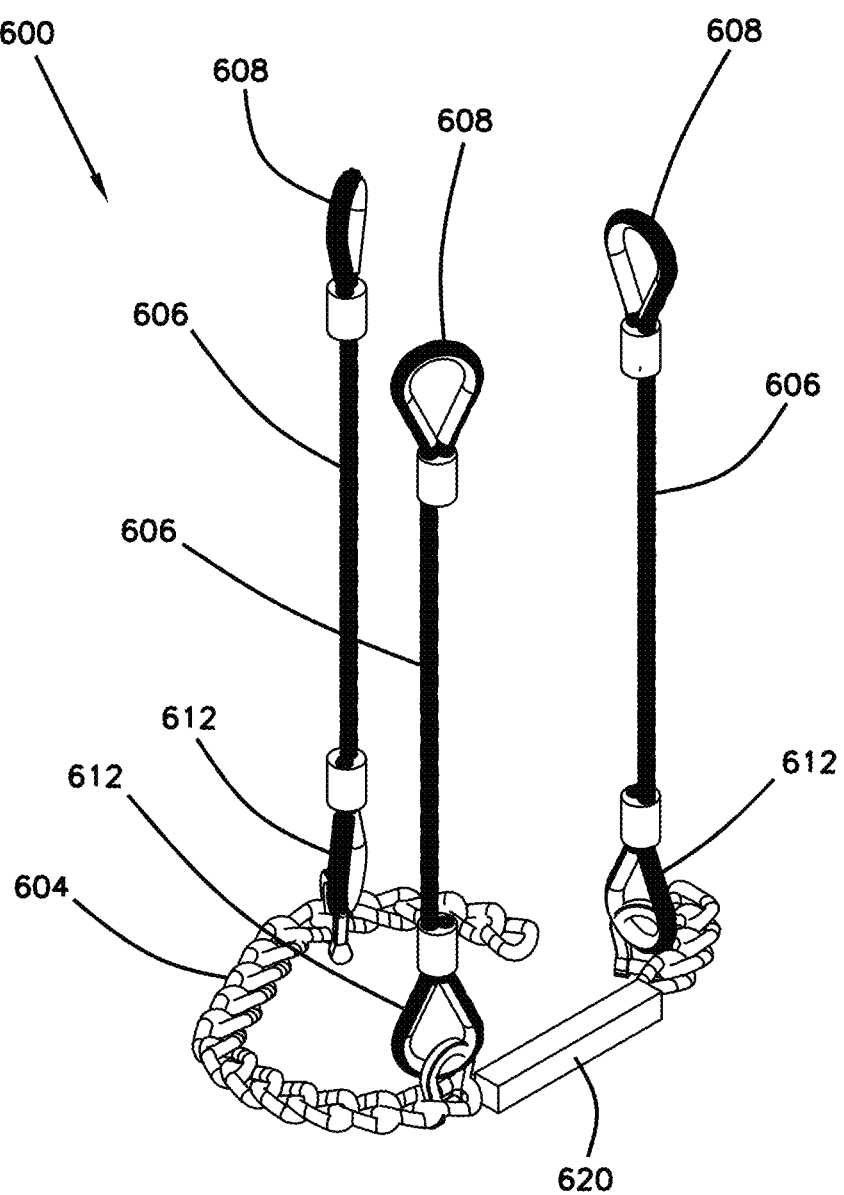
FIG. 34 is an isometric view of the pullback device of FIG. 32, with the collar shown in an open position.

FIG. 34 is an isometric view of the pullback device 600. As shown in FIGS. 32-34 the pullback device 600 includes a collar 604 and a plurality of arms 606. In this example, the arms 606 are cables that include attachment locations 608 at a first end. The attachment locations 608 can be used to attach product to the pullback device 600. In alternative examples, the pullback device 600 may include the collar 604, and the frame member 102, locking device 140, and arms 106 of the pullback device 100. Also, in alternative embodiments, the arms 606 may be used with the collars (e.g., 104, 304, 404, and 504) in the embodiments of the pullback device that are described above.

Referring still to FIGS. 32-34, the arms 606 include attachment locations 612 at an opposite second end. The attachment locations 612 engage corresponding attachment locations on the collar 604 to secure the arms 606 to the collar 604.

In this example, the collar 604 is a chain. The collar 604 wraps around the base 202 of the rotary drill bit 200 (see FIGS. 32 and 33) to secure the pullback device 600 to the base 202 of the rotary drill bit 200. The collar 604 is secured around the base 202 by attaching two ends of the collar 604 together.

In certain examples, the collar 604 can include a shackle 620 having a shape and size that corresponds to the shape and size of the anchors 218 in the base 202. Advantageously, the shackle 620 aligns and mates with the orthogonal surfaces 220, 222 in the base 202 of the rotary drill bit 200 and ensures that the collar 604 does not rotate or move with respect to the base 202 during pullback.

Figure 35:
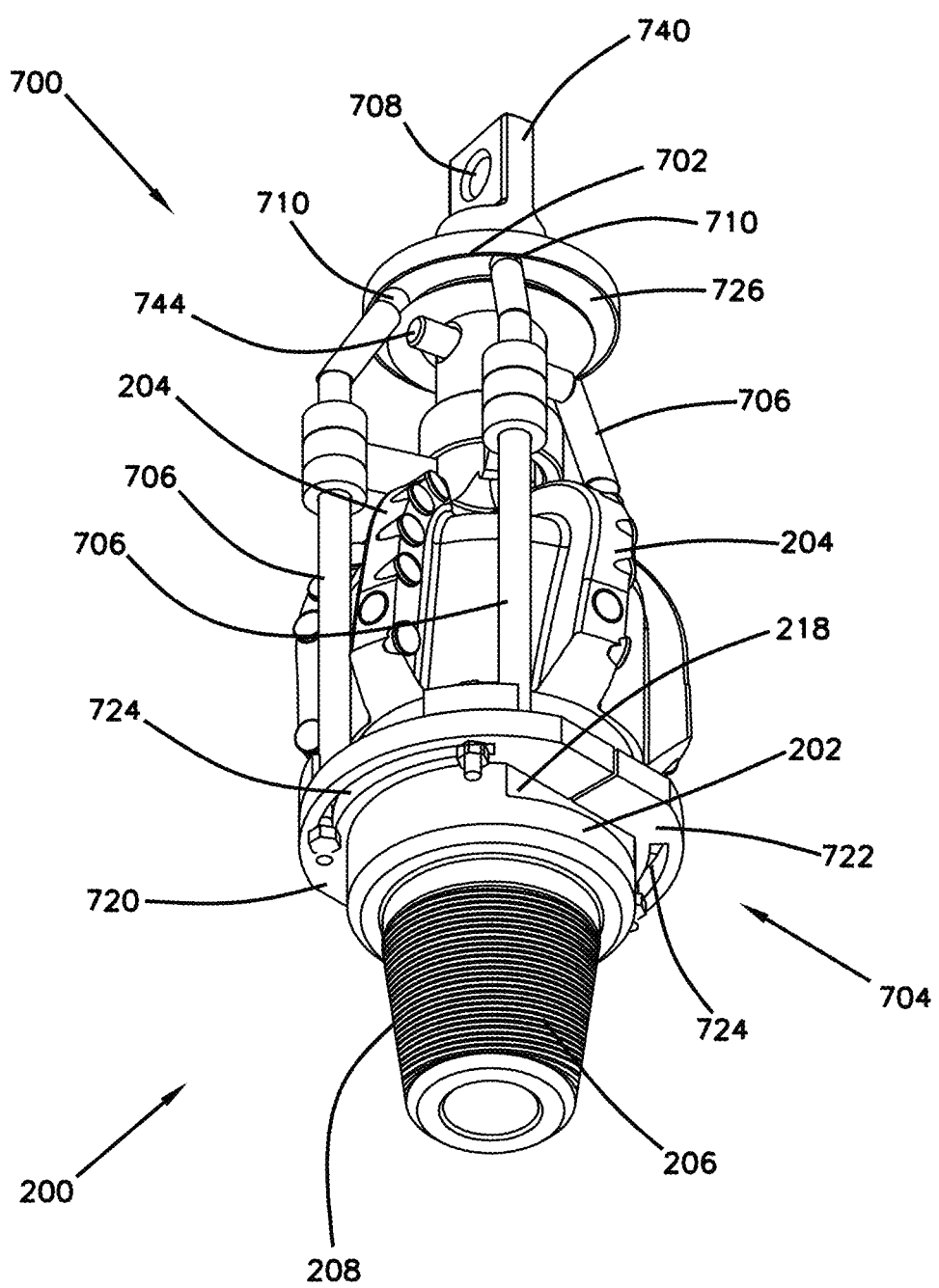
FIG. 35 is an isometric view a pullback device in accordance with another example of the present disclosure attached to the rotary drill bit.

FIG. 35 is an isometric view a pullback device 700 in accordance with another example of the present disclosure. As shown in FIG. 35, the collar 704 of the pullback device 700 is attached to the base 202 of the rotary drill bit 200. Also, the arms 706 of the pullback device 700 are positioned between the vanes 204 of the rotary drill bit 200.

Figure 36:
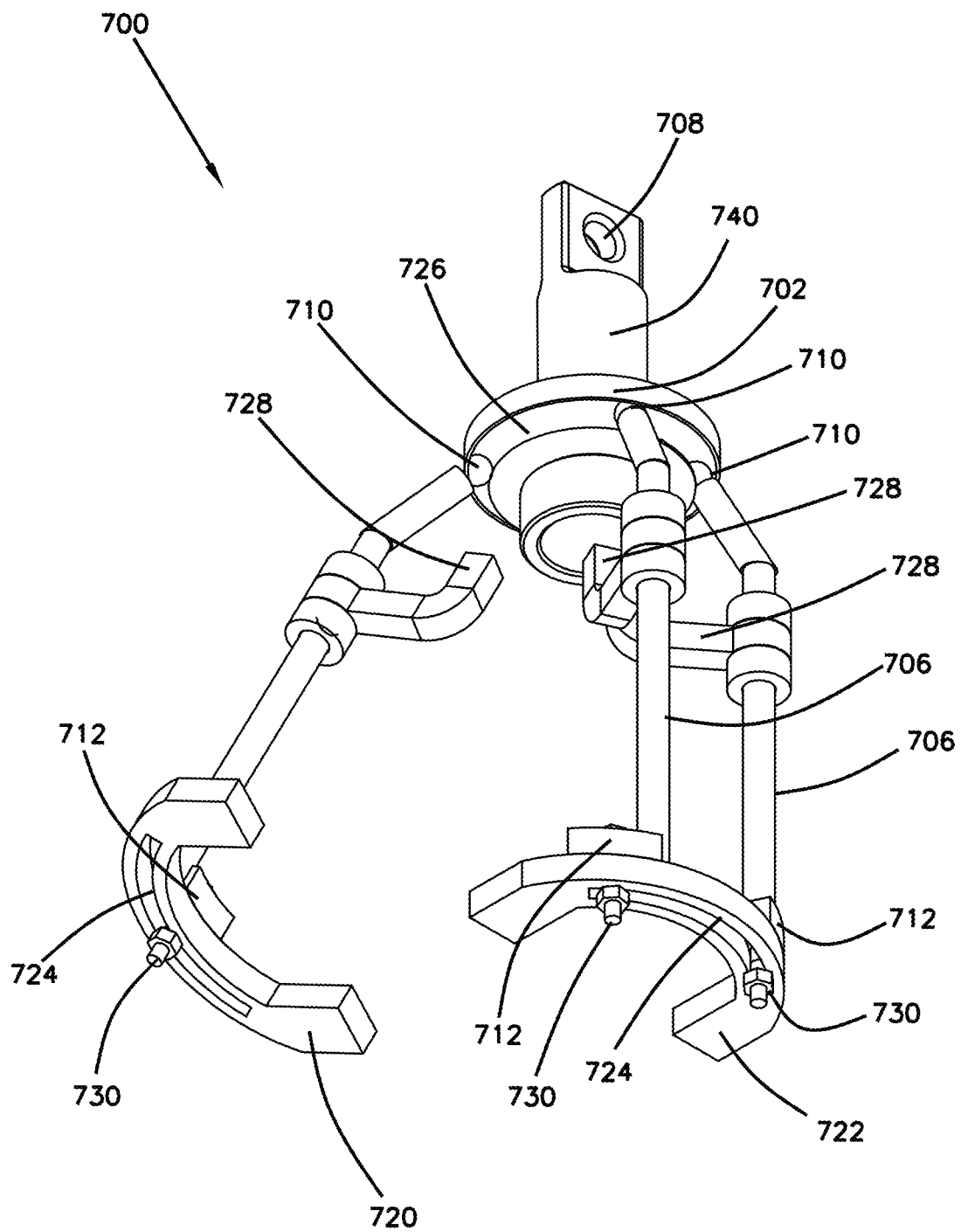
FIG. 36 is an isometric view of the pullback device of FIG. 35 in an open position.
Figure 38:
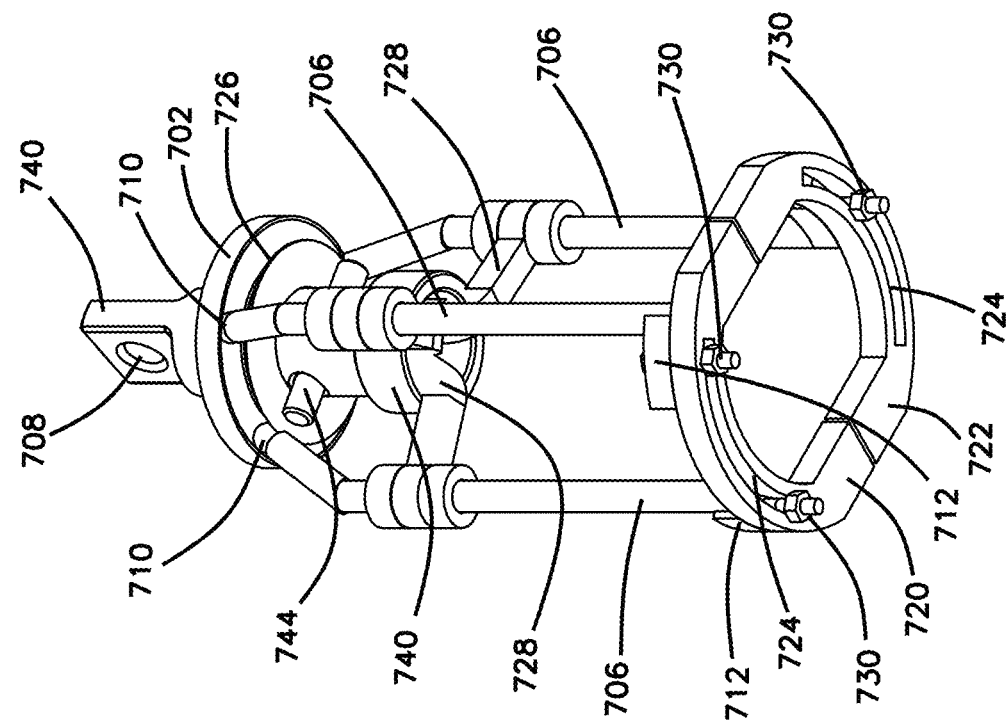
FIG. 38 is another view of the pullback device of FIG. 35 in the closed position.
Figure 37:
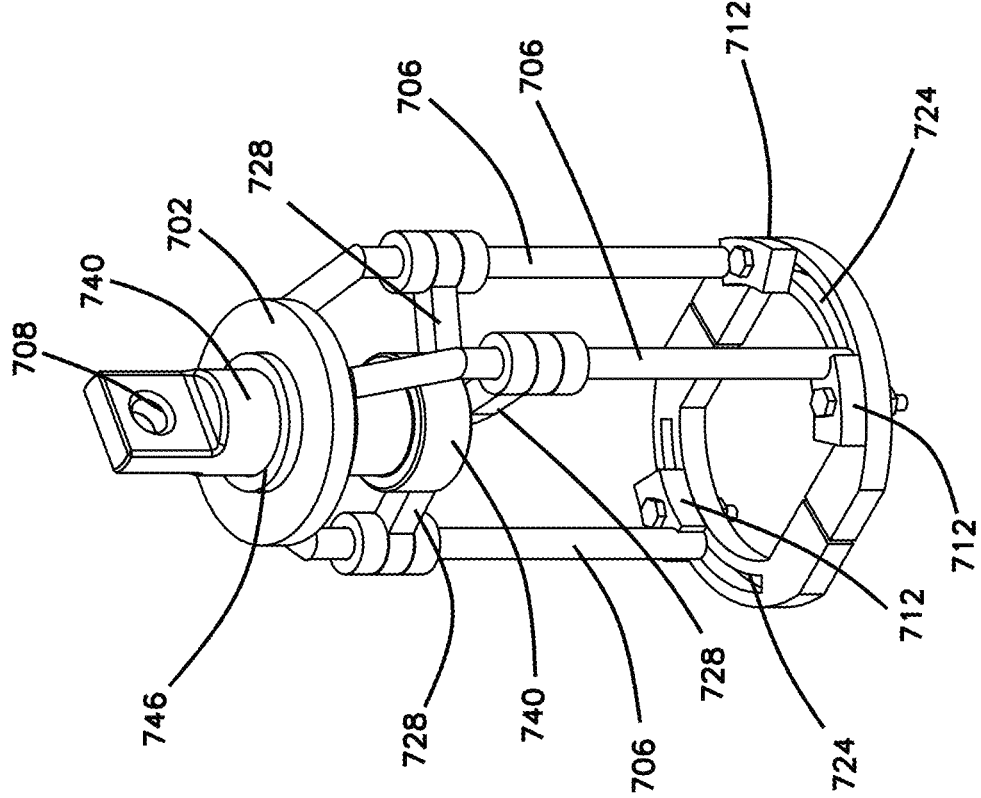
FIG. 37 is a view of the pullback device of FIG. 35 in a closed position.
Figure 39:
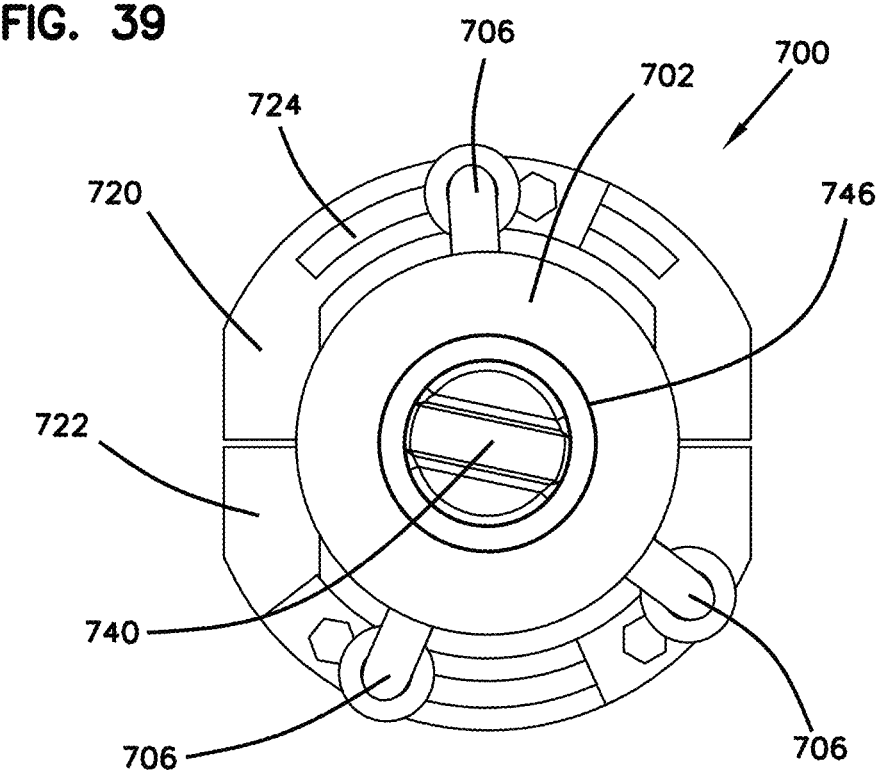
FIG. 39 is a top view of the pullback device of FIG. 35 in the locked position.
Figure 40:
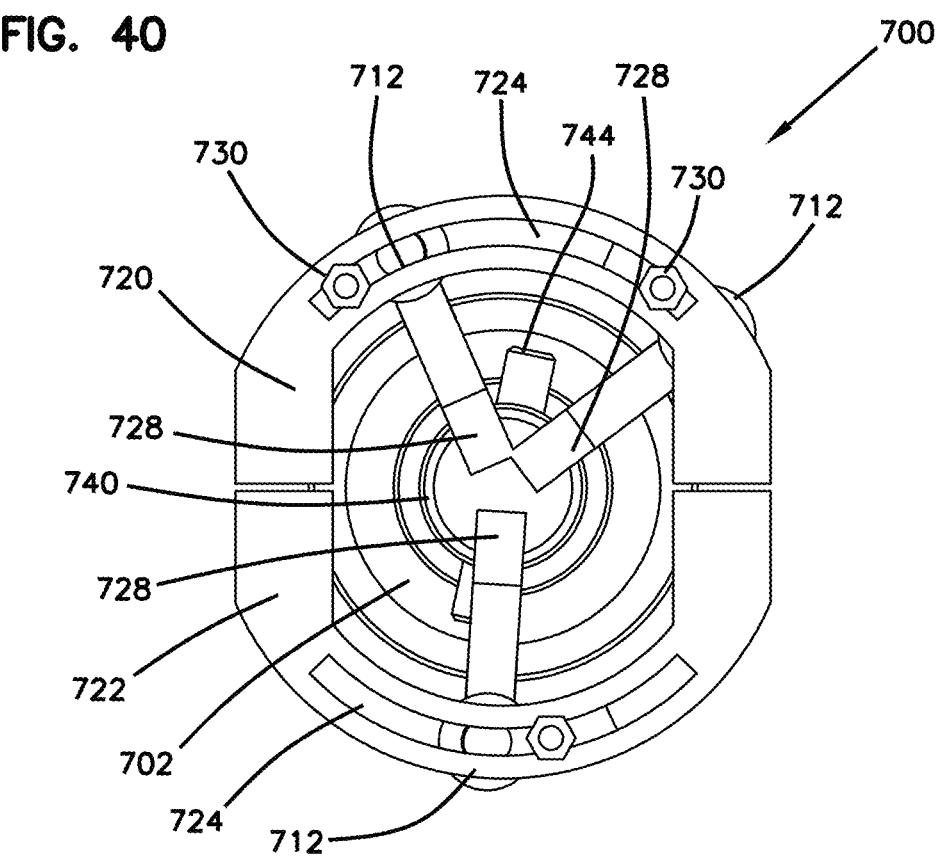
FIG. 40 is a bottom view of the pullback device of FIG. 35 in the locked position.

FIG. 36 is an isometric view of the pullback device 700 in an open position. FIGS. 37 and 38 are isometric views of the pullback device 700 in a closed position. FIGS. 39 and 40 are top and bottom views, respectively, of the pullback device 700 in the closed position. Referring now to FIGS. 35-40, the pullback device 700 includes a frame member 702, a collar 704, and arms 706. Each arm 706 has a first end 710 pivotally and slidably engaged in a groove 726 in the frame member 702, and a second end 712 slidably engaged with grooves 724 in opposing halves 720, 722 of the collar 704.

The first ends 710 of the arms 706 include ballpoint pivot joints that engage the groove 726 allowing the arms 706 to pivot with respect to the frame member 702. The ballpoint pivot joints are also slidable in the groove 726 about the frame member 702 such that the arms 706 can rotate about a central axis PBD of the pullback device 700.

A locking device 740 is insertable through an aperture 746 of the frame member 702 and fits around an extension 728 of each arm 706 forming a locking portion (e.g., hook-shaped) for restraining the pivotal movement of the arms 706 with respect to the frame member 702 when the pullback device 700 is in the closed position. Thus, the frame member 702 is formed as a collar, slidable along the locking device 740. A pin 744 can be inserted through the locking device 740 for securing the locking device 740 relative to the frame member 702 in the axial direction with respect to the central axis PBD of the pullback device 700. Additionally, the locking device 740 has at least one attachment location 708. The attachment location 708 can be used to attach product to the pullback device 700 when the locking device 740 is secured to the frame member 702 with the pin 744.

The collar 704 attaches the pullback device 700 to the base 202 of the rotary drill bit 200. In certain examples where the rotary drill bit 200 includes one or more anchors 218, the collar 404 can engage at least one anchor 218 on the base 202. In other examples where the rotary drill bit 200 does not include an anchor 218, the collar 404 can clamp around the exterior face of the base 202 to attach the pullback device 400 to the base 202.

The collar 704 includes halves 720, 722 that pivot between the open and closed positions when the first ends 710 of the arms 706 pivot in the groove 726 of the frame member 702. In the closed position, the locking device 740 insertable through the frame member 702 to fit over the extensions 728 to prevent the arms 706 from pivoting and to thereby lock the halves 720, 722 of the collar 704 together. In this manner, the collar 704 can be locked around the base 202 of the rotary drill bit 200.

Each of the halves 720, 722 include grooves 724 that allow the arms 706 to slide with respect to the collar 704 while the arms 706 are prevented by the locking device 740 from pivoting with respect to the frame member 702. As shown, the second ends 712 of the arms 706 are secured in the grooves 724 by a fixture 730 such as a bolt and nut.

Each of the halves 720, 722 has a rounded, semi-circular shape, such as a substantially C shape configuration, that fits around the base 202 of the rotary drill bit 200. It is contemplated that the collar 704 (including the halves 720, 722) may have a variety of configurations, shapes, and sizes to match the configurations, shapes, and placements of the anchors 218 on the base 202 of the rotary drill bit 200.

Figure 41:
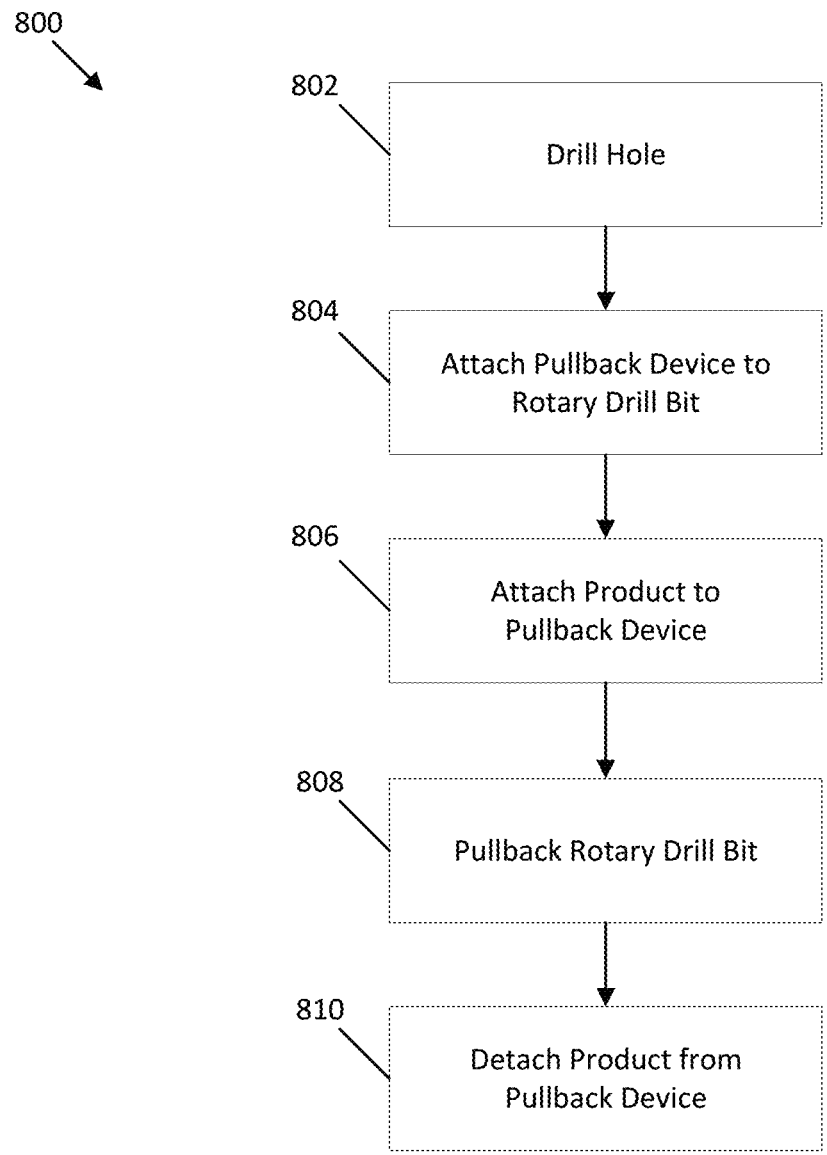
FIG. 41 illustrates a method of installing product in a hole.

FIG. 41 illustrates a method 800 of installing product in a hole. The method 800 includes a step 802 of using a rotary drill bit having a plurality of vanes and cutters to drill a hole from a start location at an uphole end to an end location at a downhole end.

Next, the method 800 includes a step 804 of attaching a pullback device to a base of the rotary drill bit at the end location. A trench can be dug at a downhole end to facilitate attachment of the pullback device to the rotary drill bit after completion of the drilling operation so that the pullback device can be used to install product in the ground during a pullback operation. In some examples, the trench is an end location Step 804 includes positioning a plurality of arms of the pullback device between the plurality of vanes before attaching a collar of the pullback device to the base. In some examples, step 804 includes inserting a locking device onto the pullback device, the locking device allowing the plurality of arms to rotate about a central axis of the pullback device while preventing radial and axial movement between the plurality of arms and the pullback device. In some examples, step 804 includes inserting a pin through an aperture in the pullback device for restraining the locking device relative to the pullback device.

Next, the method 800 includes a step 806 of attaching product to the pullback device at the end location. In step 806, the product can be directly attached to an attachment location on the pullback device or can be indirectly attached to an attachment location on the pullback device by connecting the product first to a swivel device, and then connecting the swivel device to an attachment location on the pullback device. The swivel device can prevent the product from rotating about the central axis of the rotary drill bit inside the hole when the pullback device is pulled back through the hole.

Next, the method 800 includes a step 808 of pulling back the rotary drill bit from the end location to the start location. During pullback, the drill rod assemblies are removed from the drill string as the drill string is pulled back through the hole.

Next, the method 800 includes a step 810 of detaching the product from the pullback device at the start location. After the product is detached, the product is left installed in the hole. In some examples, step 810 of the method 800 may include removing the pin from the pullback device, removing the locking device from the pullback device, disengaging the collar from the base of the rotary drill bit, and removing the pullback device from the rotary drill bit.

Figure 42:
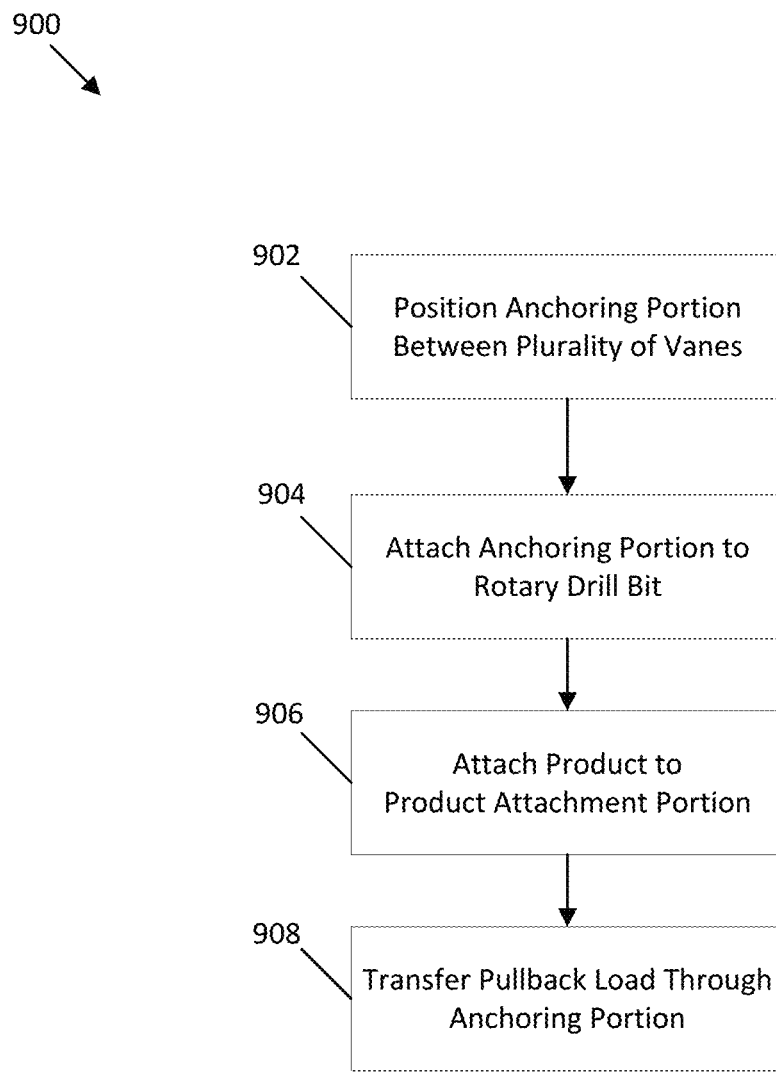
FIG. 42 illustrates a method of pulling back product in a hole drilled by a rotary drill bit coupled to a distal end of a drill string.

FIG. 42 illustrates a method 900 of pulling back product in a hole drilled by a rotary drill bit coupled to a distal end of a drill string. The rotary drill bit has a base defining a central axis about which the rotary drill bit rotates during drilling and a plurality of vanes extending from the base. Each vane has a plurality of cutters. The method 900 includes a step 902 of positioning an anchoring portion of a pullback device between the plurality of vanes on the rotary drill bit. Next, the method 900 includes a step 904 of attaching the anchoring portion to the rotary drill bit. Next, the method 900 includes a step 906 of attaching the product to a product attachment portion of the pullback device. Next, the method 900 includes a step 908 of pulling back the product through the hole by transferring a pullback load from the anchoring portion of the pullback device to the base of the rotary drill bit. In certain examples, the pullback load is transferred from the anchoring portion to at least one surface on the base, the at least one surface being orthogonal to the central axis of the rotary drill bit.

Figure 43:
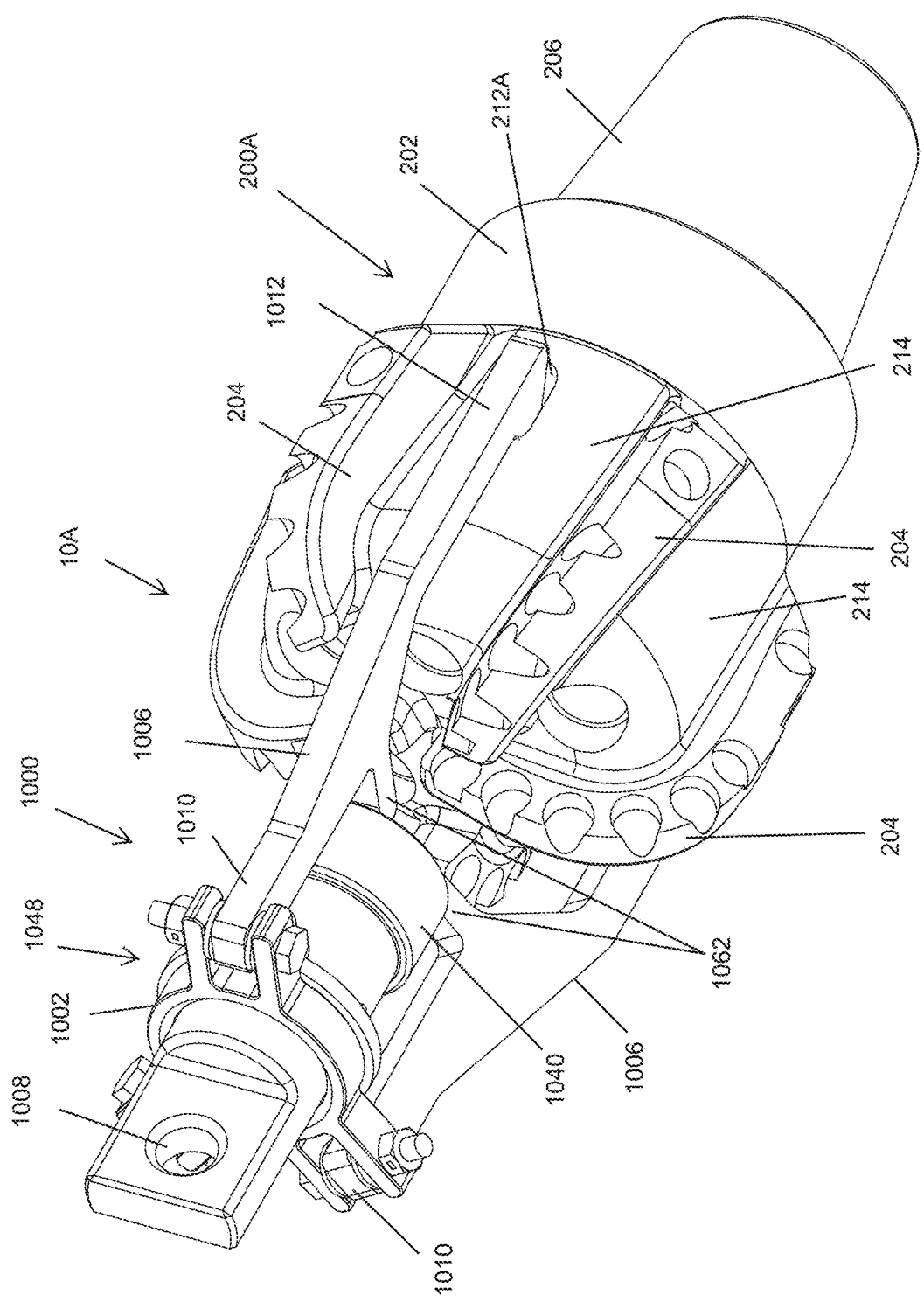
FIG. 43 is an isometric view of a pullback system, including a pullback device and a rotary drill bit, according to yet another example of the present disclosure.
Figure 44:
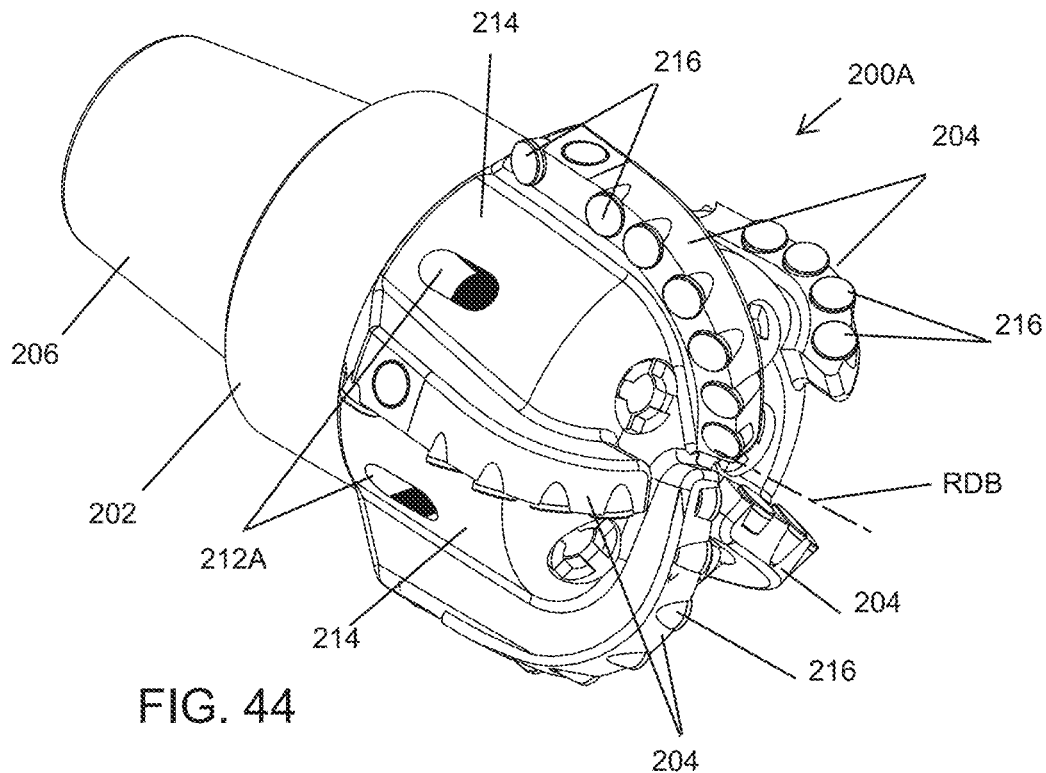
FIG. 44 is a first isometric view of the rotary drill bit of the pullback system of FIG. 43.
Figure 45:
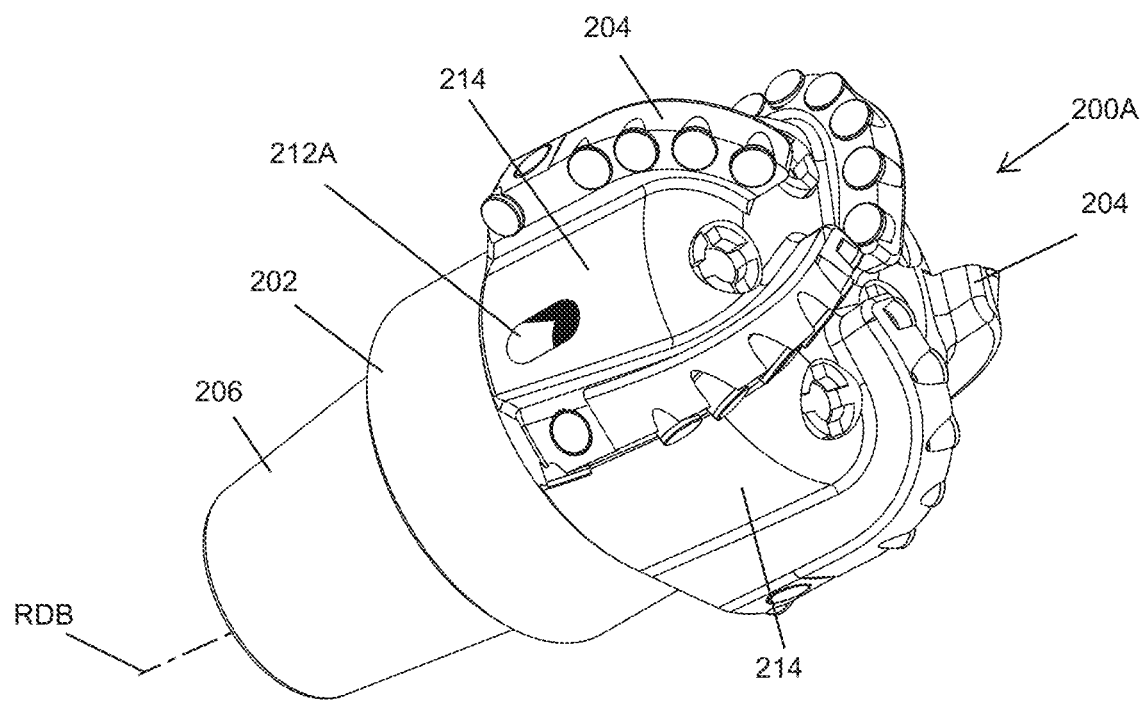
FIG. 45 is a second isometric view of the rotary drill bit of the pullback system of FIG. 43.

FIGS. 43-50 illustrate a pullback system 10A of yet another embodiment, including a pullback device 1000 and a rotary drill bit 200A. Consistent with preceding embodiments, the attachment location 1008 can be positioned along the central axis PBD of the pullback device 1000, which is coincident with the central axis RDB of the rotary drill bit 200A. The rotary drill bit 200A is similar to the drill bit 200 of the preceding description and figures, including a base 202, a plurality of vanes 204 at a forward end, and a coupler 206 at a rearward end (e.g., with threads, not shown). However, the drill bit 200A can be provided with or without the anchor 218 of the drill bit 200. Whether or not an anchor 218 is provided, the pullback device 1000 does not utilize a separate collar secured to the anchor. Rather, individual arms 1006 of the pullback device 1000 are provided as grapple arms to engage with arm engagement features 212A, which as illustrated, are provided in the troughs 214 between the vanes 204 of the rotary drill bit 200A. The arms 1006 attach to the rotary drill bit 200A, forming an anchoring portion of the pullback device 1000. As shown in the drawings, the arm engagement features 212A are located within the axial extent of the vanes 204. Being within the axial extent of the vanes 204 simply refers to the engagement features 212A being positioned within the axial span defined between a front or distal end of the rotary drill bit 200A (e.g., of the vanes 204) and the opposite or back edges of the vanes 204. In other constructions, the arm engagement features 212A may be located on the base 202 beyond the back edges of the vanes 204 (i.e., to the left as shown in FIGS. 44 and 45). In either case, the arms 1006 of the pullback device 1000 extend through the troughs 214 when the second ends 1012 of the arms 1006 are engaged with the arm engagement features 212A and the pullback device 1000 is in its assembled state as shown in FIG. 43. In the assembled state, the outer radial edges of the arms 1006, which can be the radially outermost portions of the pullback device 1000, are positioned radially inward of the diameter D1 of the rotary drill bit 200A defined by the vanes 204.

Figure 47:
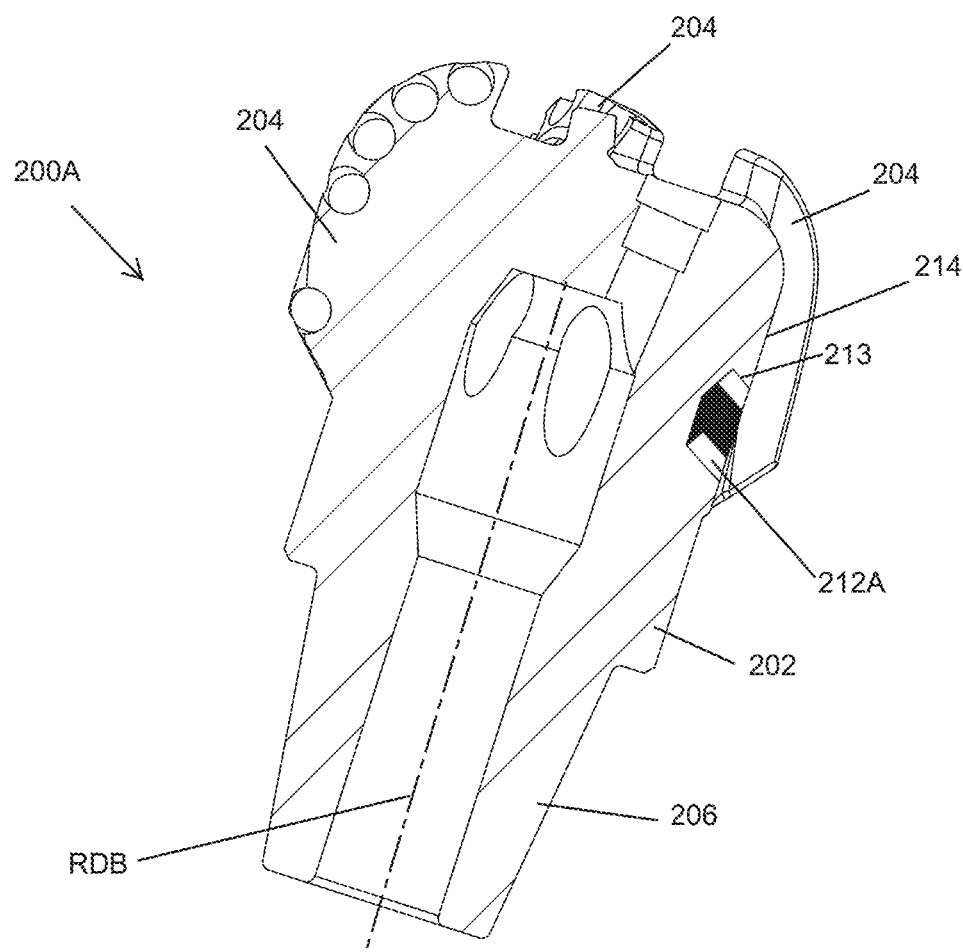
FIG. 47 is a cross-section view of the rotary drill bit, taken along line 47-47 of FIG. 46.
Figure 46:
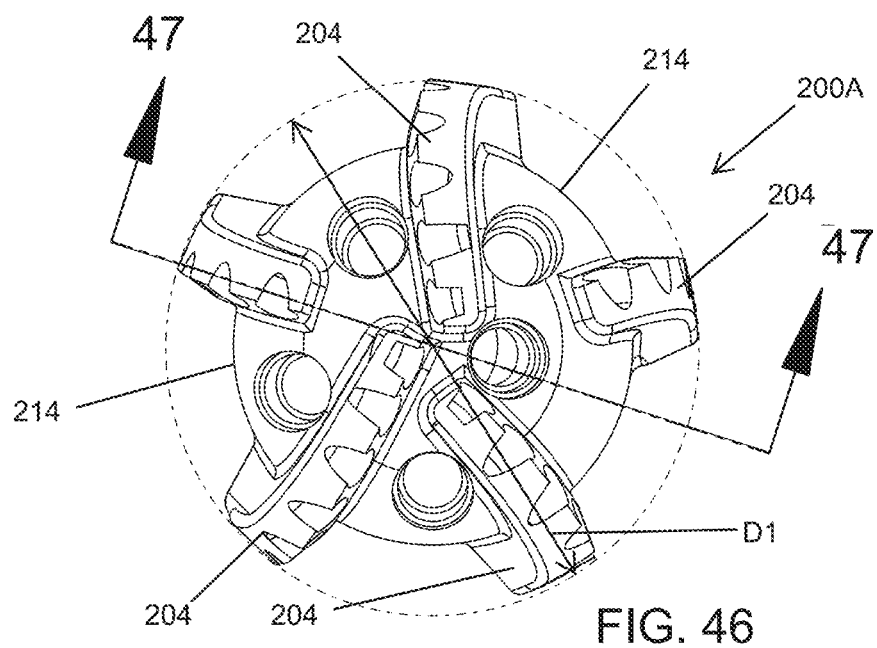
FIG. 46 is a front view of the rotary drill bit of FIGS. 44 and 45.

As shown in the cross-section view of FIG. 47, each arm engagement feature 212A is formed by a localized absence of material at a particular location along an outer peripheral wall of the rotary drill bit 200A, in the trough 214 between the vanes 204. The arm engagement features 212A can be recesses, pockets, undercuts, or other concavities, or in some constructions, apertures. As shown in FIG. 47, an end surface 213 of each arm engagement feature 212A that lies nearest the distal (drilling) end of the rotary drill bit 200A can be skewed from the axis RDB rather than perpendicular. The end surface 213 can be skewed in a direction that increases the security of the engagement between the rotary drill bit 200A and the pullback device 1000 during pullback operations. Furthermore, it can be seen in FIGS. 48-50, that the arm second ends 1012 can be formed as hooks that project radially inward toward the axis RDB. In some constructions, each hooked second end 1012 can define a hook surface 1013 having a similar skew angle configured so that the hook surface 1013 lies along the end surface 213 when the pullback device 1000 is assembled onto the rotary drill bit 200A.

Figure 49:
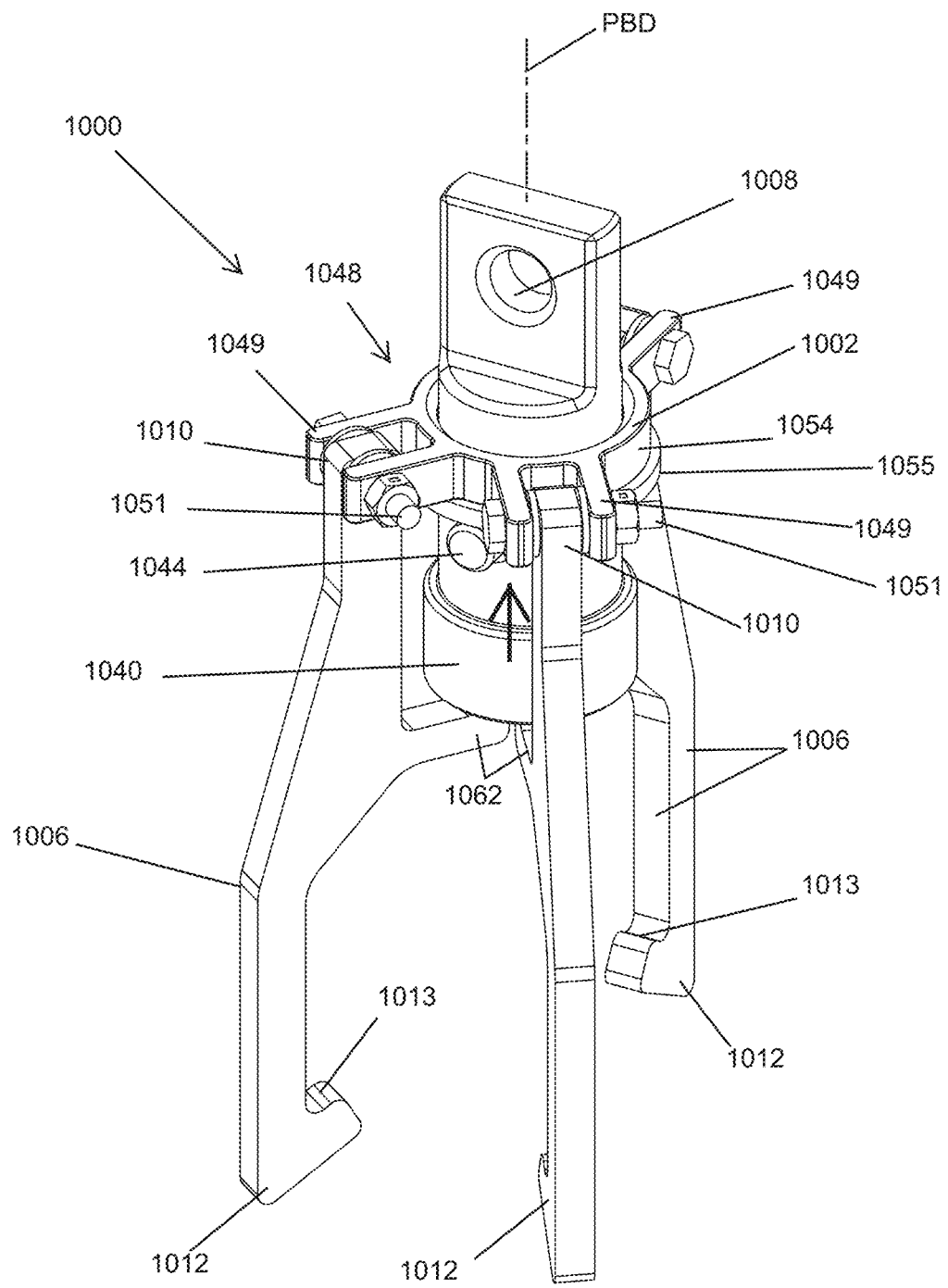
FIG. 49 is an isometric view of the pullback device in a closed configuration in which the collar assembly is in a locking position. The rotary drill bit is removed for clarity.
Figure 50:
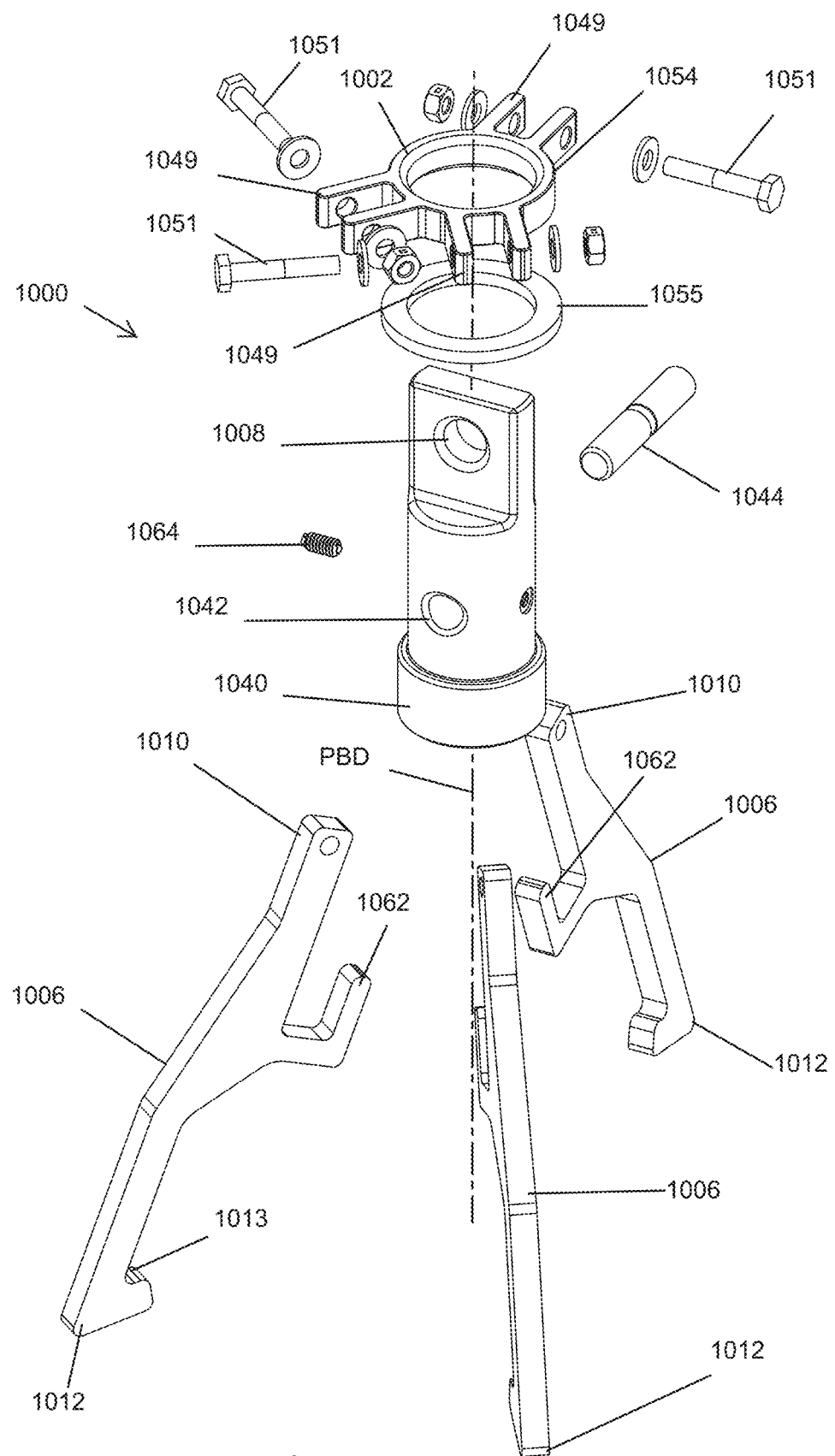
FIG. 50 is an exploded assembly view of the pullback device of FIGS. 43-49.
Figure 51:
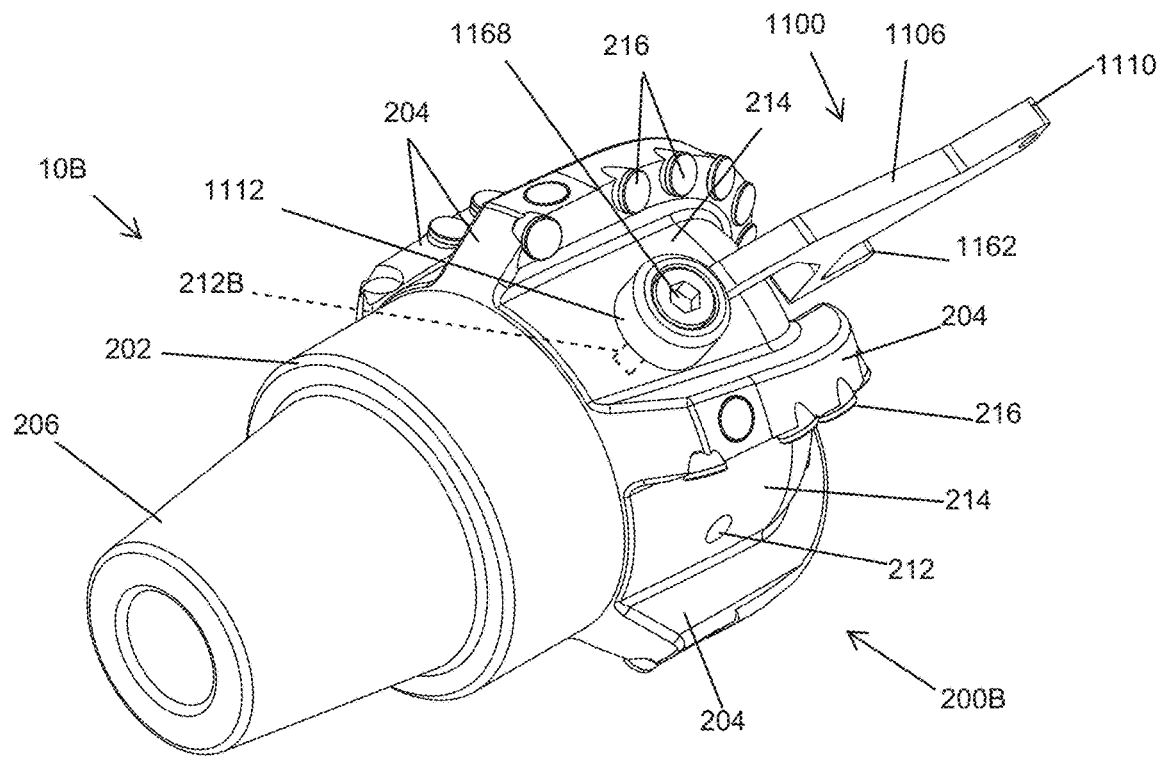
FIG. 51 is an isometric view of a pullback system, including a portion of a pullback device and a rotary drill bit, according to yet another example of the present disclosure.
Figure 52:
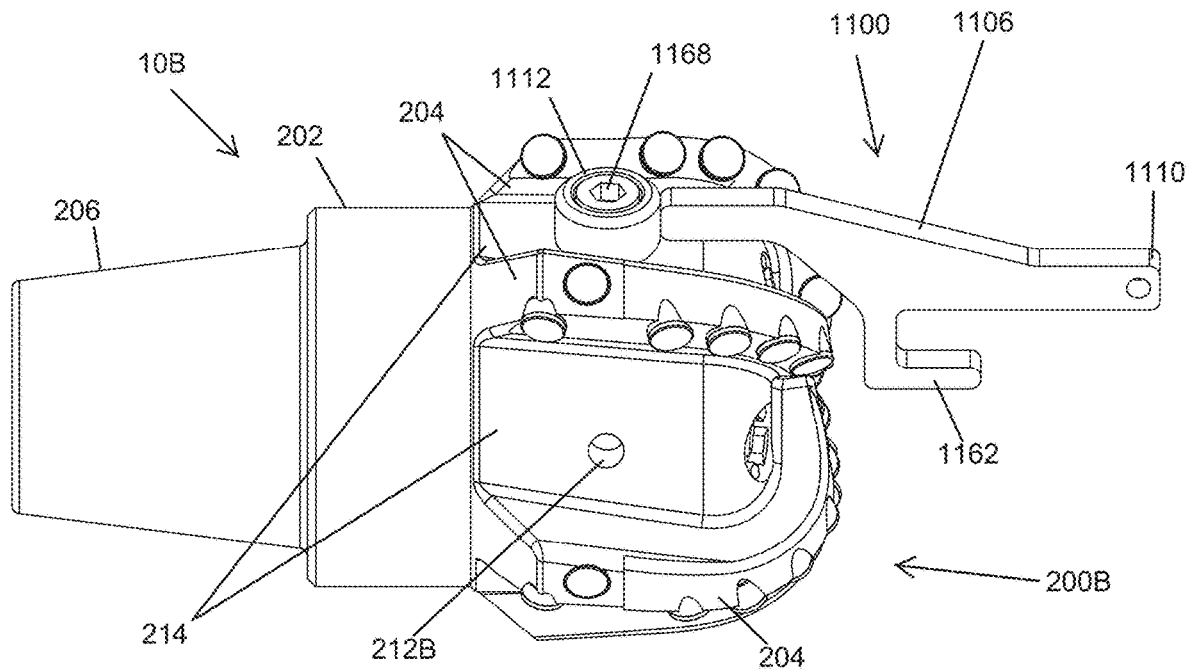
FIG. 52 is a side view of the pullback system of FIG. 51.
Figure 53:
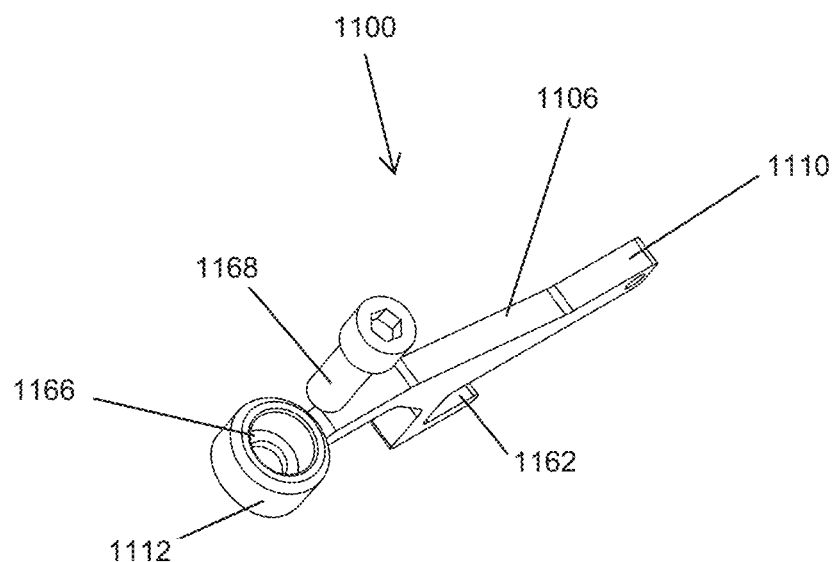
FIG. 53 is an isometric view of the portion of the pullback system of FIGS. 51-52.
Figure 54:
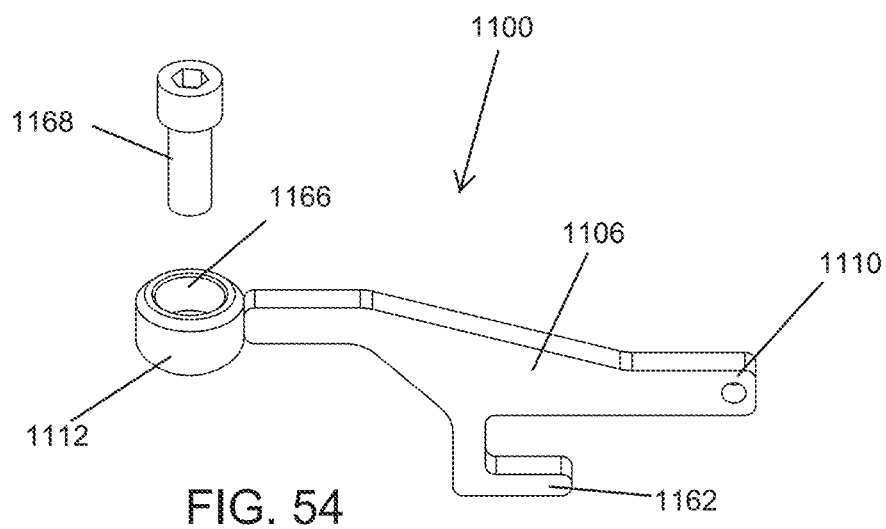
FIG. 54 is a side view of the portion of the pullback system of FIGS. 51-52.
Figure 55:
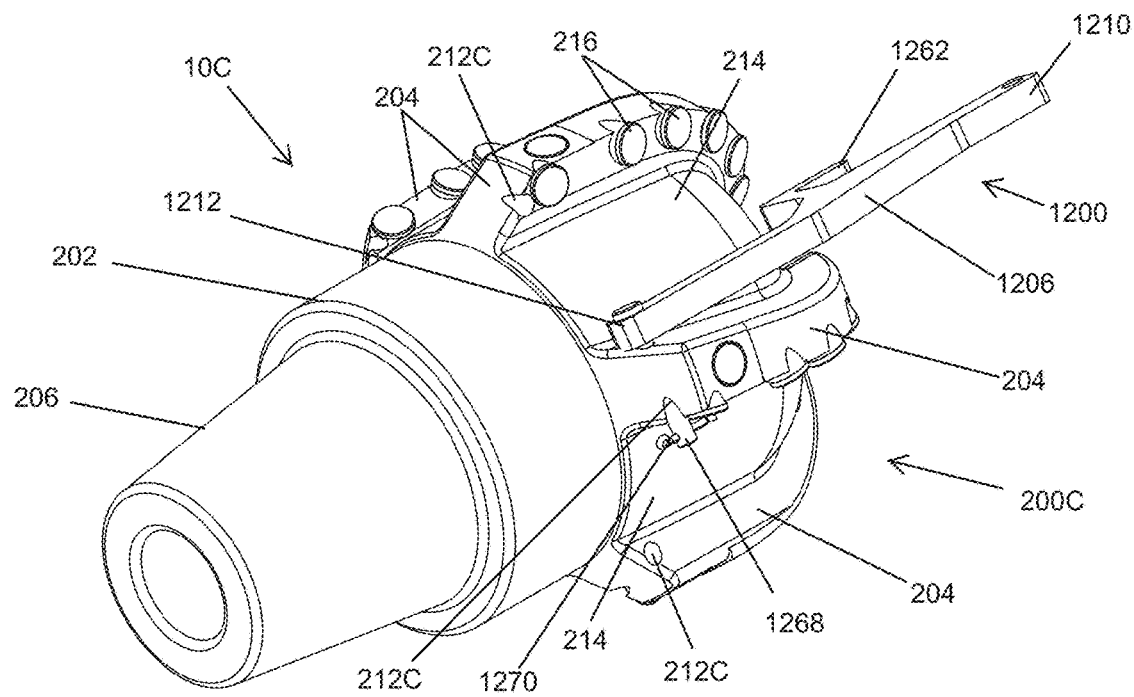
FIG. 55 is an isometric view of a pullback system, including a portion of a pullback device and a rotary drill bit, according to yet another example of the present disclosure.
Figure 56:
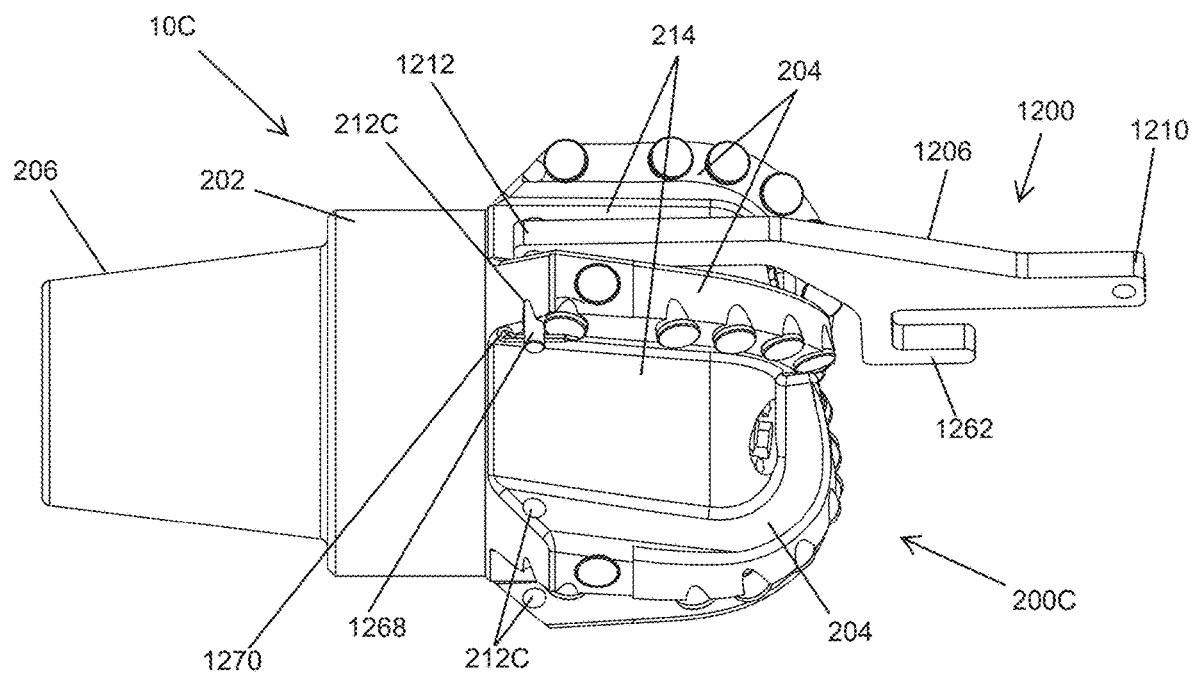
FIG. 56 is a side view of the pullback system of FIG. 55.
Figure 57:
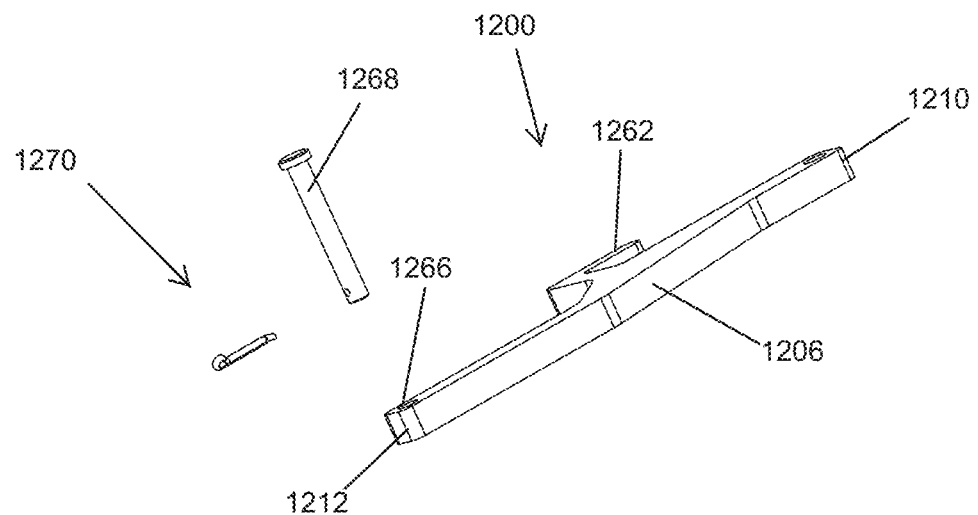
FIG. 57 is an isometric view of the portion of the pullback system of FIGS. 55-56.
Figure 58:
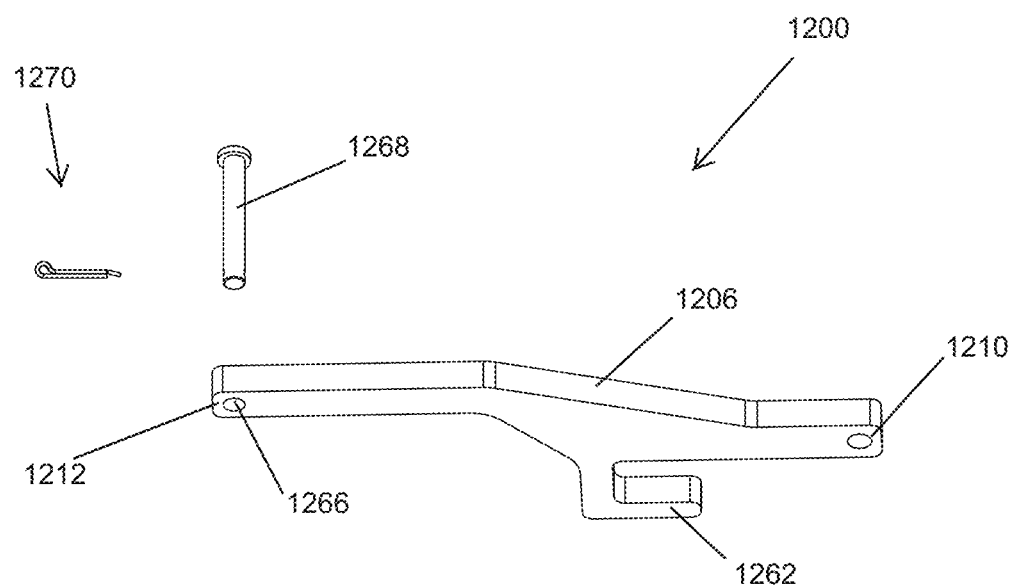
FIG. 58 is a side view of the portion of the pullback system of FIGS. 55-56.
Figure 59:
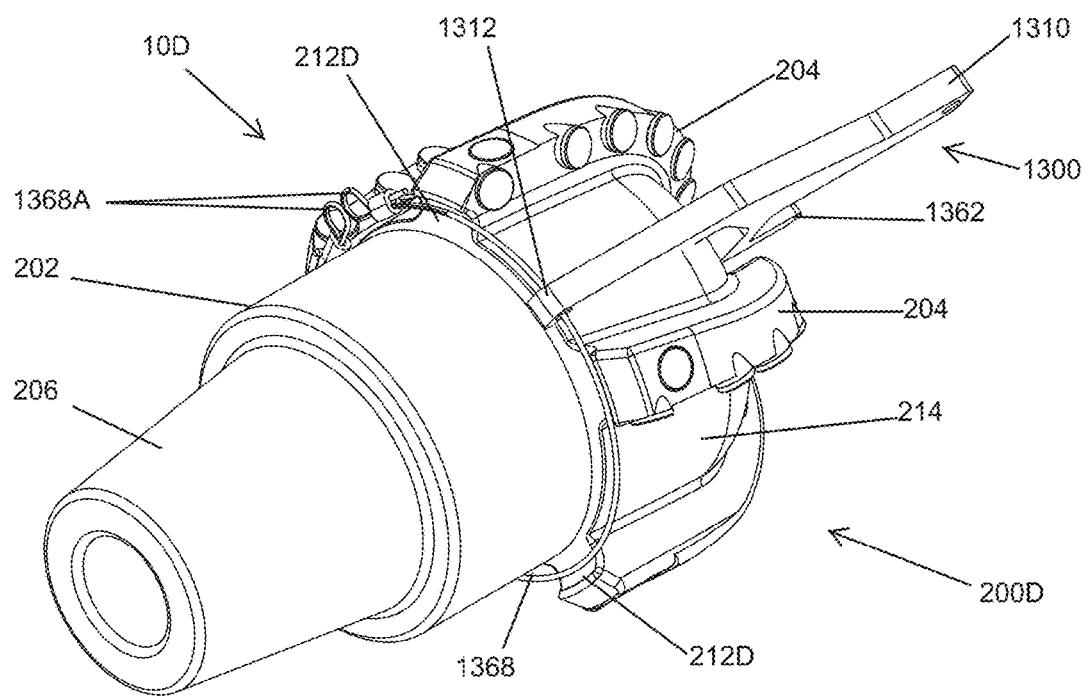
FIG. 59 is an isometric view of a pullback system, including a portion of a pullback device and a rotary drill bit, according to yet another example of the present disclosure.
Figure 60:
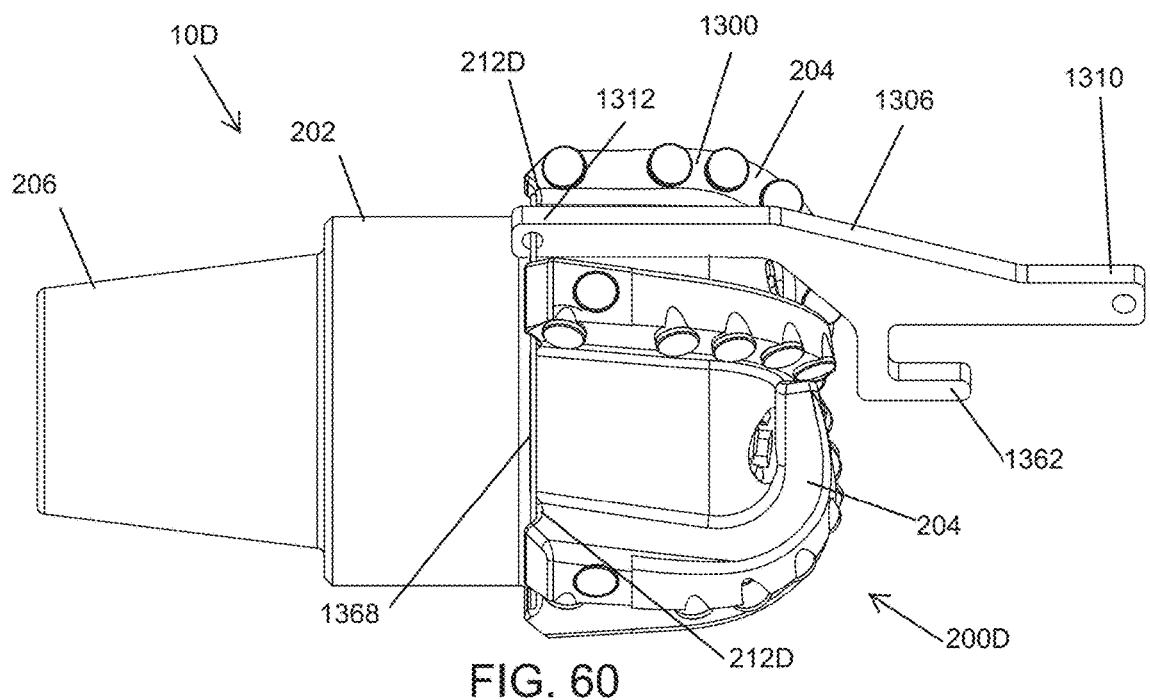
FIG. 60 is a side view of the pullback system of FIG. 59.
Figure 61:
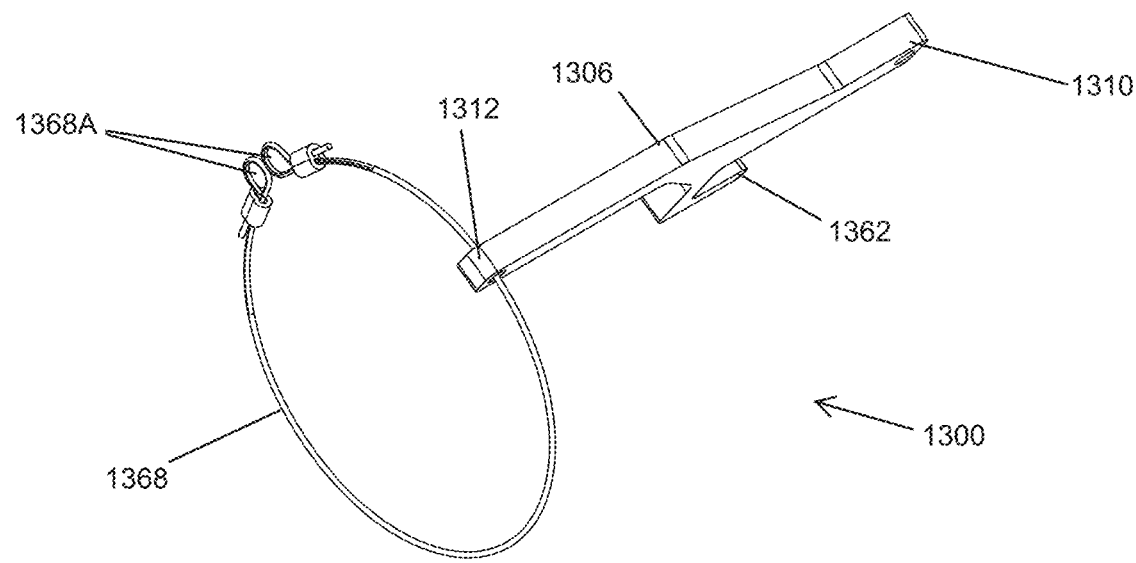
FIG. 61 is an isometric view of the portion of the pullback system of FIGS. 59-60.
Figure 62:
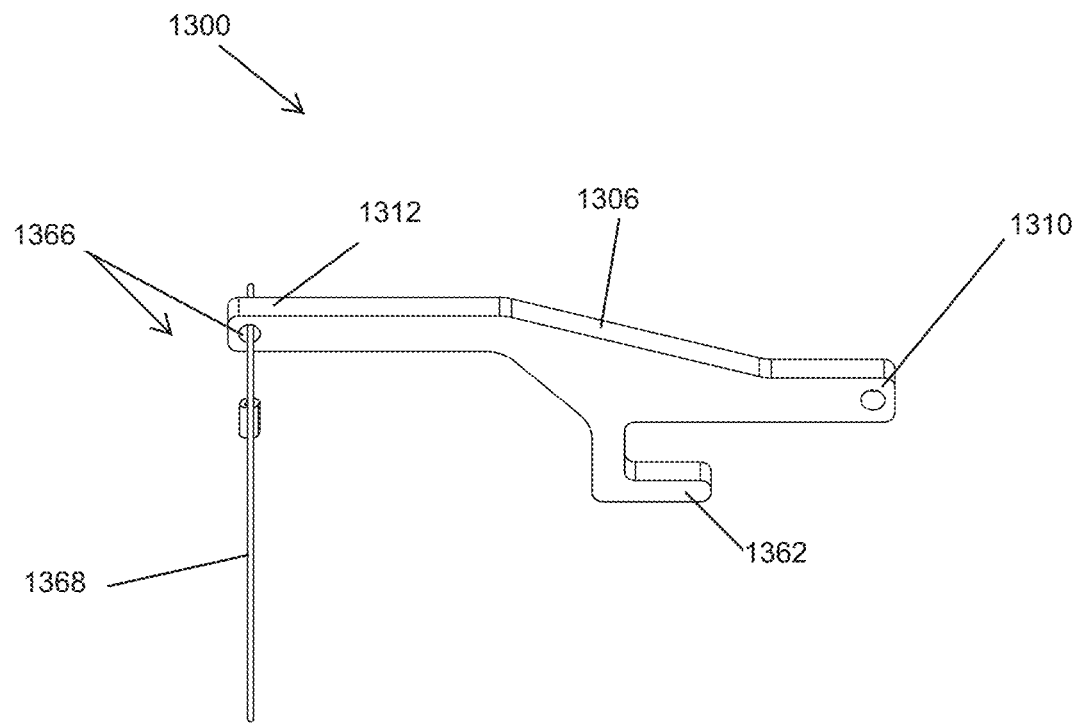
FIG. 62 is a side view of the portion of the pullback system of FIGS. 59-60.
Figure 63:
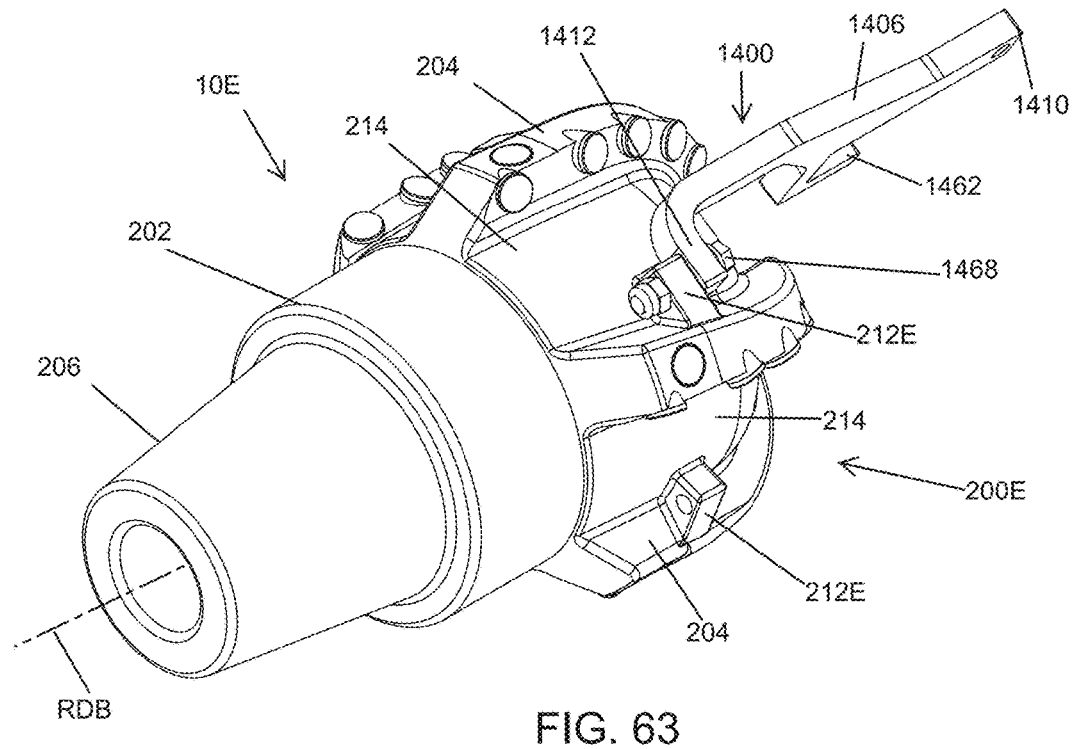
FIG. 63 is an isometric view of a pullback system, including a portion of a pullback device and a rotary drill bit, according to yet another example of the present disclosure.
Figure 64:
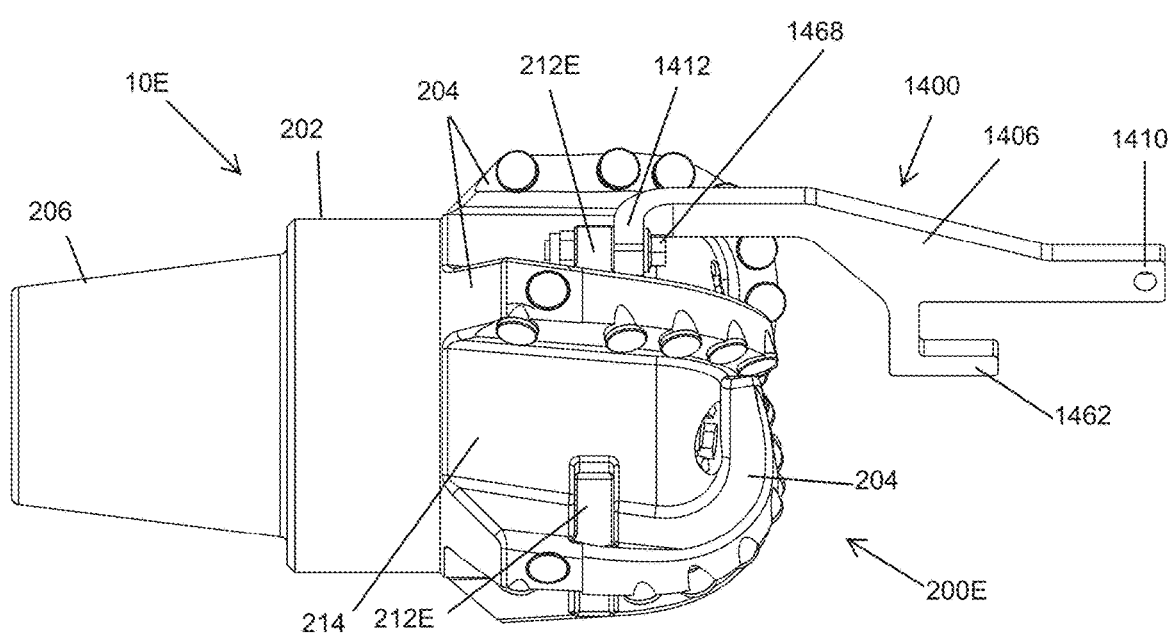
FIG. 64 is a side view of the pullback system of FIG. 63.
Figure 65:
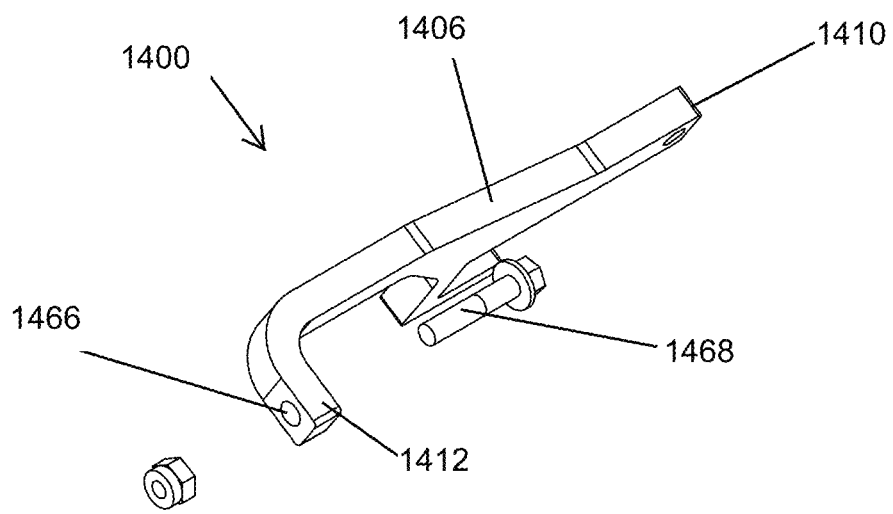
FIG. 65 is an isometric view of the portion of the pullback system of FIGS. 63-64.
Figure 66:
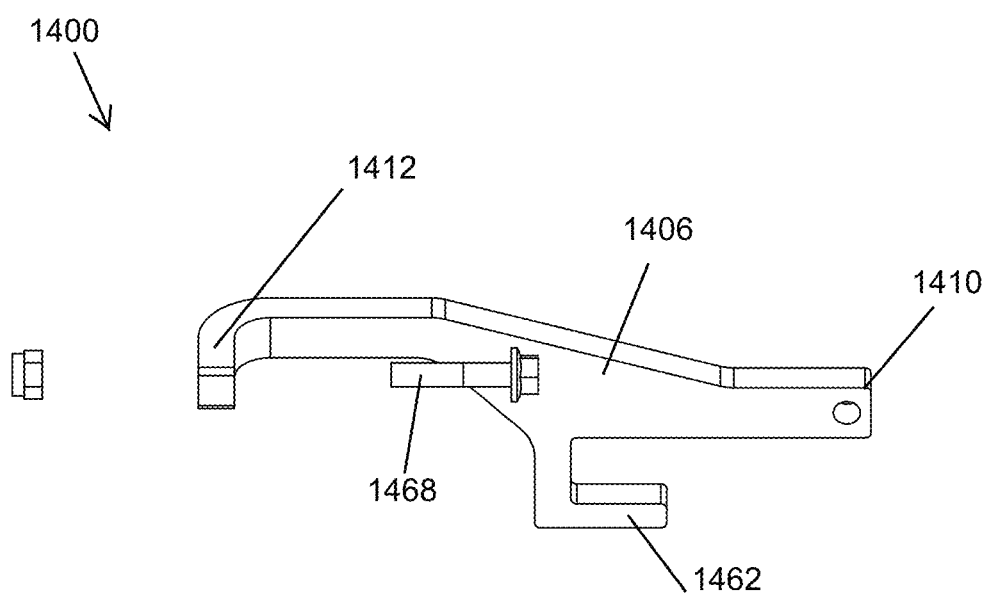
FIG. 66 is a side view of the portion of the pullback system of FIGS. 63-64.

Unlike many of the other arms disclosed in the preceding embodiments, although similar in many respects to the pullback device 700 of FIGS. 35-40, the arms 1006 are pivotally coupled at their first ends 1010 to the frame member 1002 such that the frame member 1002 forms an axially slidable collar as part of a collar assembly 1048, which is best described with reference to the exploded assembly view of FIG. 50. Thus, the pullback device 1000 may form a grapple assembly. In the illustrated construction, the pivotal connection is established by an aperture through the first end 1010 along with parts of the collar assembly 1048 forming a clevis structure 1049 and a clevis pin 1051 (e.g., threaded bolt assembled with clevis structure 1049, for example with washer(s) and a nut as shown). The pivotal connection for each arm 1006 is configured to allow the second end 1012 of that arm 1006 to pivot radially inward toward the axis RDB for assembly and radially outward away from the axis RDB for disassembly, while retained to the collar assembly 1048. The collar assembly 1048 as illustrated includes the frame member 1002 providing a main collar body having a ring portion 1054 and the individual clevis structures 1049, and a separate ring or washer 1055 forming an abutment surface of the collar assembly 1048. The collar assembly 1048 is arranged around a locking device 1040 of the pullback device 1000 and slidable axially along the locking device 1040 between locking and unlocking positions as described in further detail below. The abutment surface provided by the washer 1055 faces and abuts the pin 1044 that is removably received in the aperture 1042 of the locking device 1040 to retain the collar assembly 1048 in the locking position (FIGS. 43 and 49), thus maintaining the pullback device 1000 in the assembled state on the rotary drill bit 200A.

Between the first and second ends 1010, 1012, each arm 1006 further includes a radially-inward projecting part, or extension, forming a locking portion 1062. The locking portions 1062 can be generally hook-shaped. As illustrated, each of the locking portions 1062 includes a radially inward extending portion and a connecting axially extending portion, the axially extending portion extending in a direction toward the collar assembly 1048 and away from the rotary drill bit 200A.

Figure 48:
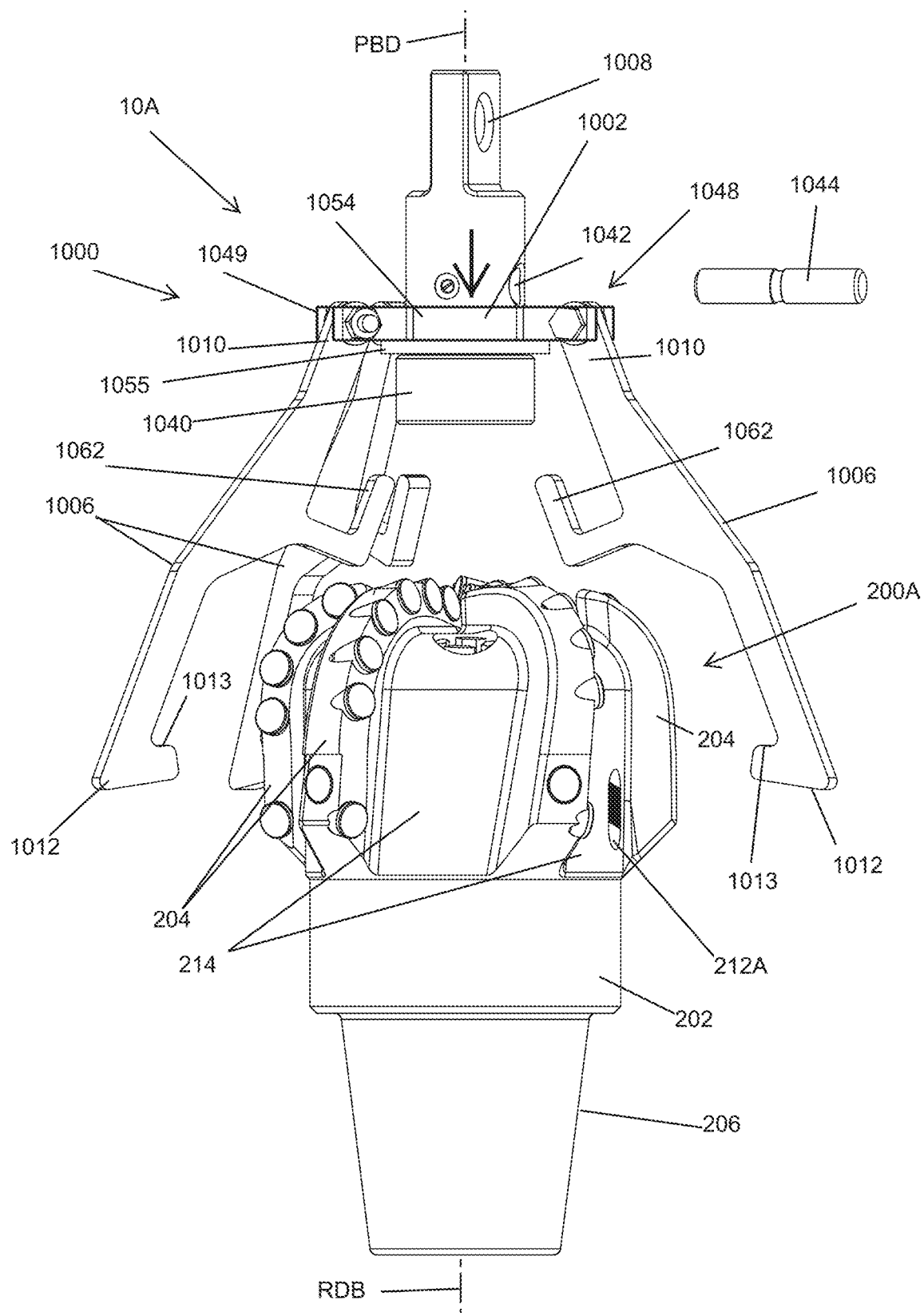
FIG. 48 is a side view of the pullback device in an open configuration in which a collar assembly is in an unlocking position and respective arms of the pullback device are released from the rotary drill bit.

From the unassembled state, just after drilling and prior to pullback operation, the pullback device 1000 is brought axially into proximity with the rotary drill bit 200A such that they overlap with each other as shown in FIG. 48. The second arm ends 1012 are brought into register with the arm engagement features 212A in the rotary drill bit 200A. The pin 1044 is removed, and the collar assembly 1048 is in the unlocking position. In the unlocking position, the collar assembly 1048 can be slid relatively away from the attachment location 1008 and may abut a shoulder formed at the edge of the locking device 1040. Each arm 1006 is pivoted about its first end 1010 so that its second end 1012 is engaged with (e.g., inserted into) the respective arm engagement features 212A on the rotary drill bit 200A. It is noted here that the arm engagement features 212A can be provided in a number (e.g., three) matching that of the arms 1006, or alternately, excess arm engagement features 212A can be provided (e.g., one in every trough 214). In some constructions, the pullback device 1000 has additional arms 1006, for example four or five.

As the arms 1006 are pivoted to engage the arm engagement features 212A, the arm locking portions 1062 pivot toward or into the locking device 1040. The locking device 1040 is formed as a ring (e.g., integral with the attachment location 1008 or securely attached thereto) and is open on the end facing the rotary drill bit 200A. Once all the second ends 1012 of the arms 1006 are inserted into the arm engagement features 212A, the collar assembly 1048 is moved along the locking device 1040 toward the attachment location 1008 and away from the rotary drill bit 200A, into the locking position of the collar assembly 1048, so that all the arm locking portions 1062 are pulled into, or further into, the locking device 1040 as shown in FIGS. 43 and 49. With the collar assembly 1048 in the locking position, insertion of the arm locking portions 1062 prevents outward pivoting of the arms 1006, which in turn prevents release of the arm second ends 1012 from the rotary drill bit 200A. Once the collar assembly 1048 is moved into the locking position, the pin 1044 is inserted into the aperture 1042 just below the collar assembly 1048 (e.g., the washer 1055) to maintain the collar assembly 1048 in the locking position. One or more pin retainer 1064 is used to keep the pin 1044 in place. The pin retainer 1064 can be a set screw as shown, e.g., oriented perpendicular to the pin 1044. However, pin retainer(s) 1064 can take other forms, including by non-limiting example, a cotter pin, a circlip, a wire, or a nut.

The pullback system 10A provides one example of a pullback device 1000 with multiple arms 1006, each of which interfaces or joins (e.g., directly) with an engagement feature 212A provided in the rotary drill bit 200A to form an anchoring portion of the pullback device 1000. The second ends 1012 of the arms 1006 that engage directly with the rotary drill bit 200A are not mutually collared or interconnected together. The second arm ends 1012 form individual joints with the rotary drill bit 200A that transmit the pullback loads from the rotary drill bit 200A to the pullback device 1000 during installation of product into the hole.

FIGS. 51-54 illustrate a pullback system 10B including a pullback device 1100 and a rotary drill bit 200B. The pullback system 10B is similar in most respects to the pullback system 10A of FIGS. 43-50, and thus the preceding disclosure is relied upon in reference to similarities while the description below is focused upon those aspects that differentiate the pullback system 10B. First, it is noted that FIGS. 51-54 illustrate only a portion of the pullback device 1100, with the understanding that the pullback device 1100 includes multiple (e.g., three) arms 1106 like the pullback device 1000 of FIGS. 43-50. Furthermore, the arms 1106 can be coupled together via a collar assembly 1048 (at first ends 1110) including a frame member 1002, and a locking device 1040 (at locking portions 1162) as shown with the pullback device 1000.

At the second end 1112 of each arm 1106 of the pullback device 1100, rather than a hook portion for engaging a concave pocket or recess in the trough 214 between drill bit vanes 204, an eye 1166 is formed, providing an aperture. In other constructions, the aperture can be provided by way of another structure, without an eye per se. The aperture of the eye 1166 is configured to align with a corresponding engagement feature 212B and to receive a corresponding fastener 1168. In some constructions, the engagement feature 212B is a threaded aperture and the fastener 1168 is a threaded fastener. The fastener 1168 can be received by the engagement feature 212B along a radially inward direction. In other constructions, the fastener 1168 can be received along a skew direction having a radially inward component. The threaded apertures or other engagement features 212B are provided at some or all of the troughs 214 between vanes 204. Although the details are not repeated here, the various arms 1106 are retained by the locking device 1040 when the collar assembly 1048 is moved into the locking position, and the pin 1044 retains the collar assembly 1048 in place during use. It is also contemplated that a modified version of the pullback system 10B can forego the slidable, lockable collar assembly 1048. Likewise, the arms 1106 may be provided without the locking portions 1162. In some constructions, the arms 1106 are not pivotally supported at their first ends 1110. For example, the arms 1106 may be fixed to a frame member and attachment location.

FIGS. 55-58 illustrate a pullback system 10C including a pullback device 1200 and a rotary drill bit 200C. The pullback system 10C is similar in most respects to the pullback systems 10A of FIGS. 43-50 and 10B of FIGS. 51-54, and thus the preceding disclosure is relied upon in reference to similarities while the description below is focused upon those aspects that differentiate the pullback system 10C. First, it is noted that FIGS. 55-58 illustrate only a portion of the pullback device 1200, with the understanding that the pullback device 1200 includes multiple (e.g., three) arms 1206 like the pullback device 1000 of FIGS. 43-50. Furthermore, the arms 1206 can be coupled together via a collar assembly 1048 (at first ends 1210) including a frame member 1002, and a locking device 1040 (at locking portions 1262) as shown with the pullback device 1000.

At the second end 1212 of each arm 1206 of the pullback device 1200, rather than a hook portion for engaging a concave pocket or recess in the trough 214 between drill bit vanes 204, an aperture 1266 is provided. The arm 1206 at the location of the aperture 1266 may be formed as an eye, or may have no conspicuous change in structure as shown. The aperture 1266 is configured to align with a corresponding engagement feature 212C formed in a corresponding vane 204 (e.g., adjacent a rearward end of the vane 204) rather than in the trough 214. The aperture 1266 receives a corresponding fastener 1268 to secure the arm 1206 to the rotary drill bit 200C. In some constructions, the engagement feature 212C is a through hole and the fastener 1268 is a retaining pin, for example a clevis pin. The illustrated clevis pin 1268 has a head at one end and a through hole at the opposite end for receiving a cotter pin 1270. However, the retaining pin or other fastener 1268 can take other particular forms in other embodiments. In particular, either one of the arm aperture 1266 and the engagement feature 212C can be threaded for receiving a threaded fastener. As illustrated, the engagement feature 212C is a cross hole. In particular, the fastener 1268 can be received by the engagement feature 212C along a direction perpendicular to the radial direction. For example, the fastener 1268 can extend tangentially through the engagement feature 212C, perpendicular to the central axis RDB of the rotary drill bit 200C. In other constructions, the fastener 1268 can be received along a skew direction having a tangential component. Although not attached within the troughs 214, the arms 1206 occupy the troughs 214 and do not extend radially outward of the vanes 204. The through holes or other engagement features 212C are provided in some or all of the vanes 204. Although the details are not repeated here, the various arms 1206 are retained by the locking device 1040 when the collar assembly 1048 is moved into the locking position, and the pin 1044 retains the collar assembly 1048 in place during use. In a modified embodiment, the engagement feature 212C can be formed in the trough 214 by a separate structure protruding radially from the hub or body portion of the rotary drill bit 200C between the vanes 204. It is also contemplated that a modified version of the pullback system 10C can forego the slidable, lockable collar assembly 1048. Likewise, the arms 1206 may be provided without the locking portions 1262. In some constructions, the arms 1206 are not pivotally supported at their first ends 1210. For example, the arms 1206 may be fixed to a frame member and attachment location.

FIGS. 59-62 illustrate a pullback system 10D including a pullback device 1300 and a rotary drill bit 200D. The pullback system 10D is similar in most respects to the pullback systems 10A, 10B, and 10C, and thus the preceding disclosure is relied upon in reference to similarities while the description below is focused upon those aspects that differentiate the pullback system 10D. First, it is noted that FIGS. 59-62 illustrate only a portion of the pullback device 1300, with the understanding that the pullback device 1300 includes multiple (e.g., three) arms 1306 like the pullback device 1000 of FIGS. 43-50. Furthermore, the arms 1306 can be coupled together via a collar assembly 1048 (at first ends 1310) including a frame member 1002, and a locking device 1040 (at locking portions 1362) as shown with the pullback device 1000.

An aperture 1366 is provided through the second end 1312 of each arm 1306 of the pullback device 1300. The arms 1306 can be identical to the arms 1206 shown in FIGS. 55-58, or may have an eye like the arms 1106, or another alternate construction. The apertures 1366 of the various arms 1306 are configured to align (circumferentially) with a corresponding plurality of engagement features 212D formed in the vanes 204 (e.g., adjacent a rearward end of the vane 204) rather than in the trough 214. As illustrated, the engagement features 212D are concave grooves or "cradles" that extend circumferentially. The engagement features 212D are formed as recesses or undercuts in the rearward edges of the vanes 204. However, the engagement features 212D can take different forms, such as apertures through the vanes 204 and certainly grooves or recesses of other shapes. The shape of the illustrated engagement features 212D is a rounded groove (e.g., "U" shaped), but the engagement features 212D can be shaped as a "V" or even a rectangular groove. The apertures 1366 receive a corresponding fastener 1368 to collectively secure the arms 1306 to the rotary drill bit 200D. The fastener 1368 can be a flexible loop (e.g., of wire, cable, chain, etc.) or loops threaded through all the apertures 1366 of all the arms 1306 and also seated or nested into all the grooves forming the engagement features 212D. The illustrated fastener 1368 has two opposing ends 1368A, (e.g., loop ends) that are secured together by a connector (e.g., cable tie, padlock, locking ring, not shown) to keep the fastener 1368 in position on the rotary drill bit 200D. The fastener 1368 forms a unitary circumferential loop or ring for retaining the arms 1306 rather than having separate connections to the rotary drill bit 200D for each arm 1306. Although not attached within the troughs 214, the arms 1306 occupy the troughs 214 and do not extend radially outward of the vanes 204. The engagement features 212D are provided in some or all of the vanes 204. Although the details are not repeated here, the various arms 1306 are retained by the locking device 1040 when the collar assembly 1048 is moved into the locking position, and the pin 1044 retains the collar assembly 1048 in place during use. It is also contemplated that a modified version of the pullback system 10D can forego the slidable, lockable collar assembly 1048. Likewise, the arms 1306 may be provided without the locking portions 1362. In some constructions, the arms 1306 are not pivotally supported at their first ends 1310. For example, the arms 1306 may be fixed to a frame member and attachment location.

FIGS. 63-66 illustrate a pullback system 10E including a pullback device 1400 and a rotary drill bit 200E. The pullback system 10E is similar in most respects to the pullback systems 10A, 10B, and 10C, and thus the preceding disclosure is relied upon in reference to similarities while the description below is focused upon those aspects that differentiate the pullback system 10E. First, it is noted that FIGS. 63-66 illustrate only a portion of the pullback device 1400, with the understanding that the pullback device 1400 includes multiple (e.g., three) arms 1406 like the pullback device 1000 of FIGS. 43-50. Furthermore, the arms 1406 can be coupled together via a collar assembly 1048 (at first ends 1410) including a frame member 1002, and a locking device 1040 (at locking portions 1462) as shown with the pullback device 1000.

The second end 1412 of each arm 1406 of the pullback device 1400 includes a flange portion having an aperture 1466. Due to the configuration of the second end 1412 (being bent 90-degrees or otherwise forming the flange portion), the aperture 1466 extends through the arm 1406 in a direction parallel to the arm 1406. The aperture 1466 is configured to align with a corresponding engagement feature 212E formed as an apertured boss or mounting block. The engagement feature 212E is positioned within the trough 214, but may be conjoined with an adjacent vane 204 as shown. The engagement features 212E can be provided along the rearward half of the axial length of the vanes 204. The aperture 1466 receives a corresponding fastener 1468 to secure the arm 1206 to the rotary drill bit 200E. In some constructions, the aperture of the engagement feature 212E is a through hole and the fastener 1468 is a threaded fastener secured with a nut as shown. However, in other constructions, the engagement features 212E may be threaded. The fastener 1468 can be received by the engagement feature 212E along a direction parallel to the central axis RDB of the rotary drill bit 200E. As with the other embodiments, the arms 1406 occupy the troughs 214 and do not extend radially outward of the vanes 204. The engagement features 212E are provided in between each adjacent pair of vanes 204, or only selected ones thereof. Although the details are not repeated here, the various arms 1406 are retained by the locking device 1040 when the collar assembly 1048 is moved into the locking position, and the pin 1044 retains the collar assembly 1048 in place during use. It is also contemplated that a modified version of the pullback system 10E can forego the slidable, lockable collar assembly 1048. Likewise, the arms 1406 may be provided without the locking portions 1462. In some constructions, the arms 1406 are not pivotally supported at their first ends 1410. For example, the arms 1406 may be fixed to a frame member and attachment location.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rotary drill bit for use with a horizontal directional drill string, the rotary drill bit comprising:
   a coupler provided at a proximal axial end of the rotary drill bit and configured to attach the rotary drill bit to a drill head at a distal end of the drill string;
   a cutting portion provided at a distal axial end of the rotary drill bit and provided with a plurality of vanes with respective cutters that operate to cut a hole in earth when the rotary drill bit is rotated about a central axis, wherein the plurality of vanes project radially outwardly from a surface of the cutting portion such that the surface forms respective troughs circumferentially interspersed with the plurality of vanes, and wherein each of the respective troughs extends from the distal axial end of the rotary drill bit in a direction toward the proximal axial end of the rotary drill bit; and
   a plurality of engagement features positioned axially within the cutting portion and within the respective troughs to be radially inward of an outer cutting diameter to facilitate attachment of a product pullback device between the plurality of vanes without removing the rotary drill bit, or any portion thereof, from the drill head, and wherein the plurality of engagement features are positioned at an axial position offset from the distal axial end.

2. The rotary drill bit of claim 1, wherein the plurality of engagement features are provided on the surface.

3. The rotary drill bit of claim 1, wherein the plurality of engagement features includes three engagement features.

4. The rotary drill bit of claim 3, wherein the three engagement features are unevenly spaced about the central axis.

5. The rotary drill bit of claim 1, wherein the plurality of engagement features are mounting blocks projecting from respective circumferential side surfaces of respective ones of the plurality of vanes.

6. The rotary drill bit of claim 5, wherein each of the mounting blocks includes an aperture configured to receive a fastener parallel to the central axis.

7. The rotary drill bit of claim 1, wherein the plurality of engagement features are concave pockets extending inward from the surface and configured to receive hooks of a pullback device.

8. The rotary drill bit of claim 1, wherein the plurality of engagement features include threaded apertures.

9. The rotary drill bit of claim 8, wherein each of the threaded apertures is configured to receive a threaded fastener along a radially inward direction toward the central axis.

10. The rotary drill bit of claim 1, wherein each of the plurality of vanes includes a plurality of individual cutters.

11. The rotary drill bit of claim 10, wherein the plurality of individual cutters are polycrystalline diamond (PDC) compact cutters.

12. A pullback system comprising:
a pullback device configured for product attachment and including a plurality of arms; and
a rotary drill bit for use with a horizontal directional drill string, the rotary drill bit comprising:
a coupler provided at a proximal axial end and configured to attach the rotary drill bit to a drill head at a distal end of the drill string,
a cutting portion provided at a distal axial end and provided with a plurality of vanes with respective cutters that operate to cut a hole in earth when the rotary drill bit is rotated about a central axis, wherein the plurality of vanes project radially outwardly from a surface of the cutting portion such that the surface forms respective troughs circumferentially interspersed with the plurality of vanes, and
a plurality of engagement features positioned axially within the cutting portion and radially inward of an outer cutting diameter to facilitate attachment of the pullback device between the plurality of vanes without removing the rotary drill bit, or any portion thereof, from the drill head,
wherein the pullback device is removably attachable to the rotary drill bit and the plurality of arms are engageable with the respective plurality of engagement features, the plurality of arms positioned entirely within the respective troughs, and radially inside of the plurality of vanes, throughout the cutting portion when attached,
wherein the plurality of engagement features are positioned at an axial position offset from the distal axial end of the rotary drill bit.

13. A method comprising:
operating a horizontal directional drilling machine to thrust a drill string having a rotary drill bit into the earth to drill an underground hole from a start location to an end location, the rotary drill bit having a cutting portion defined by a plurality of vanes projecting radially outward from a surface to define an outer cutting diameter;
at the end location, attaching a pullback device to a plurality of engagement features of the rotary drill bit at respective positions that are offset from a distal axial end of the rotary drill bit between the plurality of vanes, axially within the cutting portion, the attached pullback device extending axially beyond the distal axial end of the rotary drill bit, without extending radially beyond the plurality of vanes;
attaching a product to an attachment portion of the pullback device at the end location;
pulling the drill string, including the rotary drill bit, the pullback device, and the product, back through the underground hole from the end location to the start location to install the product into the underground hole; and
detaching the product from the pullback device at the start location.

14. The method of claim 13, wherein attaching the pullback device includes engaging hooks of respective arms of the pullback device with the plurality of engagement features, which are formed as concave pockets extending inward from the surface.

15. The method of claim 13, wherein attaching the pullback device includes fastening respective arms of the pullback device with the plurality of engagement features, which are formed as threaded apertures.

* * * * *